(12) United States Patent
Horvitz

(10) Patent No.: US 7,519,564 B2
(45) Date of Patent: Apr. 14, 2009

(54) BUILDING AND USING PREDICTIVE MODELS OF CURRENT AND FUTURE SURPRISES

(75) Inventor: Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 350 days.

(21) Appl. No.: 11/172,581

(22) Filed: Jun. 30, 2005

(65) Prior Publication Data

US 2006/0106743 A1    May 18, 2006

Related U.S. Application Data

(60) Provisional application No. 60/628,267, filed on Nov. 16, 2004.

(51) Int. Cl.
*G06F 15/18* (2006.01)

(52) U.S. Cl. ............... 706/12; 706/14; 706/47; 706/55; 701/27; 701/200

(58) Field of Classification Search .......... 706/8, 706/11, 12, 14–21, 45–48, 50–55; 709/224, 709/235, 204–207, 223; 707/1, 3–6; 701/1, 701/10, 26, 27, 29, 200–210
See application file for complete search history.

(56) References Cited

U.S. PATENT DOCUMENTS

| 5,375,059 | A | | 12/1994 | Kyrtsos et al. |
| 5,493,692 | A | | 2/1996 | Theimer et al. |
| 5,541,590 | A | * | 7/1996 | Nishio ............... 340/903 |
| 5,544,321 | A | | 8/1996 | Theimer et al. |
| 5,555,376 | A | | 9/1996 | Theimer et al. |

(Continued)

FOREIGN PATENT DOCUMENTS

DE    10057796 A1    5/2002

(Continued)

OTHER PUBLICATIONS

International Search Report dated Jan. 11, 2007 for International Patent Application No. PCT/US 06/25167, 3 pgs.

(Continued)

*Primary Examiner*—David R Vincent
*Assistant Examiner*—Omar F Fernandez Rivas
(74) *Attorney, Agent, or Firm*—Amin, Turocy & Calvin, LLP

(57) ABSTRACT

Methods are described for identifying events that would be considered surprising by people and identifying how and when to transmit information to a user about situations that they would likely find surprising. Additionally, the methods of identifying surprising situations can be used to build a case library of surprising events, joined with a set of observations before the surprising events occurred. Statistical machine learning methods can be applied with data from the case library to build models that can predict when a user will likely be surprised at future times. One or more models of context-sensitive expectations of people, a view of the current world, and methods for recording streams or events before surprises occur, and for building predictive models from a case library of surprises and such historical observations can be employed. The models of current and future surprises can be coupled with display and alerting machinery.

21 Claims, 36 Drawing Sheets

U.S. PATENT DOCUMENTS

| | | | |
|---|---|---|---|
| 5,603,054 | A | 2/1997 | Theimer et al. |
| 5,611,050 | A | 3/1997 | Theimer et al. |
| 5,751,245 | A * | 5/1998 | Janky et al. ............ 342/357.07 |
| 5,812,865 | A | 9/1998 | Theimer et al. |
| 5,945,985 | A | 8/1999 | Babin et al. |
| 6,321,158 | B1 | 11/2001 | DeLorme et al. |
| 6,466,232 | B1 | 10/2002 | Newell et al. |
| 6,513,046 | B1 | 1/2003 | Abbott, III et al. |
| 6,549,915 | B2 | 4/2003 | Abbott, III et al. |
| 6,735,549 | B2 * | 5/2004 | Ridolfo ...................... 702/181 |
| 6,747,675 | B1 | 6/2004 | Abbott et al. |
| 6,791,580 | B1 | 9/2004 | Abbott et al. |
| 6,801,223 | B1 | 10/2004 | Abbott et al. |
| 6,812,937 | B1 | 11/2004 | Abbott et al. |
| 6,842,877 | B2 | 1/2005 | Robarts et al. |
| 6,879,969 | B2 * | 4/2005 | Engstrom et al. ............. 706/20 |
| 7,006,866 | B1 * | 2/2006 | Deco et al. ..................... 607/5 |
| 7,069,258 | B1 * | 6/2006 | Bothwell ..................... 706/21 |
| 7,103,470 | B2 * | 9/2006 | Mintz ......................... 701/117 |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0026278 | A1 * | 2/2002 | Feldman et al. ............. 701/117 |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2003/0009270 | A1 * | 1/2003 | Breed .......................... 701/29 |
| 2003/0046401 | A1 | 3/2003 | Abbott et al. |
| 2003/0069683 | A1 * | 4/2003 | Lapidot et al. ............. 701/117 |
| 2003/0154476 | A1 | 8/2003 | Abbott, III et al. |
| 2004/0098194 | A1 * | 5/2004 | Baur et al. .................. 701/209 |
| 2004/0122702 | A1 | 6/2004 | Sabol et al. |
| 2005/0034078 | A1 | 2/2005 | Abbott et al. |
| 2005/0065711 | A1 * | 3/2005 | Dahlgren et al. ............ 701/117 |
| 2005/0090938 | A1 * | 4/2005 | Ranelli .......................... 701/1 |
| 2006/0089787 | A1 * | 4/2006 | Burr et al. ................... 701/202 |

FOREIGN PATENT DOCUMENTS

| | | |
|---|---|---|
| DE | 10063763 A1 | 7/2002 |
| DE | 10110549 A1 | 9/2002 |
| DE | 102004015880 A1 | 11/2004 |
| DE | 10336590 A1 | 2/2005 |
| WO | 9800787 | 1/1998 |

OTHER PUBLICATIONS

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

Pawan Lingras, et al. "Traffic Volume Time-Series Analysis According to the Type of Road Use" Computer-Aided Civil and Infrastructure Engineering, Blackwell Publishers, 350 Main Street, Malden, MA 02148, 9 pages.

European Search Report dated Apr. 26, 2007 for European Patent Application Serial No. 05 10 9793, 2 Pages.

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38-No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Commuications of the ACM, Jul. 1993, 1 page, vol. 36-No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

S.D. Bay, et al. (1999). Detecting Change in Categorical Data: Mining Contrast Sets. Knowledge Discovery and Data Mining, pp. 302-499.

D.M. Chickering, et al. (1997). A Bayesian approach to learning Bayesian networks with local structure. In Proceedings of Thirteenth Conference on Uncertainty in Artificial Intelligence, 80-89.

D. Heckerman, et al. (1995). Learning Bayesian Networks: A Unification for Discrete and Gaussian Domains. Proceedings of UAI 95, pp. 274-284.

E. Horvitz, et al. (1995) Display of Information for Time-Critical Decision Making. Proceedings of the Eleventh Conference on Uncertainty in Artificial Intelligence. Morgan Kaufmann Publishers, 296-305.

M. Meek, et al. (2002). Staged Mixture Modeling and Boosting. Proceedings of the UAI 2002, pp. 335-343.

U. Nodelman, et al. Continuous Time Bayesian Networks for Inferring Users' Presence and Activities with Extensions for Modeling and Evaluation, Microsoft Research Technical Report MSR-TR-2003-97, Dec. 2003.

U. Nodelman, et al. (2003). Learning Continuous Time Bayesian Networks. Proceedings of UAI 2003, pp. 451-458.

D. Robbins, et al. (2004). ZoneZoom: Map Navigation with Smartphones with Recursive View Segmentation, Advanced Visual Interfaces, AVI 2004, Gallipoli, Italy, May 2004.

N. Vandaele, et al. (2002). A Queuing-Based Traffic Flow Model. Transportation Research-D: Transportation and Environment, 5(2), pp. 121-135.

W. Wong, et al. (2003). Bayesian Network Anomaly Pattern Detection for Disease Outbreaks. ICML 2003: 808-815.

* cited by examiner

BUILDING AND USING PREDICTIVE MODELS OF CURRENT AND FUTURE SURPRISES

REFERENCE TO RELATED APPLICATIONS

This application claims the benefit of U.S. Provisional Application Ser. No. 60/628,267 filed on Nov. 16, 2004, and entitled SYSTEM AND METHOD FOR PREDICTION AND PRESENTATION OF ATYPICAL EVENTS. This application is also related to U.S. application Ser. No. 11/171, 063, entitled PRECOMPUTATION AND TRANSMISSION OF TIME-DEPENDENT INFORMATION FOR VARYING OR UNCERTAIN RECEIPT TIMES; U.S. application Ser. No. 11/171,065, entitled METHODS FOR AUTOMATED AND SEMIAUTOMATED COMPOSITION OF VISUAL SEQUENCES, FLOWS, AND FLYOVERS BASED ON CONTENT AND CONTEXT; and U.S. application Ser. No. 11/171,791, entitled TRAFFIC FORECASTING EMPLOYING MODELING AND ANALYSIS OF PROBABILISTIC INTERDEPENDENCIES AND CONTEXTUAL DATA, each filed on Jun. 30, 2005. The entireties of these applications are incorporated herein by reference.

BACKGROUND

Electronic storage mechanisms have enabled accumulation of massive amounts of data. For instance, data that previously required volumes of books for recordation can now be stored electronically without expense of printing paper and with a fraction of space needed for storage of paper. In one particular example, deeds and mortgages that were previously recorded in paper volumes can now be stored electronically. Moreover, advances in sensors and other electronic mechanisms now allow massive amounts of data to be collected in real-time. For instance, GPS systems can determine location of an individual or entity by way of satellites and GPS receivers. Electronic storage devices connected thereto can then be employed to retain locations associated with such systems. Various other sensors and data collection devices can also be utilized for obtainment and storage of data.

Collected data relating to particular contexts and/or applications can be employed in connection with data trending and analysis, and predictions can be made as a function of received and analyzed data. Such prediction is, in fact, human nature, and individuals frequently generate such predictions. For instance, a person traveling between a place of employment and a place of residence can determine that during certain times of day within weekdays traffic conditions are subject to high levels of congestion. Thus, prior to leaving a place of work, an individual can predict when and where one will most likely be slowed in traffic, and can further predict how long they will be subject to congestion. The individual's predictions can further be a function of other variables, such as weather, whether a day is a holiday, events that are geographically proximate, and the like. Thus, when an individual has access to contextual information and has access to (e.g., by way of memory) historical data, the individual can generate predictions.

Predictive models utilized on computer systems can often produce more accurate predictive results than a human, as computer systems may have access to a substantial amount of data. For instance, a computer application can have access to data that represents traffic patterns over twenty years, whereas an individual may have experienced traffic patterns for less than a year. These predictive models can be quite effective when generating predictions associated with common occurrences. Predictive models, however, can flood an individual with predictions and/or information, including superfluous information that the individual can readily predict without aid of a model. In one example, an individual is not aided when a predictive model informs the individual that traffic will be congested during rush hour within a large city, as the user can readily make such prediction accurately without utilization of the model.

Furthermore, predictive models can fail when associated with events that are atypical. Reasons for failure can include lack of understanding of a situation, lack of contemplation of a situation, infrequency of occurrence of an event, and a variety of other factors. Alerting an individual of a surprising event, however, is more critical than alerting the individual of a typical event, because (as alluded to above) such individual may very well have predicted the typical event without aid of a predictive application. Conventionally, however, there is no suitable mechanism for determining what amounts to an anomalous event and/or alerting the individual of occurrence of an anomalous event.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter provides systems and methods for utilizing a predictive model component to generate predictions relating to various applications. More specifically, a predictive model can be employed to predict occurrence of atypical events. In one particular example, the predictive model can be employed to predict traffic patterns in a particular range (e.g., a city). Data can be collected from sensors associated with roadways, contextual data such as day of week, time of day, and the like, whether there are events within defined range (e.g., sporting events), whether a day under consideration is a holiday, weather conditions, current traffic conditions, previous traffic conditions, as well as other suitable data relevant to a traffic-pattern predictive application. While traffic patterns are one exemplary application, aspects of the claimed subject matter can be employed in various contexts. For instance, lines at an amusement park, stock market prediction and analysis, sales analysis of items or a plurality of items at various sales locations, and the like are exemplary contexts in which one or more aspects of the claimed subject matter can be employed.

In one example, an atypical event can be defined as one that a human would not expect to occur given current contextual data. For instance, an accident can occur at one part of a city, and an individual typically will not expect such accident to affect traffic patterns at a disparate part of a city. The predictive model, however, can learn that the accident together with other data (e.g., a particular weather pattern, an occurrence of a sporting event, . . . ) can cause traffic pattern alterations in a disparate portion of the city. These alterations can be an abnormal occurrence; for instance, at given times a probability of occurrence of the predicted event can be below a predefined threshold. Thus, when such an abnormal event is predicted by the predictive model, it can be displayed to a user as an atypical event.

There are various manners in which anomalous or atypical events can be defined. For instance, an atypical event can be defined as an event associated with a probability of occurring or not occurring above or below a pre-defined threshold. Case libraries can be generated that support such definitions, and the predictive model can be built as a function of the case libraries. In another example, events can be associated with probabilities of occurring, and anomalous events can be defined as events that are associated with probabilities that are a threshold number of standard deviations away from a mean probability. It can be determined that any suitable manner for defining anomalous events is contemplated.

In another example, two disparate predictive models can be utilized in connection with predicting future atypical events. A first model can correlate to user expectancies; in other words, the first model can receive and contemplate data in a manner similar to how a human would contemplate the data. For instance, a similar extent of data and similar relationships between variables in data can be contemplated by the first model when compared to a typical human. A second model can perform a more robust analysis of data by contemplating vast amounts of data and complex interdependencies between variables therein. Thus, given similar contextual data, the two models can output vastly disparate predictions. A difference analyzer can compute a measure of difference between the output predictions, and if the computed measure of difference is above a threshold the prediction output by the robust model can be output as a prediction of an atypical event.

In accordance with still yet another aspect described in more detail herein, a utility analyzer can be employed in connection with a predictive model to determine whether a predicted event is of sufficient interest to a user. For instance, the utility analyzer can calculate a measure of utility associated with a predicted event. More specifically, the predictive model can predict that atypical congestion will exist at a portion of a roadway not typically traveled by a user—thus, there will be little utility in providing the user with information relating to such portion. The calculated utility can be a function of historical data, user context, user feedback, and the like.

To the accomplishment of the foregoing and related ends, certain illustrative aspects are described herein in connection with the following description and the annexed drawings. These aspects are indicative, however, of but a few of the various ways in which the principles of the claimed subject matter may be employed and such subject claimed subject matter is intended to include all such aspects and their equivalents. Other advantages and novel features may become apparent from the following detailed description when considered in conjunction with the drawings.

DETAILED DESCRIPTION

Figure 1:
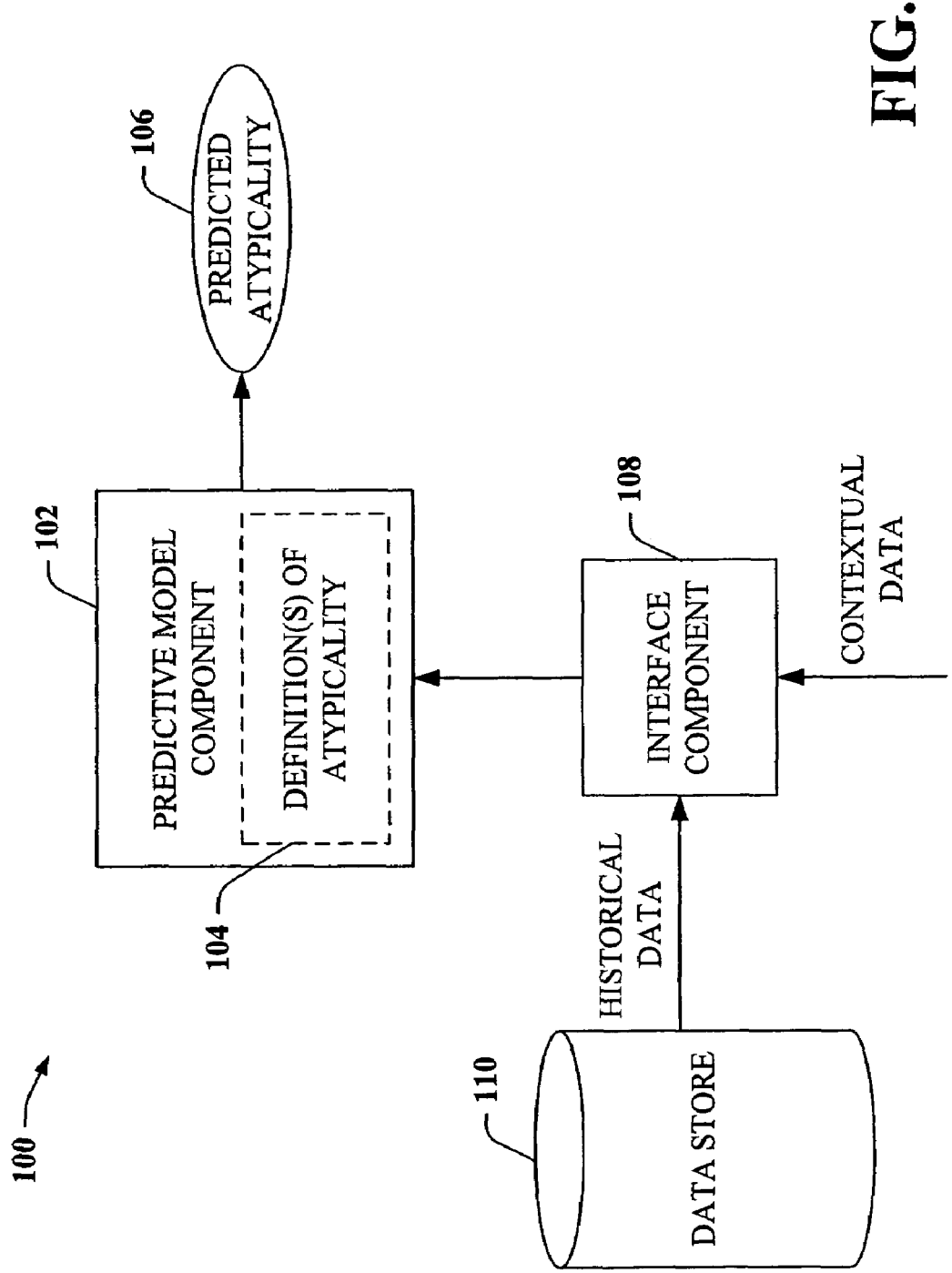
FIG. 1 is a high-level block diagram of a system that facilitates recognizing atypical events and generating predictions of atypical events that will occur in the future.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Predictive systems (e.g., explicitly and/or implicitly trained classifiers) can be employed in connection with performing inference and/or probabilistic determinations and/or statistical-based determinations as described hereinafter. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, the claimed subject matter may be implemented as a method, apparatus, or article of manufacture using standard programming and/or engineering techniques to produce software, firmware, hardware, or any combination thereof to control a computer to implement the disclosed invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

The claimed subject matter will now be described with respect to the drawings, where like numerals represent like elements throughout. Referring now to FIG. 1, a system 100 that facilitates informing a user or an entity of an atypical occurrence is illustrated. The system 100 can be utilized for recognizing and informing an individual of existence of an atypical situation and/or can be employed to predict future occurrence of an atypical situation and inform the individual thereof. The system 100 includes a predictive model component 102 that can recognize and output of atypical events as well as predict occurrence of future atypical events, wherein atypicality can be defined in a variety of manners. The predictive model 102 includes definition(s) of atypicality 104 that are utilized in connection with recognizing prediction and/or occurrence of atypical events. The definition(s) of atypicality 104 can be created in a plurality of disparate manners. For instance, the definition(s) of atypicality can be associated with probabilities relating to occurrence of a particular event. More specifically, a presently occurring event and/or an event predicted to occur by the predictive model component 102 can be associated with a relatively low probability of occurrence and/or a relatively low probability of not occurring (e.g., there may be a relatively low probability that traffic will not be congested during rush hour). In one example, if an event associated with a sufficiently low (e.g., below a threshold) probability of occurrence is sensed as actually occurring (e.g., by way of sensors or other suitable data generating/receiving devices), the predictive model 102 can output occurrence of an atypical event to a user. Thus, sensed events that typically do not occur can be relayed to the user. Similarly, events that are predicted to occur by the predictive model component 102 can be associated with a probability of occurrence. If this probability lies outside a probability distribution of the event actually occurring or below a threshold probability, a predicted atypicality 106 can be provided to a user.

In accordance with another example, the definition(s) of atypicality 104 can be a function of a comparison of outputs between two disparate predictive models within the predictive model component 102. For instance, the predictive model component 102 can include a user-expectancy model (not shown) that is designed to generate predictive outputs substantially similar to prediction(s) output by a user. Thus, such user-expectancy model can consider data to an extent that a typical user (or a specific user) contemplates data, and generate predictions as a function of such data. The predictive model component 102 can further include a robust predictive model that can utilize more extensive amounts of data and can contemplate interdependencies between variables determined upon analysis of such data, wherein the interdependencies are not contemplated by a typical user. Thus, predictive outputs of a robust model can differ substantially from predictive outputs of a user-expectancy model, and the definition(s) of atypicality 104 can be a function of such differences. Furthermore, outputs of a user-expectancy predictive model and a robust predictive model can be associated with a probability of correctness, and such probabilities can be utilized in connection with the definition(s) of atypicality 104.

To generate future predictions of atypical events, the predictive model component 102 receives contextual data and historical data by way of an interface component 108. For example, contextual data can be received by the interface component 108 by way of sensors, speech recognition components, or any other suitable mechanisms that can obtain and/or generate contextual information. A type of received contextual data can be based upon designed utilization of the predictive model component 102. For instance, if the predictive model component 102 is utilized for predicting traffic patterns, then contextual data can relate to current congestion in particular regions of roadway, weather conditions, existence and location of accidents, time and duration of an event (such as a sporting event, concert, . . . ), and other data relevant to traffic. In another example, if the predictive model component 102 is utilized to predict anomalous occurrences within the stock market, the contextual data can relate to current value of stocks, price to earnings ratios of stocks, and any other suitable contextual data associated with the market.

Historical data received by the interface component 108 and employed by the predictive model component 102 to output a prediction of an atypical event can exist within a data store 110 (or a plurality of data stores). The data store 110 can be existent upon a server and pulled from the data store 110 by the interface component 108 given receipt of related contextual data. Furthermore, the contextual data can be stored in the data store 110 upon receipt thereof to enable utilization of such data at a later time (and thus improve operability of the predictive model component 102. For instance, the data store 110 can be resident upon a client together with the predictive model component 102. Therefore, when contextual data is received by the interface component 108 it can be directed to the data store 110 for later utilization by the predictive model 102.

Referring again to the predictive model component 102, such component 102 can be built by way of various modeling techniques and can utilize one or more modeling techniques to output predicted atypicalities. In one example, the predictive model component 102 can be built by way of and/or include a Bayesian network and employ various machine learning techniques to optimize predictions output therefrom. Bayesian networks are directed acyclic graphs of nodes that represent variables and arcs that represent dependence relations between nodes (variables). Thus, for example, if an arc exists from a first node to a second node, then the first node is said to be a parent of the second node. If the node is associated with a known value, it is referred to as an evidence node. Nodes can represent any suitable type of variable—for instance, nodes can represent observed measurements, parameters, latent variables, or hypothesis. Thus, in drawings described herein, nodes can represent contextual data such as day of week or time of day, as well as status of a variable, duration of status of a variable, etc. Machine learning refers to an area of artificial intelligence concerned with development of techniques that allow computers to "learn". More particularly, machine learning can relate to methods for creating and/or modifying computer programs based at least in part upon an analysis of data set(s). Thus, if collected data shows that a certain portion of a road is blocked at a particular amount of time at a certain time on specific days, the predictive model component 102 can watch such blockage and refine and optimized predictions based upon this pattern.

Enabling optimal/desirable operation of the predictive model component 102 necessitates a massive amount of data. Referring as an example to prediction of stock market behavior, data relating to individual stocks, indexes, mutual funds, location of companies, officers of corporations, and the like can be collected and utilized by the predictive model component 102. Moreover, data such as weather conditions (collected from web sites, a radio station, or other suitable source), calendar information (such as day of week, month, and the like), proximity of a day to particular holidays, and any other data that may be related to the stock market can be collected. The collection can occur through websites, through translation of natural spoken language, through sensors, user input, or any other suitable manner. Again, it is to be understood that predicting stock market activity is merely one exemplary application in which one or more aspects of the claimed subject matter can be employed—various aspects, including traffic analysis, are contemplated by the inventor and are intended to fall under the scope of the hereto-appended claims.

Discussing with more specificity atypical or anomalous events, such events/occurrences can be defined as unexpected or surprising events to a user. The system 100 can utilize representational, inferential, and decision making methods that can be employed to forecast atypical or anomalous events/occurrences that arise at future times. The system 100 can apply to prediction of atypical outcomes in a context, atypical failures of a system's or person's ability to understand, solve, or predict future problems as a function of encountering unexpected situations or incompetencies in one's own abilities to face the future based on sensed or observed situations, etc. Learning and reasoning about future atypical events can also extend to learning and reasoning about future unmodeled situations. In addition, outcomes or situations that are considered to be significantly atypical often have a substantial influence (positive or negative) on utility of an observer who is surprised by the unexpected or unmodeled event. To briefly summarize, atypical events/occurrences can be identified explicitly but are not expected to occur, or are not expected to occur within a threshold probability, or are events/occurrences not modeled or reasoned about (e.g., they lie outside a scope of what is being modeled). In practice, many events can occur that are not considered explicitly; however, when such events occur they can influence utility of one or more agents, and are therefore considered atypical or anomalous.

Now referring more specifically to the definition(s) of atypicality 104, such definition(s) 104 can be based at least in part upon relatively simple rules, such as "a future atypical instance occurs when something occurs in the future of some consequence positive or negative to the observer that the observer did not expect to happen" or did not ever represent nor think about as feasible because of biases in reasoning about typicality coupled with representational and computational limitations. Other possible definitions of future atypical instances include an occurrence of a situation that an observer or automated reasoning system had represented implicitly or explicitly but had assigned a likelihood smaller than a probability threshold x of occurring. Such probability thresholds can be created as functions of an event type or implications of an event. Observers or computing systems can assess, represent, or implicitly leverage a probability distribution over disparate probabilities of an event.

In one exemplary approach, the predictive model component 102 (which can include a plurality of models) can include statistical machine learning methods such as Bayesian network models, statistical classifiers, and/or neural net methods constructed by way of structured search and parameter optimization to design models that can best explain data about atypical instances. In one exemplary creation of the predictive model component 102, a case library capturing cases or situations where outcomes are defined as atypical in the context of an observer model can be built and analyzed. Such training sets (the case library) will differ depending on the events and the definition of an atypical or anomalous event.

Given a case library (not shown) of sets of observations at some time t0 about a situation, whether or not events at some future time t>t0, or, for instance, within segments of time t3-t5, in the future are defined as atypical or anomalous can be considered. The predictive model component 102 can thus be built to forecast surprises, at different future times, as a function of data within the case library. Such model component 102 can be focused only on events that have some positive or negative influence on utility greater than some thresholds or different thresholds depending on the type of event. Models of future atypicality can be defined and focused based on a nature of mean costs associated with the atypical instance and/or of atypically costly outcomes that can be avoided if action is taken in advance. Analogously, the predictive model component 102, designed as an atypical or anomalous instance forecasting system, can include models that forecast potentially beneficial surprises, for which actions could garner or further enhance a positive nature associated with a benefit or unexpected benefits coming from outcomes. In a competitive situation, decision models coupled with the expectations of an adversary could be used to generate surprises or negative surprises for an adversary, or surprising situations that tend to have benefits for allies and costs for adversaries.

In building the predictive model component 102 by way of accumulated case libraries, such libraries can be focused on only atypical future events that are considered to likely influence the utility of an observer in a negative way, or can be focused only on future events that will likely influence users in a positive way. The events can focus on surprises of either likely negative or positive kind. The events can also be of poorly characterized utility—as a number of events can be simply surprising to a set of observers, such as the discovery of intelligent life from another solar system in a time in the future. Surprising events also include those not linked to the observers' utility, but can be linked by way of the utility of others, where a surprise is partly defined by empathetic reflection. For example, an observer may find it surprising to learn that at a future time a pandemic has killed several million people in Southeast Asia.

As an example of a model of atypicality, second-order probability distributions on beliefs about a long-term probability can be considered by the system 100 and/or the predictive model component 102 in reasoning about atypical events/conditions. For example, a Beta distribution can be used to model the probability distribution over different long-run probabilities of a series of flips of a coin of unknown properties. An atypical instance about the long-term probability can be defined in terms of a current mean and sample size, which yields a probability distribution over the mean that may be tight, or have increasingly large variances, capturing a lessening of confidence in the long-term probability given prior observations. An atypical or anomalous future outcome can also be defined in terms of a current probability distribution over long-term probabilities, where a system is more surprised in situations where one or more outcomes (e.g., a series of outcomes of a coin flip) has a mean probability that is represented as having a probability of lower than some threshold probability, in the context of a current probability distribution over the long-term probabilities.

In a general machine learning approach to building and using the predictive model component 102 to predict atypical or anomalous events and/or occurrences, the system 100 can model future surprising events or anomalies by considering cases of unexpected outcomes in a future time, defined as some number of minutes in the future, coupled with the observations in the present time. To build the predictive model component 102, a case library can be constructed and models can be built and tested with holdout data to probe the predictive accuracy of atypical instance forecasting.

As an example for defining expectation and atypicality in one approach, probability distributions over scalar-valued variables defining events of importance can be employed by the predictive model component 102 to define atypical outcomes. For example, traffic volumes that influence flows at different potential bottleneck regions of a city's highway system can be considered. If the probability distribution of volumes at each potential bottleneck at a time 30 minutes from observation time is represented and conditioned on a set of influencing variables, such as one or more statistics on recent history of traffic flows for that bottleneck and other bottlenecks as well as the time of day and day of week, holiday status, and other potentially important influencing variables such as the status of accidents and their time and degree throughout the highway system, construction status, weather and visibility, and start and end of major events like sporting games, ballet, and theater, a probability distribution over the flows of bottlenecks for different contextual situations, captured by the settings of the variables, can be recorded and encoded.

In one exemplary creation of the predictive model component 102, a central tendency as a model of expectation of an observer, given the probability concentrated in this region, can be utilized. Thereafter a case library of cases where the outcome was a much lower or higher volumes can be built. More specifically, cases can be identified where there are unexpected or surprising volumes of traffic, where volume is some number of standard deviations higher and lower than the mean—and such identified cases can be considered atypical. The predictive model component 102 can therefore include a predictive model of cases where there is likely to be such a situation, as a probabilistic model of surprise.

Thus, in another example relating to traffic, an assumption can be made that commuters traveling through regions of potential bottlenecks may have an expectation based on a mean or central mass of the probability distribution at some target number of minutes in the future based on current observations. Thus, an "observer's" model of expectations, which can be included within the predictive model component 102, might be encoded as a mean +/− a standard deviation. In a more sophisticated model that can be employed within the predictive model component 102, the differences in inferential abilities or evidence considered in the aforementioned observers model can solely be considered explicitly. For example, for the observer's model, the means and variances associated with a few basic contextual pieces of evidence can be considered, such as time of day and day of week, and the consideration of subtle sets of findings that may interact to produce atypical flows can be removed. To pick anomalous cases for training, cases associated with very high and very low flows at different points in the future can be selected, and all observational variables at a current time in a training set for machine learning of models that can predict atypical instances can be noted.

Focusing on the example, an observer's model, for example, can consider the volume of traffic at a potential bottleneck region in 30 minutes to be a function of a set of observations now and the last 30 minutes based on the following function:

$$\text{Volume in 30 minutes} = f(\text{volume Bottleneck 1 now (bn1), time of day, day of week}).$$

This information is encoded as a mean and standard deviation. The predictive model component 102, however, can undertake a more sophisticated analysis that allows consideration of additional variables and their dependencies, and can encode the volume as a Bayesian network, as in the following:

Volume in 30 minutes at Bottleneck 1 now (bn1)=$f$(volume bn1-bn30 now, volume trend bn1-bn30 last 30 min, time of day, day of week, volume in 30 minutes to include, basketball game start time status, holiday status, precipitation status)

If both the observer's model and the predictive model component 102 are executed on received observations, predictions generated relating to the bottleneck in 30 minutes can be very different, and such differences can be employed to determine instances where the predictions in 30 minutes will likely surprise an observer. In a second approach, a set of cases where a user would have been surprised can be encoded, and the predictive model component 102 can directly encode atypical situations for an observer based at least in part upon a set of findings. Thus, the predictive model component 102 can discover that certain settings of interdependent variables lead to "surprising" (e.g., atypical or anomalous) status of variables from the point of view of simpler model of mean and standard deviation. Surprising real-world events predicted by the predictive model component 102 can be constructed, and compared to expected outcomes predicted by an observer at a future time of interest (e.g., 15 minutes from now, 30 minutes from now, 1 hour from now, or within time t from now), and models of surprise via machine learning to build predictive models of surprise can be constructed.

In yet another approach, models that do not reason about specific types of events directly but about higher-level properties of surprises, atypicalities, and/or anomalies conditioned on occurrence thereof can be employed in connection with the predictive model component 102. For example, whether an atypical instance within some time frame, should it come, will be of a particular class can be predicted. As an example, data associated with properties of atypical events of the highest degree that had occurred within a past year with respect to an observer can be collected, and statistics relating thereto can be employed as a model for reasoning about potential atypical instances in the future. For example, a set of properties associated with events that were the top n most atypical events of each of the past 10 years, in private or public realms, can be assessed. These marginal statistics can be utilized to order properties of future atypical instances should they occur. For example, "involves a group of coordinated activities that had been cloaked from view," "involves financial instruments that had not been modeled explicitly," etc.

Machine learning can be utilized also to reason about future situations that are associated with outcomes that will be especially challenging or difficult, as possible outcomes may have not yet been modeled or situations can exist where the predictive model component 102 can determine that it is incompetent in certain circumstances. By way of an aforementioned approach, situations can be captured where an outcome was discovered to not be explicitly modeled within the predictive model component 102 or other models or that a system failed in a surprising manner. A case library of cases about a forthcoming likely failure like this can be analyzed in connection with such utilization of machine learning. For building a predictive model of forthcoming unmodeled situations or incompetencies based in the poor handling of unmodeled situations, or simply identifying unmodeled situations, a case library of situations of forthcoming unmodeled situations or poor responses can be built, and later occurrences of such situations can be predicted by way of the predictive model component 102. Predictive power of the constructed predictive model component 102 can be tested by way of constructing the predictive model component 102 from a training set of cases, and testing predictive power of the model component 102 against set test data retained for such purpose.

Another approach to building the predictive model component 102 while contemplating unmodeled situations is to construct the predictive model component 102 with an ability to predict that there will be a failure to predict the future, so as to inform a user or system when a prediction output by the predictive model component 102 is not likely to be correct. Machine learning can be employed to identify such a situation by noting sets of observations or states associated with an inability to predict the future. Such models of future surprise, atypicality, anomalies, unmodeled events, or, more generally, situations that will not likely be handled well by a system or person can be utilized to warn people or automated systems that there is likely to be an unexpected, confusing, or unmodeled situation coming up based on current observations and historical data. Having knowledge about the likelihood of such situations approaching in the future, even when uncertain, can warn an individual or system when they may wish to be ready for a surprising or substantially challenging situation, so as to enable choice of an alternate context or situation.

The predictive model component 102 can be further used to guide or promote situations where a person or system may be placed in unexpectedly valuable situations under uncertainty. Displays can be driven to alert of information-based prediction of an atypical event by the predictive model component 102. These displays can assume that people or systems have default expectations and there's no reason to alert them unless it is likely that something is or will be surprising to the user in the future. On alerting systems, as an example, referring again to the traffic prediction application, individuals can be alerted as to when they can expect traffic volumes to be surprisingly lighter or heavier along routes of interest for times of interest in the future. These individuals may not wish to be alerted with respect to traffic conditions the individuals come to expect (as determined by a observer-based model of expectancy). As another application, based on inferences about a future forecast that is surprising users can be alerted to begin a trip earlier or later within the constraints of arriving at a distant location by some time. In another example, the predictive model component 102 can be employed within an alarm system and can awake a user from sleep later or earlier in the morning given prediction of an atypical or anomalous event that affects the user. In yet another example, a user can be informed of an upcoming predicted surprising rise or drop in value of a stock, mutual fund, or the like.

The predictive model component 102 can include models (not shown) that provide predictions about an ability of the predictive model component 102 to accurately predict atypical or anomalous events/occurrences in the future. Thus, the predictive model component 102 can automatically highlight the accuracy of a prediction, or can determine instances in which to distrust a prediction, thereby enabling a user to rely less on the prediction in preparing for the future. A robotic system may wish to use a model for forecasting unmodeled or surprising events coming up on the current path or trajectory, or extra challenging situations where it will likely be incompetent, per the inferences of a predictive model of unmodeled events, or of inability to predict, or of surprising failure, so as to select an alternate approach or path, where it is less likely going to face a surprise or challenge.

Figure 2:
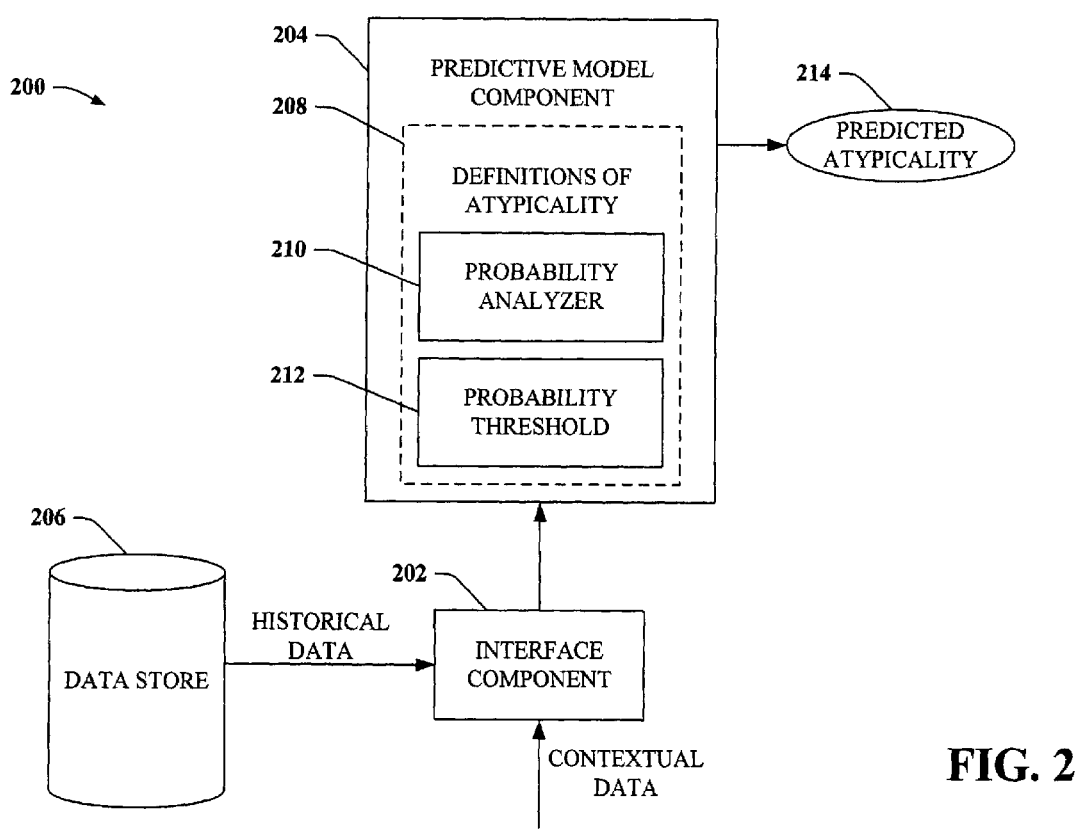
FIG. 2 is a block diagram of a system that facilitates analyzing probabilities associated with predicted events in connection with outputting a predicted event as a predicted atypical event.

Now turning to FIG. 2, a system 200 that facilitates output of current atypical events and output of predicted future atypical events is illustrated. The system 200 includes an interface component 202 that receives contextual data as well as historical data, and is communicatively coupled to a predictive model component 204 that can receive the contextual data and the historical data. The contextual data can be received from sensors, from user input, from information gathering mechanisms, etc., and the historical data can be retrieved from a data store 206. While shown as a single data store, the data store 206 can be a distributed data storage system including multiple data stores. The data store 206 can be existent upon a server, a client, and/or allocated between a server and a client as a function of efficiency.

Upon receipt of the historical data and the contextual data, the predictive model component 204 can analyze such data and output occurrence of an atypical event and/or output an atypical event that is predicted to occur at some point in the future. The predictive model component 204 utilizes definitions of atypicality 208 in connection with recognizing an occurring atypical event and/or predicting a future atypical event. In a case of an occurring atypical event, contextual data received by the predictive model component 204 can indicate that an atypical event is currently occurring. For instance, sensors in a roadway can determine that a significant number of automobiles are traveling at a speed that is far below a normal speed of travel at a day and time when traffic congestion is not typical. The predictive model component 204 can receive data from the sensors and, by way of the definitions of atypicality 208, recognize that an atypical event is occurring. In another example, the contextual data can indicate that a stock is rising or dropping in value at a rate much greater than typical rates of change (which can be determined by analyzing the historical data or be defined within the definitions of atypicality 208).

With respect to atypical events that are predicted to occur at some point in the future, contextual data and historical data can be received by the predictive model component 204 and analyzed to recognize patterns and/or traverse interdependencies between variables to predict a future event. In one example, if there are no accidents on a series of roadways on a Saturday afternoon in a summer month, then historical data can indicate that there is likely to be no congestion on a particular road. The predictive model component 204 can make such a prediction but not output the prediction, as uncongested roadways on a Saturday afternoon would not be an atypical event (e.g., the predicted event does not correspond to the definitions of atypicality 208). Thus it is understood that the predictive model component 204 can generate predictions of typical events, and can also recognize and predict atypical events that will occur in the future by analyzing contextual data and historical data in light of the definitions of atypicality 208.

In one example, predictions undertaken by the predictive model component 204 can be associated with a calculated probability of correctness. This probabilistic analysis can enable the predictive model component 204 to output predicted events that are associated with a threshold probability of actual occurrence. This threshold can be refined by a user according to the user's ability to endure speculation and the user's desire/ability to act on predicted events associated with particular probabilities of occurrence. Furthermore, this threshold probability of correctness can alter according to a particular context. For instance, a user may be able to more aptly handle predictions associated with lower probabilities of correctness when located in a particular geographic location and/or at specific times of day. Moreover, the threshold probability of correctness can alter as a function of a predicted event. In one example, the probability threshold can be relatively low with respect to predictions relating to a first collection of stocks while the probability threshold can be higher with respect to a second collection of stocks.

In accordance with another example, a probability analyzer 210 can be utilized in connection with the predictive model component 204 as a manner in which to determine whether an event corresponds to the definitions of atypicality 208. For example, events can be associated with a probability of occurrence with respect to the past (e.g., there can be a seventy-five percent chance of snow on a particular date, there can be a five percent chance that a value of a particular stock will rise or drop a certain amount within a given window of time, . . . ). The probability analyzer 210 can be aware of such probabilities and/or calculate such probabilities by way of analyzing the historical data. In more detail, an event predicted with a probability of correctness over a defined threshold can be received by the probability analyzer 210. The probability analyzer 210 can analyze such event in connection with user expectancies (e.g., from a user-perspective, what is the probability that the predicted event will occur). The probability analyzer 210 can then compare the probability of occurrence of a predicted event (as a function of historical data) with a probability threshold 212. If there is a defined deviation between such probabilities, then the predicted event can be output as a predicted atypicality 214. In another example, if a probability of occurrence of a predicted event lies outside a defined distribution, the predicted event can be output as a predicted atypicality. Similar analyses can be undertaken with respect to a current event, wherein the probability analyzer 210 can calculate probabilities associated with user expectancies of a currently occurring event.

Figure 3:
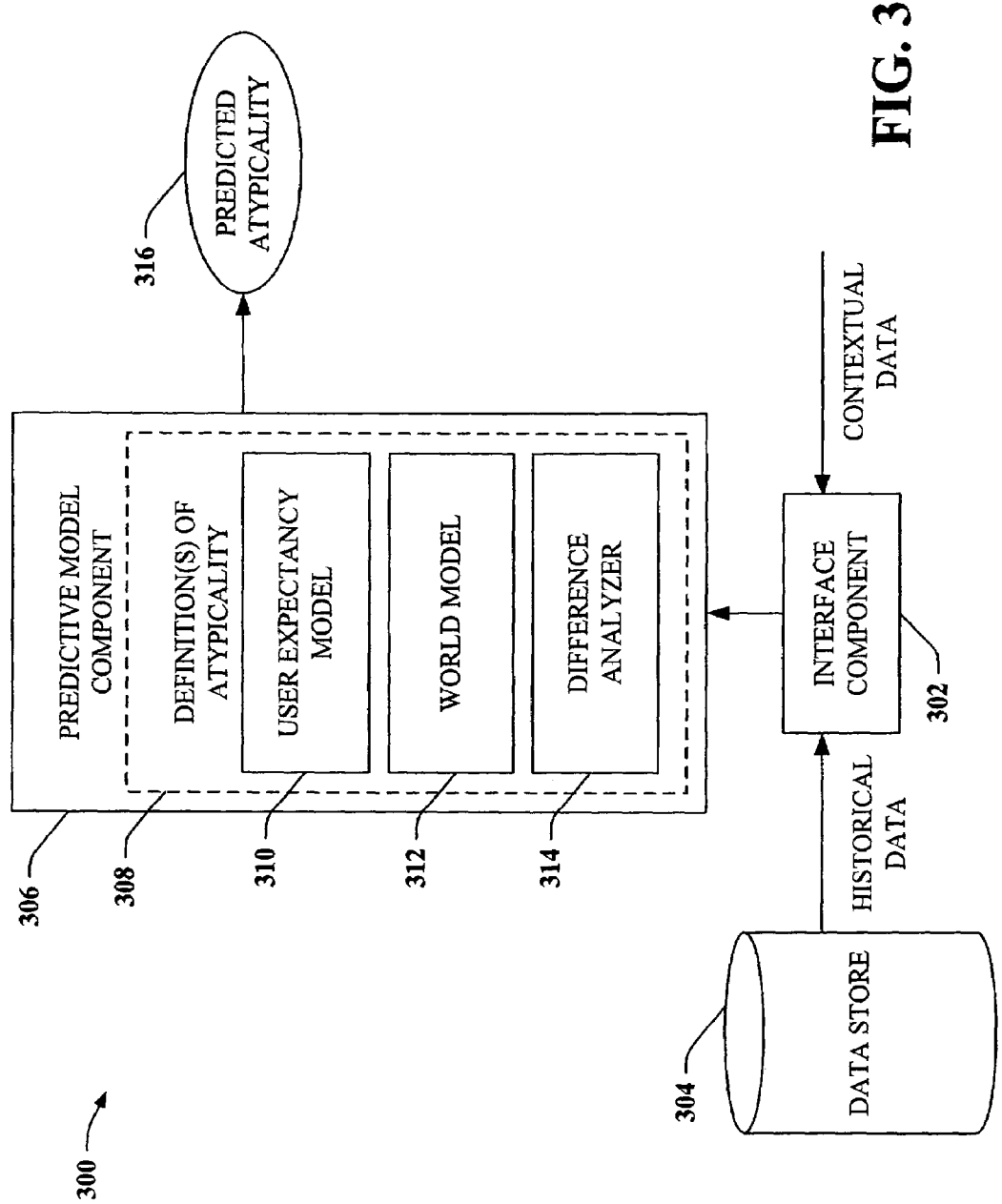
FIG. 3 is a block diagram of a system that facilitates comparing output of a robust predictive model and a user expectancy model in connection with categorizing an event as an atypical event.

Turning now to FIG. 3, a system 300 that facilitates predicting future atypical events and outputting such events is illustrated. The system 300 includes an interface component 302 that receives and/or collects contextual data and historical data for utilization in recognizing and predicting atypical events. For instance, the historical data can exist within a data store 304. The data received by the interface component 302 can then be relayed to or received by a predictive model component 306, which can recognize occurring atypical events as well as predict occurrence of future atypical events. The predictive model component 306 can utilize definition(s) of atypicality 308 to recognize and/or determine when a predicted event can be categorized as an atypical event.

In one example, a user expectancy model 310 can be employed in connection with determining whether an occurring event or a predicted event can be categorized as an atypical event. In particular, the user expectancy model 310 can be designed to receive contextual data and historic data and output a prediction that is consistent with a prediction that would be made by a human user. The user expectancy model 310 can be designed for a particular individual, can be designed as a community model, etc. Again, the user expectancy model 310 can be generated to correspond to human modes of predicting events by way of contemplating variables and interdependencies therebetween in a manner similar to how a user would contemplate such variables. Therefore, types of variables, amount of historical data, and the like can be contemplated by the user expectancy model 310 in a manner similar to human contemplation.

In further detail with respect to the user expectancy model 310, such user expectancy model 310 can employ one or more marginal statistical models, thereby capturing overall statistics of situations, (e.g., the mean values of flow of traffic by time of day and day of week) defined by a subset of observations that people might typically be aware of. For example, in a traffic context, a commuter may learn about statistics of traffic congestion on familiar segments of a daily commute based on considerations of time of day, day of week, weather, and whether the day is a holiday. A more sophisticated commuter might also be aware of major sporting events in his or her city, such as a baseball game occurring in a downtown park. Thus, for some individuals, the user expectancy model 310 can include sporting events. A user familiar with a sporting events schedule might not be surprised by traffic at particular times of day and days of week, when a particular major sporting event is occurring. However, a user unfamiliar with the sporting schedule might be surprised by traffic when a sporting event occurs. Thus, the user expectancy model 310 (employed to predict expectations and surprise) can differ depending on the user. Accordingly, different models in a surprise prediction system can be made available depending on the person.

In one exemplary approach, a user of the system 300 can select an appropriate user expectancy model from a plurality of user expectancy models. In another approach, machine learning and a case library of user feedback can be employed to build the user expectancy model 310 (which can be utilized in connection with predicting when a user would be surprised). In any event, it is desirable to predict when a user would be surprised if a current situation in the world was revealed to them. A model of surprise can then be used to make decisions about if and how to alert or display the information to users. In another application, a case library of surprising situations (not shown) can be built, and a stream of observations leading up to the surprises within the case library can be collected. Thereafter, machine learning can be employed to build models that predict future surprises. Predictive models constructed in this way can be used to predict the likelihood that a user will be surprised within some period of time t in the future. For instance, a user can be provided with a likelihood that they will be surprised overall. Beyond the construction and use of models that can be used to simply predict that a user will be surprised, models can be constructed that predict a type of surprise. For example, a model can predict whether a user will be surprised by heavy traffic at one or more locations on his or her commute home where the user would have expected light traffic—or will be surprised with light traffic at locations on a commute when they would have expected heavy jams for the time of day and day of week. In another approach, a user can be told the likelihood that they will be surprised and then, given a surprise, the likelihood of each type of surprise. For example, they can be told, "you will be surprised within 30 minutes about traffic on your way home with a likelihood of 75%, and if you are surprised there will be a 50% chance that you will be surprised by exceedingly heavy traffic and 50% chance that you will be surprised by exceedingly light traffic."

The predictive model component 306 can also include a world model 312 that can contemplate a greater extent of variables as well as more complex interdependencies between variables when compared to the user expectancy model 310. For example, the world model 312 can be designed to utilize capabilities of modern computing systems, including high-speed processing capabilities and data storage capacity. Thus, the world model 312 can analyze a greater amount of variables, can recognize and analyze a greater amount of interdependencies between the variables, and can recognize and understand more complex interdependencies between variables when compared to the user expectancy model 310. Accordingly, the world model 312 can output more accurate predictions—however, such predictions can be in contrast to what a user expects (as output by the user expectancy model 310).

In more detail regarding the world model 312, such model can be learned from a case library of events (not shown). In a traffic example, for each identified bottleneck (congested region), sets of random variables that represent static and temporal abstractions of status of one or more sensed cells within such bottleneck can be created and stored within a case library. The random variables can include a number of regions that are showing blockage or slowing, a time since any cell or portion of a region became blocked within a region, when all portions of a region showed open flow, maximum number of adjacent blocked portions, cells, or regions, etc. A Bayesian structured search (or similar model generating method) can be utilized in connection with generating the world model 312. For instance, given a training dataset, a heuristic search over a space of dependency models using a Bayesian scoring criterion can be utilized to guide a search. A mix of discrete and continuous variables can be utilized in the models, wherein continuous variables can represent times of different events of interest. For each discrete variable, a tree containing a multinomial distribution at each leaf can be created. For each continuous variable, a tree can be constructed in which leaves include a binary-Gaussian distribution; each leaf contains a binomial distribution that represents a probability of a value being present or absent, and a Gaussian distribution over the values that are present. A Bayesian score used for each binary-Gaussian distribution is a sum of the score for the binomial, a special case of the multinomial, and the score for a Gaussian defined over the values that are present in the training data.

The predictive model component 306 can employ a difference analyzer 314 to monitor and analyze differences in outputs predicted by the user expectancy model 310 and the world model 312. Because the user expectancy model 310 and the world model 312 differ in complexity and design, the models can output contrasting predictions given substantially similar contextual and historical data. The difference analyzer 314 can analyze such differences and provide a measure of difference. If the measure of difference is above a threshold measure, then an event predicted by the world model 312 can be output as a predicted atypicality 316.

In accordance with another example, the difference analyzer 314 can compare occurring events (indicated by contextual data) with what a user typically expects as output by the user expectancy model 310. Again, a measure of difference can be calculated between the occurring event and the event predicted by the user expectancy model 310, and if the measure of difference is above a threshold the predictive model component 306 can inform a user that an atypical event is occurring. Thus, the difference analyzer 314 can be utilized in connection with outputting occurring atypical events as well as predicted atypical events.

In yet another example, the user expectancy model 310 can output events that such model associated with a calculated probability of correctness. The world model 312 can then be provided with substantially similar data as well as the event predicted by the user expectancy model 312, and thereafter compute a probability that such event will occur in the future (at a substantially similar time in the future as predicted by the user expectancy model 310). The difference analyzer 314 can then review differences in the probabilities, and if such difference is above a threshold the predictive model component 306 can output the event as a predicted atypicality 316.

Figure 4:
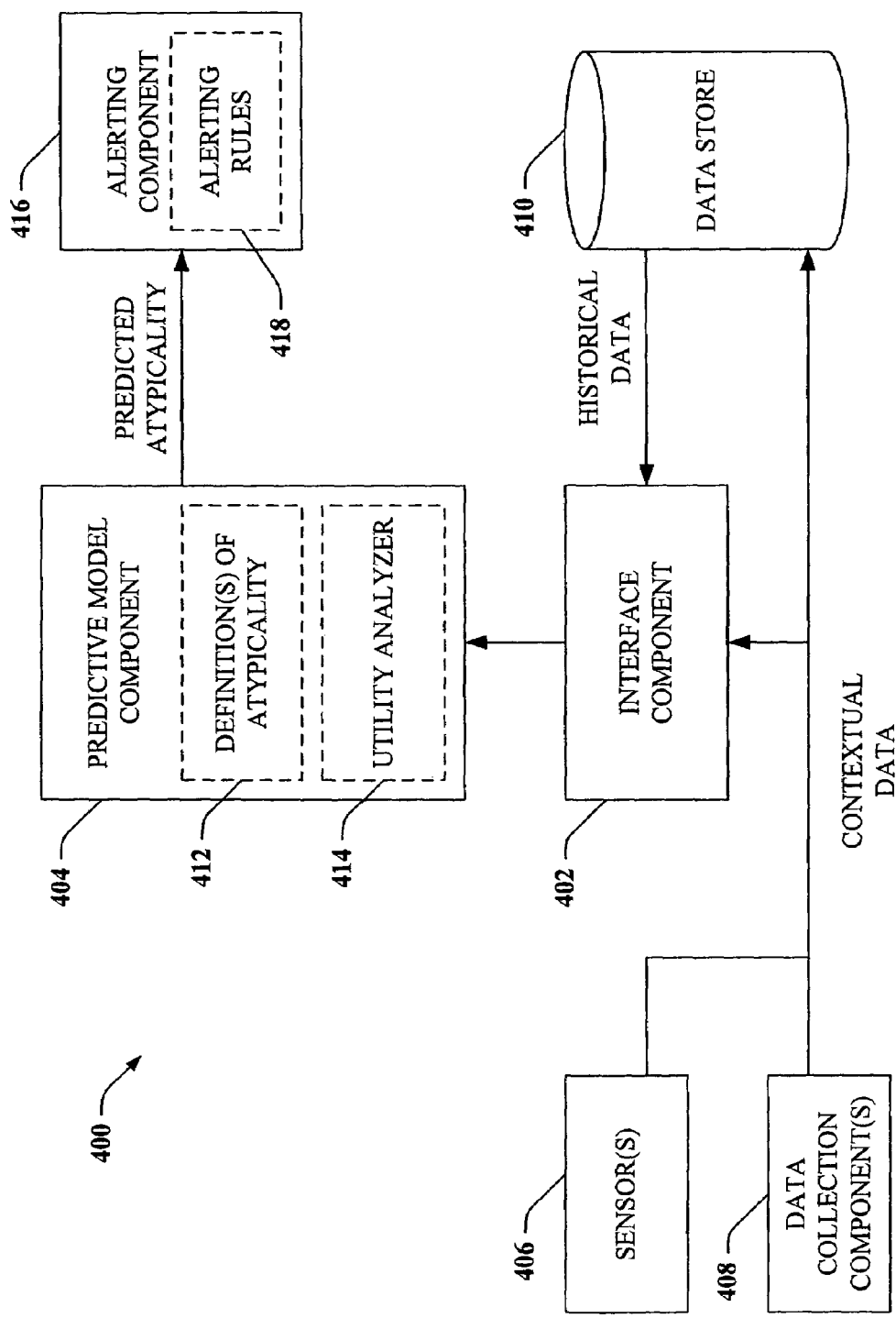
FIG. 4 is a block diagram of a system that facilitates calculating a measure of utility in connection with a predicted atypical event.

Now referring to FIG. 4, a system 400 that facilitates predicting future atypical events is illustrated. The system 400 includes an interface component 402 that receives contextual data and historical data relating to events desirably reasoned about/predicted by a predictive model component 404. For instance, if the predictive model component 404 is designed to output predictions relating to the stock market, then the contextual data can relate to current values of stocks, values of mutual funds, values of indexes, reported earnings for one or more corporations, proximity to fiscal year beginning and end, and other data relating to the stock market. The contextual data can be received by way of sensor(s) 406 and/or data collection components 408. The sensor(s) can be temperature sensors, pressure sensors, video cameras, and the like, and the data collection components 408 can be computer components that can information from information stores (e.g., the Internet), components that can translate radio signals or television signals into a format understood by the predictive model component 404, and any other suitable data collection component. The historical data can be retrieved from a data store 410 (or a plurality of distributed data stores), and contextual data received by way of the sensors 406 and the data collection components 408 can be delivered to and stored within the data store 410. Thus, over time, the predictive model component 404 will have access to a greater amount of data and thus be able to more accurately recognize and predict occurrence of atypical events.

The predictive model component 404 can output predicted atypicalities by generating predictions and thereafter comparing such predictions against definition(s) of atypicality 412. The definition(s) can be explicit (e.g., if event A is predicted, output it as an atypical event), can be a function of a comparison between predictions output by a user expectancy model and a more robust predictive model, can be a probabilistic determination, or can include or utilize any other suitable manners for defining atypicalities. The predictive model component 404 can further include a utility analyzer 414 that calculates a measure of utility in connection with providing a user with a predicted atypicality. For example, the predictive model component 404 can be utilized in a traffic application and can predict occurrence of an atypical congestion at a particular portion of a specific roadway. Such portion of the roadway, however, may not be relevant to a user, as the user may typically travel a route that does not include the portion of the roadway subject to congestion. The utility analyzer 404 can, by way of reviewing GPS data associated with the user (e.g., resident upon a cellular phone, an automobile, . . . ), can determine the usual route that the user travels and compute a measure of utility in connection with providing such user with predicted or occurring atypical events. In another example, the predictive model component 404 can be employed to recognize and/or predict anomalous events that occur within the stock market, and the utility analyzer 414 can analyze a portfolio of a user to determine a measure of usefulness in providing the user with a predicted or occurring anomaly. Thus, if the user does not own or have interest in owning particular stocks or funds, then there would be little utility in providing the user with recognized or predicted anomalies with respect to the particular stocks. The utility analyzer 414 can undertake a probabilistic analysis in connection with determining a measure of utility; for instance, there may be a 57 percent probability that a user will have interest in a predicted atypical event. The calculated probability can be compared with a threshold, and if above the threshold be output to a user.

The system 400 can further include an alerting component 416 that is utilized to alert a user of an occurring or predicted atypical event. The alerting component 416 can utilize alerting rules 418 to determine a time and/or a manner in which a user is to be alerted of an occurring or predicted atypical event. For instance, the user can carry multiple devices (e.g., cellular phone, pager, PDA, . . . ), and depending on content of the predicted atypical event such user may wish to be notified on particular device. In another example, depending upon a time of day, the user may wish to be notified in a particular manner. Similarly, the alerting rules 418 can consider user context when determining a time and manner to alert a user of an occurring or predicted atypical event. The user context information can be retrieved, for example, from calendars in email applications, from sensors associated with portable communications or computing devices, etc. For example, if the user is in an important meeting, the alerting rules 418 can cause the alerting component to silently alert the user of an occurring or predicted atypical event (e.g., through vibration of a cellular phone). Furthermore, disparate occurring or predicted atypical events can be categorized and provided to a user as a function of the categorization (defined in the alerting rules 418). Accordingly, the alerting rules 418 can take into account content of an event, context of a user or an event, and the like in connection with determining a manner and time to output an atypical event or predicted atypical event.

Figure 5:
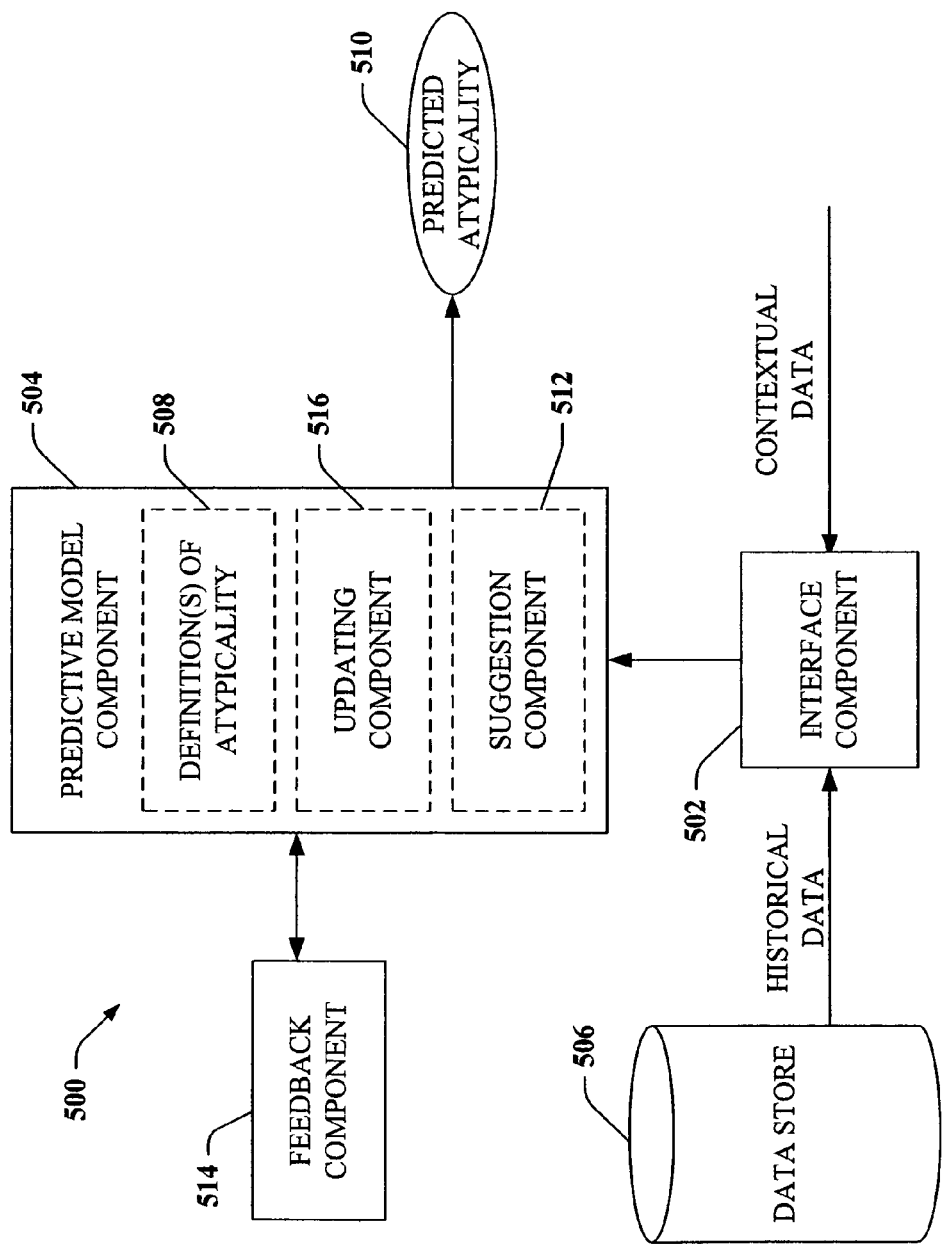
FIG. 5 is a block diagram of a system that facilitates updating a predictive model component based at least in part upon user feedback.

Now referring to FIG. 5, a system 500 for recognizing and predicting atypical events is illustrated. The system 500 includes an interface component 502 that receives contextual data and historical data relating to events that are desirably predicted by a predictive model component 504. For example, the predictive model component 504 to predict a competitor's maneuver in a conflicting situation, predict stock market trends, traffic patterns, etc. The historical data, for instance, can be retrieved from a data store 506 that can hold a substantial amount of data for analytical purposes. The data store 506 can exist within a server or set of servers, one or more clients, or be distributed between one or more servers and a client.

The predictive model component 504 can receive the historical data and the contextual data from the interface component 502 and recognize occurring events as well as output predictions events that will occur in the future as a function of the contextual data and the received data. The predictive model component 504 can differentiate typical events from atypical events (either occurring or predicted) through utilization of definition(s) of atypicality 508. For instance, a predicted or occurring event can be compared with the definition(s) of atypicality 508 and/or analyzed in connection with the definition(s) of atypicality 508 to determine whether such events are atypical. If the events are atypical, then the predictive model component 504 can inform a user of an occurring atypical event or output a predicted atypicality 510. The predictive model component 504 can further include a suggestion component 512 that can provide a user with suggested actions or responses given a specific occurring or predicted atypical event. In one example, if the predictive model component 504 predicts that an atypical congestion will occur on a portion of a particular roadway, the suggestion component 512 can suggest an alternate route. In another example, if a stock is predicted to atypically rise or drop, the suggestion component 512 can provide a suggestion to a user informing such user of a suggested amount of the stock to buy or sell. Furthermore, the predictive model component 504 can calculate a probability of correctness associated with output predictions, and such probabilities can be displayed to the user together with a suggestion generated by the suggestion component 512. Accordingly, the user can make an informed decision regarding whether to follow the suggestions.

The system 500 can further include a feedback component 514 that allows a user to customize and/or update the predictive model component 504. For example, the predictive model component 504 can provide a user with an event that the predictive model component 504 found to be atypical (by way of the definition(s) of atypicality 508). The user, however, may not feel that the provided event was atypical given the user's previous experiences. The user can inform the predictive model component 504 that such event and/or a substantially similar event should not be output as an atypical event through the feedback component 514. Similarly, an event that the user finds to be atypical can occur, and the predictive model component 504 can fail to recognize that such event is atypical or can predict the event and not categorize it as an atypical event. The user can inform the predictive model component 504 of a desire to be informed of such event (or similar event) should it occur in the future and/or be predicted to occur in the future through the feedback component 514. The feedback component 514 can accept information through any suitable means, such as microphone and voice recognition components, keystrokes, by way of a pressure sensitive screen, and the like. An updating component 516 can receive user input from the feedback and update the predictive model 504 according to such input. For instance, the updating component 516 can update the definition(s) of atypicality 508 upon receipt of user input by way of the feedback component 514.

Referring now to FIGS. 6-10, methodologies in accordance with the claimed subject matter will now be described by way of a series of acts. It is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter.

Figure 6:
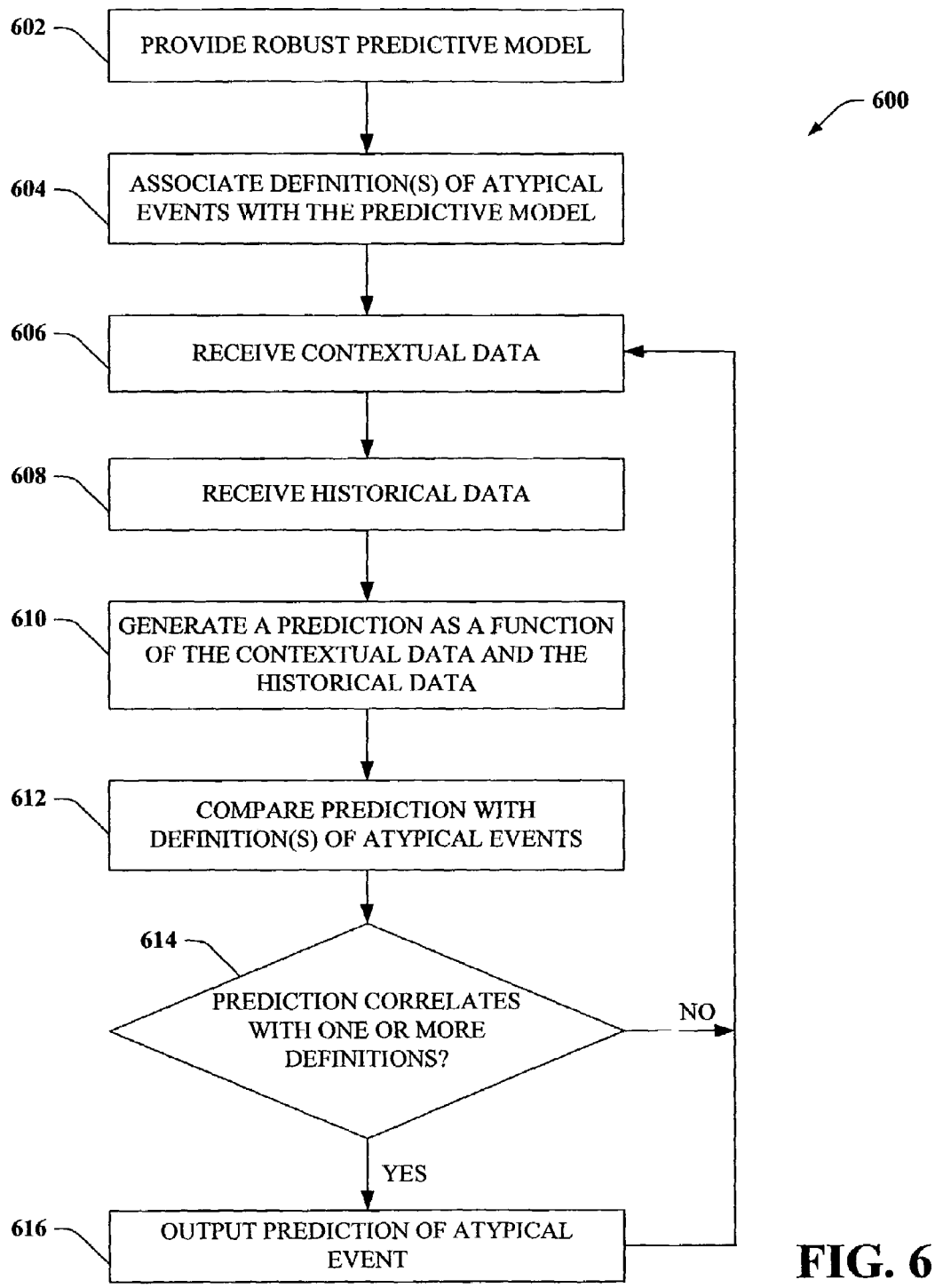
FIG. 6 is a flow diagram illustrating a methodology for predicting future occurrences of atypical events.

Turning solely to FIG. 6, a methodology 600 that facilitates providing a user with information relating to a recognized and/or predicted atypical event is illustrated. At 602, a robust predictive model is provided. In particular, the robust predictive model can comprehend/consider greater amounts of data when compared to data utilized by humans and/or a predictive model that is designed to model human thinking. Furthermore, the robust predictive model can recognize and analyze complex interdependencies between variables within data, thereby having an ability to output more accurate predictions than simpler models and/or humans. At 604, definition(s) of atypicality are associated with the predicted model. The definition(s) can be explicit (e.g., if event A occurs and/or is predicted to occur, output the prediction or occurrence as an atypical event). In one example, the definition(s) of atypical events can be a function of an analysis relating to frequency of occurrence of an occurring or predicted event. For instance, an occurring or predicted event that has not occurred in a defined range of time can be output as a surprising event. Furthermore, the definition(s) of atypicality can be based at least in part upon a comparison between an output of the robust model and an output of a simpler model that is designed to correspond to human thinking. Any suitable manner for defining atypical events, however, is contemplated by the inventor and intended to fall under the scope of the hereto-appended claims.

At 606, contextual data is received, and at 608 historical data is received. The contextual data can be received by way of sensors, data collection components, user input, and the like. Historical data can be received from one or more data stores that can be distributed, consolidated, resident upon one or more server systems, resident upon a client, distributed between a client and one or more servers, or any other suitable manner for storing data for retrieval. At 610, predictions are generated by the robust model as a function of the contextual data and the historical data. For example, the contextual data can be analyzed by the predictive model together with the historic data to review/recognize interdependencies between variables therein. At 612, the generated prediction can be compared with the definition(s) of atypical events (e.g., to determine whether an atypical event has been predicted by the robust model). At 614, a determination is made regarding whether the generated prediction correlates with one or more of the definitions of atypical events. If there is no correlation, then the methodology 600 returns to 606. If there is a correlation, then at 616 the prediction generated by the robust predictive model can be output as a prediction of an atypical event at 616. Thereafter, the methodology 600 can return to 606 to enable generation of further predictions.

Figure 7:
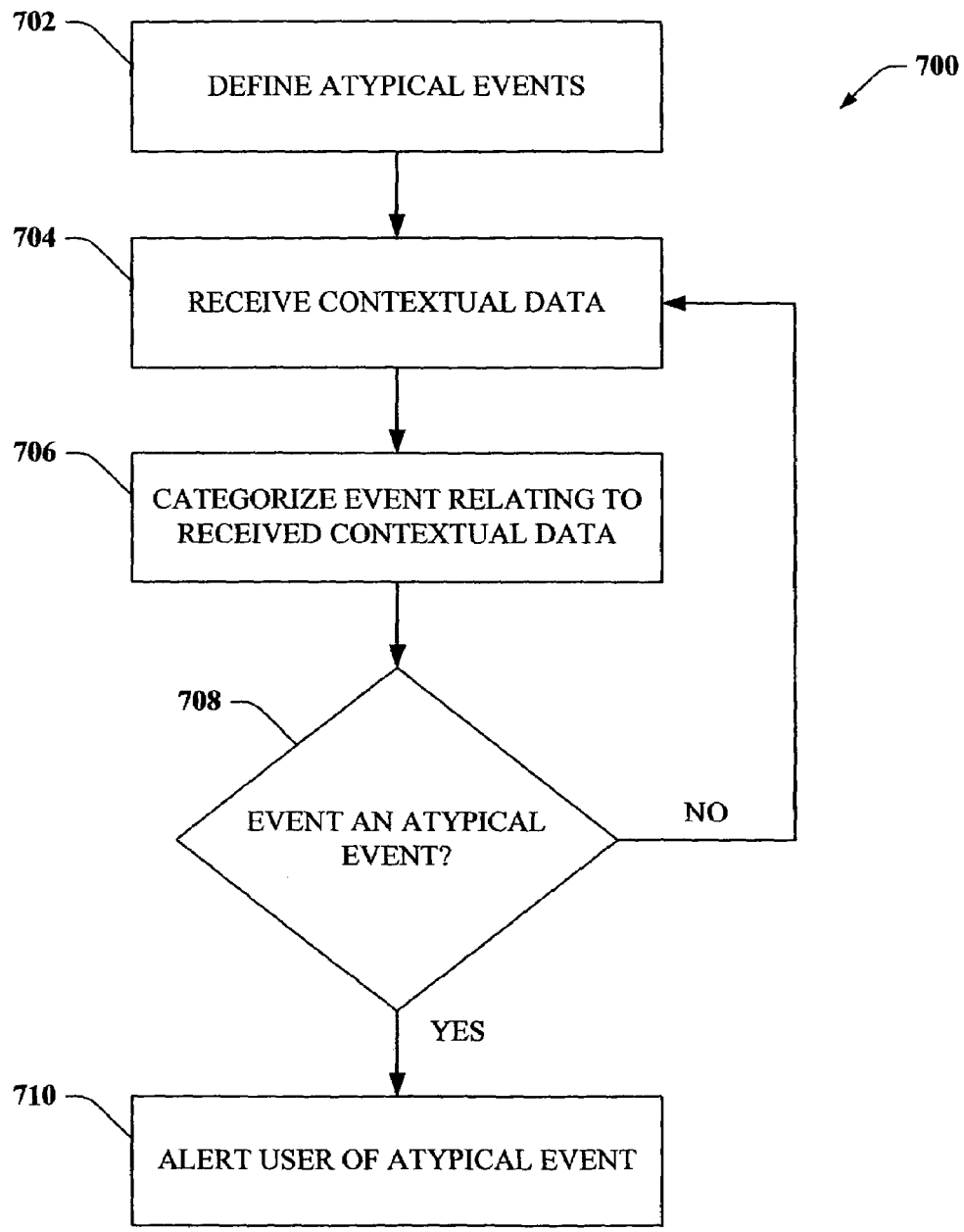
FIG. 7 is a flow diagram illustrating a methodology for recognizing occurring atypical events and alerting a user of such events.

Now referring to FIG. 7, a methodology 700 for informing an individual of an occurring atypical event is illustrated. At 702, atypical events are defined. As described above, atypical events can be explicitly defined, defined as a function of frequency of occurrence of the events, defined as a function of a probabilistic analysis of events, defined as a comparison of outputs of disparate models, etc. At 704, contextual data is received, wherein such data is indicative of an event. For example, data collected from sensors in a roadway can indicate that there is a high level of congestion and slow-moving traffic on a portion of such roadway. In another example, data collected over a short period of time can indicate an atypical rise or decline in a value of a stock and/or series of stocks. At 706, an event relating to the received contextual data is categorized. In particular, an event can be categorized as an atypical event or as a typical event, wherein such categorization can be a function of definitions of atypicality. At 708, a determination is made regarding whether the event indicated by the contextual data is an atypical event. If there is no atypical event, then the methodology 700 returns to 704. If there is an atypical event occurring (as indicated by the received contextual data), a user can be alerted of the atypical event at 710.

Figure 8:
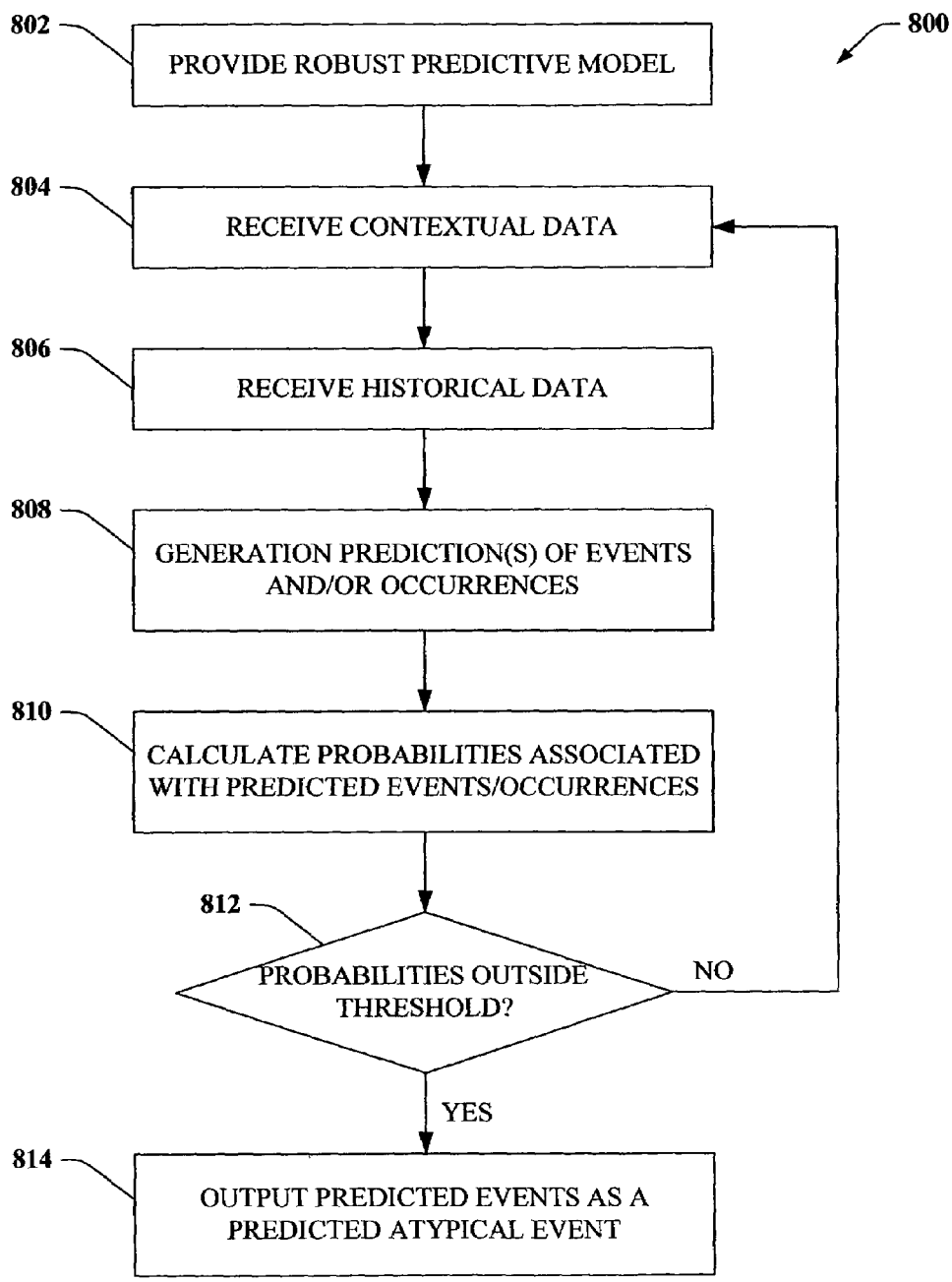
FIG. 8 is a flow diagram illustrating a methodology for undertaking a probabilistic analysis in connection with determining whether an event should be output as an atypical event.

Turning now to FIG. 8, a methodology 800 that facilitates prediction and output of atypical events is illustrated. At 802, a robust predictive model is provided, wherein the predictive model incorporates interdependencies between variables not contemplated by humans (or simple predictive models) and can further contemplate a vast amount of variables within data. At 804, contextual data is received that relates to an event desirably predicted by the robust predictive model. The contextual data can be obtained through the Internet, sensors, or any other suitable means. At 806, historical data is received that relates to an event or events desirably predicted by the predictive model. At 808, predictions of events can be generated upon receipt of the contextual data and the historic data. At 810, probabilities associated with the events can be calculated. For instance, a probability of correctness of the generated predictions can be calculated. Furthermore, a probability of the event occurring over a particular period of time can be computed (e.g., probability as a function of frequency of occurrence can be calculated). At 812, a determination is made regarding whether the calculated probabilities lie outside a threshold. If they do not lie outside a threshold, the methodology 800 can return to 804. If the probabilities do lie outside a threshold, then at 814 a predicted event can be provided to a user as a predicted atypical event.

Figure 9:
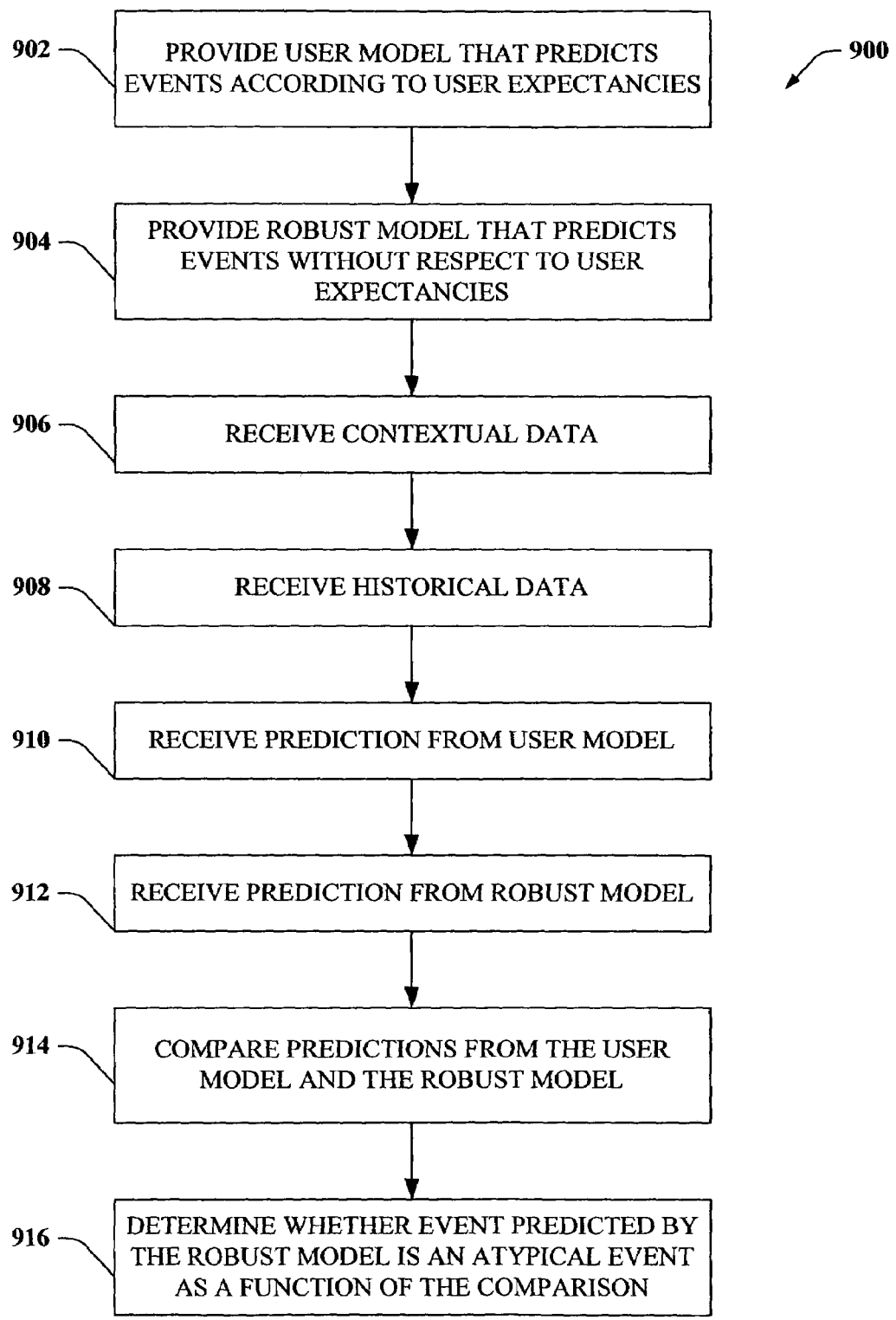
FIG. 9 is a flow diagram illustrating a methodology for analyzing a prediction output by two disparate models to determine whether an event is an atypical event.

Referring now to FIG. 9, a methodology that facilitates determining whether a predicted event is an atypical event and outputting atypical events to a user is illustrated. At 902, a user model is provided that predicts events according to user expectancies. For instance, the user model can contemplate a similar amount of data (e.g., a similar number and type of variables) and output predictions of events based upon such data. At 904, a robust model that predicts events without respect to user expectancies is provided. For example, the robust model can contemplate a greater amount of variables, more complex interdependencies between variables, etc. Thus, given substantially similar contextual data, the user model and the robust model can output starkly different predictions. At 906, contextual data is received from television, Internet, sensors, and the like. At 908, historical data can be received from a data store or a series of data stores. At 910, a prediction is received from the user model (which is designed to correspond to human predicting), and at 912 a prediction is received from the robust model. At 914, the predictions from the user model and the robust model are compared. For instance, a measure of disparity can be calculated between predicted events. At 916, whether the event predicted by the robust model is an atypical event is determined as a function of the comparison. For example, if an event predicted by the user model is drastically different from the event predicted by the robust model, the event predicted by the robust model can be labeled as an atypical event and output to a user.

Figure 10:
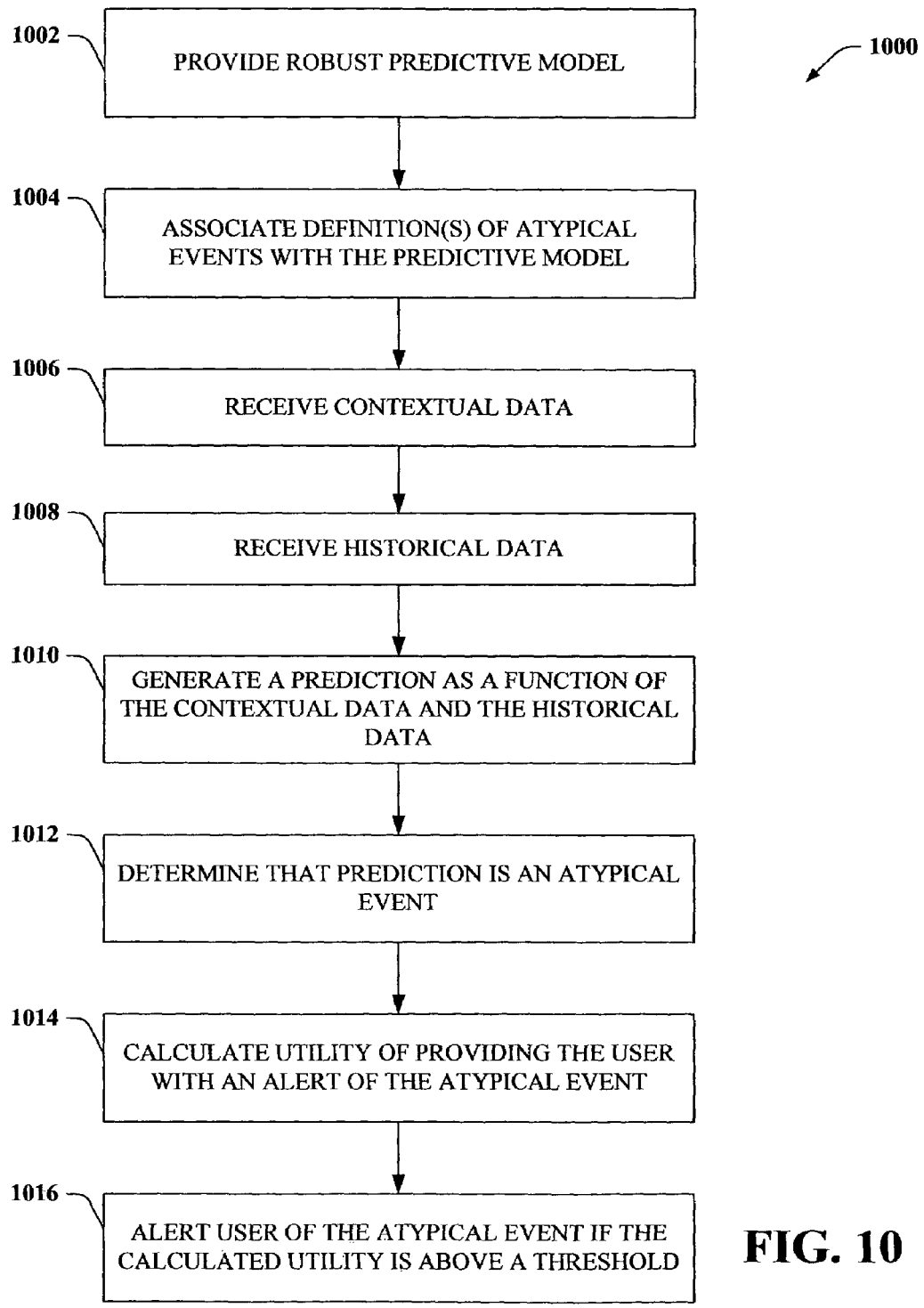
FIG. 10 is a flow diagram illustrating a methodology for determining that a predicted atypical event is of sufficient utility to a user to provide to such user.

Now referring to FIG. 10, a methodology 1000 that facilitates determining whether to provide a predicted atypical event to a user is illustrated. At 1002, a robust predictive model is provided, and at 1004 definitions of atypical events are associated with the predictive model. Examples of definitions of atypical events have been described in detail above. At 1006, contextual data is received, and at 1008 historical data is received. At 1010, a prediction is generated by the robust predictive model as a function of the contextual data and the historical data, and at 1012 it is determined that the prediction is the prediction of an atypical event. At 1014, utility of providing the user with an alert relating to the atypical event is calculated. For example, a user may not have any interest in particular predicted events (e.g., predicted congestion of a roadway that the user does not travel). A measure of utility can be calculated based upon user history, user context, and/or user feedback. At 1016, the user can be alerted of the atypical event if the measure of utility is above a defined threshold. In other words, if it is determined that the user has sufficient interest in the predicted event.

Figure 11:
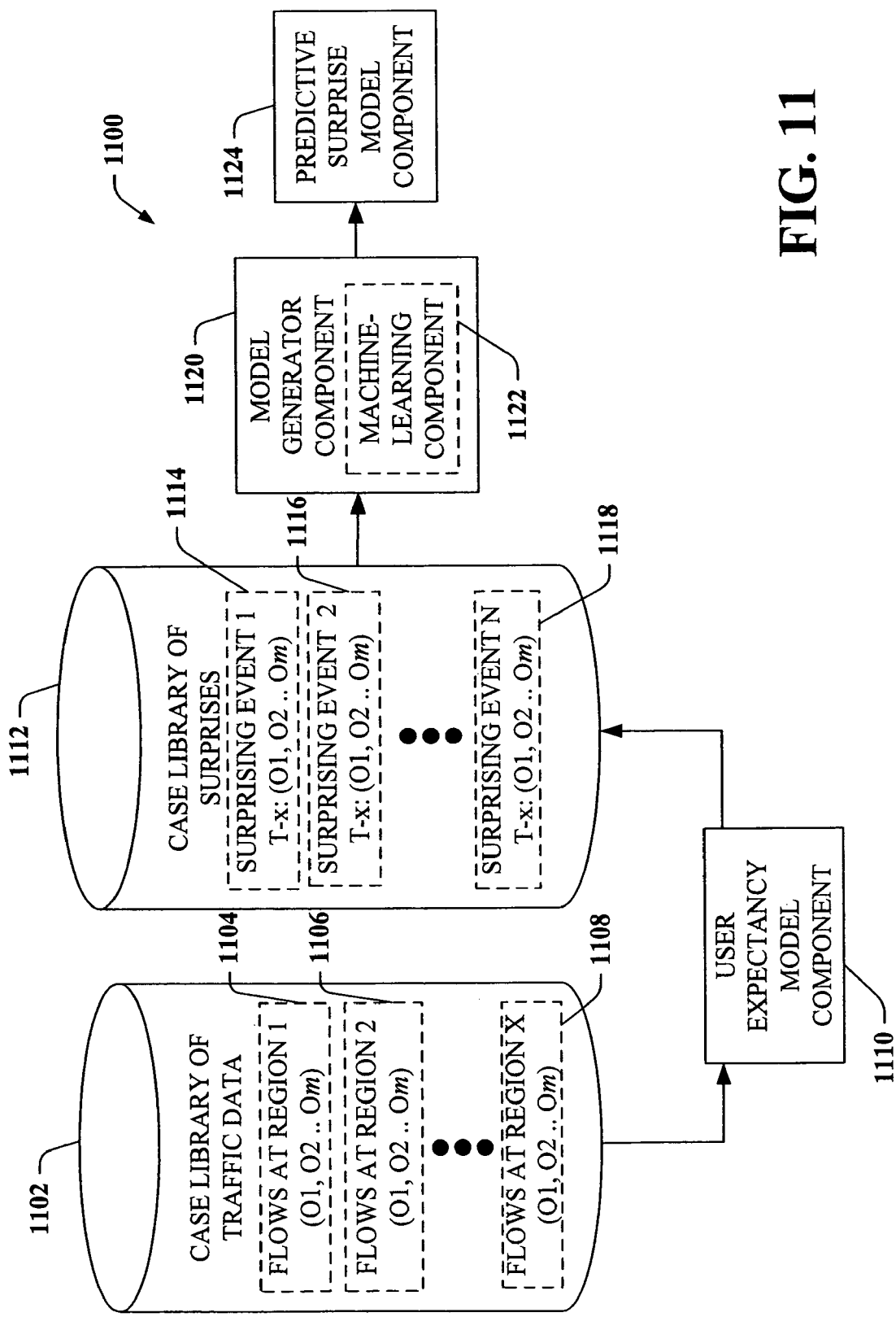
FIG. 11 is a block diagram of a system that facilitates building a predictive model that can predict future occurrences of atypical events.

Now turning to FIG. 11, a system 1100 that facilitates building a robust predictive model that can generate predictions of atypical events that may occur in the future is illustrated. The system 1100 includes a case library 1102 that can comprise, for example, data relating to traffic flows in disparate regions together with observations (O) over time relating to the flows and regions such as weather, traffic incident reports, weather, etc. In more detail, the case library 1102 can include data relating to flows at a first region 1104, flows at a second region 1106, and flows at an Xth region 1108, where X is any positive integer. For instance, for a particular user, fifteen minute segments of time throughout a day, as well as day of week and whether a day is a holiday or not, can be considered, and a table that contains statistics for each region 1104-1108 can be received and stored.

The system 1100 further includes a user expectancy model component 1110 that can be tailored for a particular user or set of users. The user expectancy model component 1110 can be a model that is learned or can be assumed to be a simple reasonable model such as a "marginal model" (which is a phrase employed to describe mean statistics based on a particular partitioning of data). Based upon the user expectancy model component 1110, surprising events can be learned from content of the case library 1102 and stored in a disparate case library 1112. Thus, the case library 1112 can include a plurality of surprising events 1114-1118 and observations associated with such events, including observations a particular period of time prior to the occurrence of a surprising event. Thus, for instance, if a surprising traffic jam occurred at time T, observations could be recorded at a time "x" prior to time T.

Contents of the case library 1112 can be delivered to a model generator 1120 that utilizes a machine-learning component 1122 to assist in creating a predictive model 1124, wherein the model 1124 is utilized to predict future occurrences of situations that would be surprising to a user or set of users. For instance, the machine-learning component 1122 can analyze the surprising events 1114-1118 within the case library 1112 and build Bayesian network models, statistical classifiers, neural net methods constructed by way of structure search and parameter optimization in connection with creating the predictive model 1124, etc. More particularly, the machine-learning component 1122 can analyze observations within the case library 1112 and locate variables therein, interdependencies between variables, and the like. The predictive surprise model component 1124 can receive observations for a current time and determine a likelihood that there will be a surprise at particular points in the future and/or a surprise of a particular type in the future.

In another example, the case library 1112 can include a set of abstractions relating to classes of surprising events, and the properties associated therewith. For instance, situations where one or more people were surprised by events in the past can be assessed and assigned a type or "class" of event and stored in a case library. For example, a political strategist might assess a set of world events that were surprising for each of the last 20 years. He/she can also assess categories of each surprising event and associate sets of properties with each surprising event, and these assessments can be included within the case library 1112. Example properties/observations might include location in the world, economic factors that were noted at the time, and so on, both during and before a surprising event. Such data could be used to build the predictive surprise model component 1124, which can be a qualitative or quantitative statistical model targeted at forecasting the likelihood of surprises of different categories occurring in the future. Such predictions could be used to focus attention on the potential detailed types of events that might come to transpire, conditioned on the hypothesized prospect that a surprise will occurs within a specific category. Decisions could be made about ways to gather information, in the context of the identified categories, that would be aimed at reducing the likelihood that a future event will be surprising, or likewise aimed at preparing better for a response to the surprises within each category.

Figure 12:
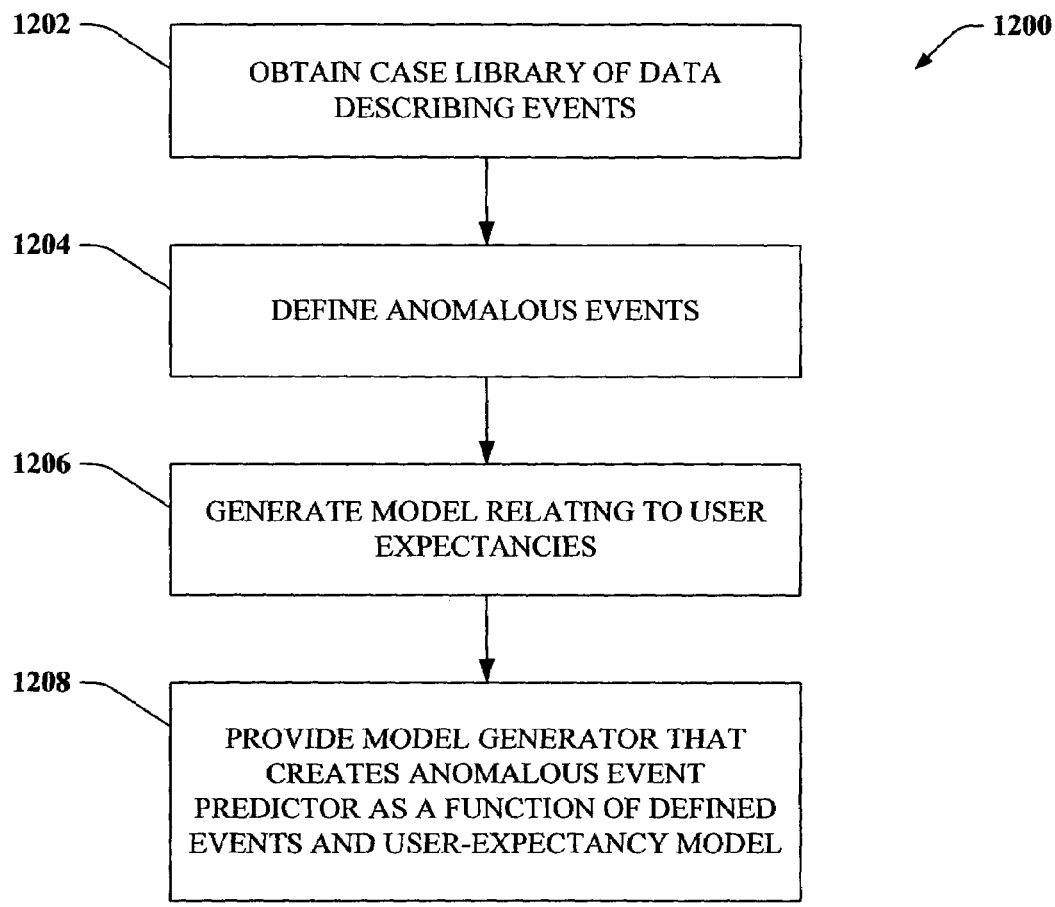
FIG. 12 is a flow diagram illustrating a methodology for creating a predictive model that can predict future occurrences of atypical or anomalous events.

Turning now to FIG. 12, a methodology 1200 for generating a model that can predict atypical or anomalous events is illustrated. At 1202, a case library of data describing events is obtained. For instance, the case library can include events that are defined as anomalous or atypical events, typical events, or any other suitable events. At 1204, anomalous events are defined. In one example, events not contemplated by a simplistic user-centric model can be defined as atypical or anomalous events. In another example, events that lie outside a particular probability range or a particular number of standard deviations away from a mean can be defined as atypical or anomalous events. As can be determined from the above, any suitable manner for defining anomalies is contemplated by the inventor and intended to fall under the scope of the hereto-appended claims. In still another example, atypical events can be inherently defined upon performing machine learning upon data within the case library. For instance, if events in the case library are previously defined as atypical events, then machine learning techniques can be employed to determine that similar events also should be defined as atypical events At 1206, a model is generated and/or provided that generates predictions according to user expectancies. Thus, the model is designed to take into account variables typically considered by a user and interdependencies between variables typically considered by a user. At 1208, a model generator is provided, wherein the model generator creates an atypical event predictor as a function of the defined events and the user-expectancy model. While not described, the created model can include a "world" model, which, given a substantial amount of data, can determine various levels of interdependencies between numerous variables. The "world" model can thus be much more sophisticated than the user-centric model. Accordingly, if the user-centric model outputs predictions markedly disparate from predictions output by the "world" model, outputs of the "world" model can be considered an atypical or anomalous event. In another example, if the "world" model outputs a prediction that is sufficiently related to a defined anomaly, then such prediction can be presented to a user as an atypical or anomalous event.

Figure 13:
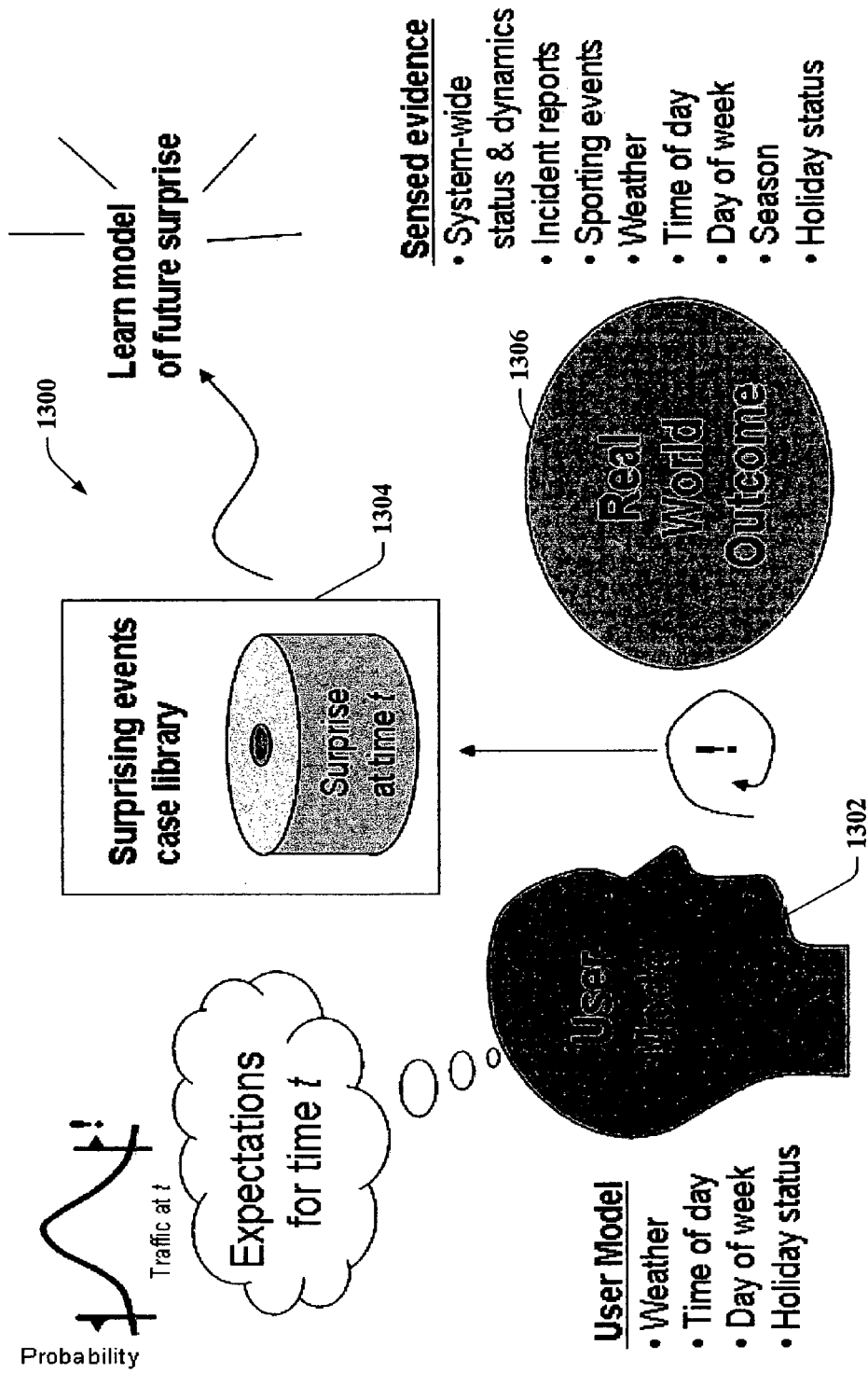
FIG. 13 is an exemplary schematic illustrating prediction of surprising events by way of a user model.

Referring now to FIG. 13, an exemplary environment 1300 that is associated with the system 1100 (FIG. 11) is illustrated. The environment includes a user model 1302 that can model user predictions given weather, time of day, day of week, and holiday status. In other words, the user model 1302 can output expectations of events at a given time t. The user model 1302 can be associated with a surprising events case library 1304 that can include surprising events at previous times in the past and observations associated with the surprising events. For instance, real world outcomes 1306 can be compared with predictions made by the user model 1302, and surprising events can be placed in the case library 1304 if there is sufficient difference between output of the user model 1302 and the real-world outcome 1306. Based upon contents of the case library 1304, given particular sensed evidence, such as system-wide status and dynamics, incident reports, sporting events, weather, time of day, day of week, season, holiday status, etc., a model of future surprise can be learned and employed to predict surprising events that may occur in the future.

Figure 14:
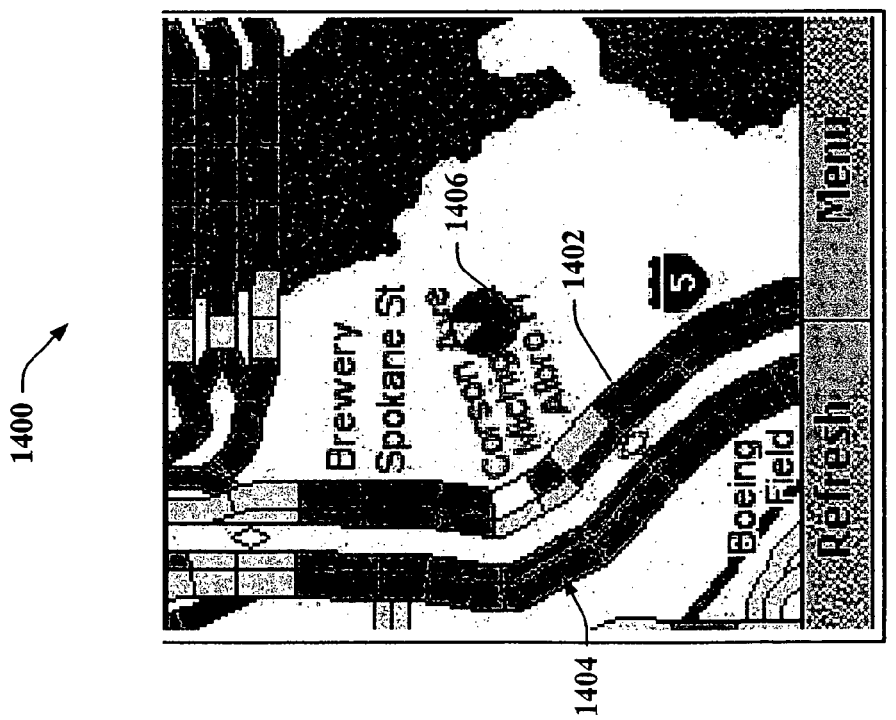

Turning now to FIG. 14, a screenshot 1400 of an application that utilizes predictions generated by a predictive model (as described above) is illustrated. The screenshot includes graphical representations of various roadways 1402, wherein the roadways include a plurality of portions 1404. The portions can be associated with a particular color and/or shade of color that indicates a level of congestion associated with the portions. For example, if the portion 1404 is shaded a color of green, a user can determine that there is little congestion upon such portion 1404. The prediction can be provided to a user by way of receipt of contextual data and historic data associated with the roadways 1402. A timing indicator 1406 is also included within the screenshot 1400, wherein such indicator 1406 informs a user of a predicted time associated with a current traffic condition of a selected portion of the roadways 1402. For instance, the timing indicator 1406 can indicate that a lack of congestion will remain for a predicted amount of time, and a probability of correctness can be associated therewith. In one example, the screenshot 1400 can provide a user with information relating to a time in the future. Thus, prior to the user leaving a place of employment, such user can request predicted information relating to a route of travel a certain distance from a current point in time. In another example, atypical events can be provided to the user by way of a predicted model.

Figure 15:
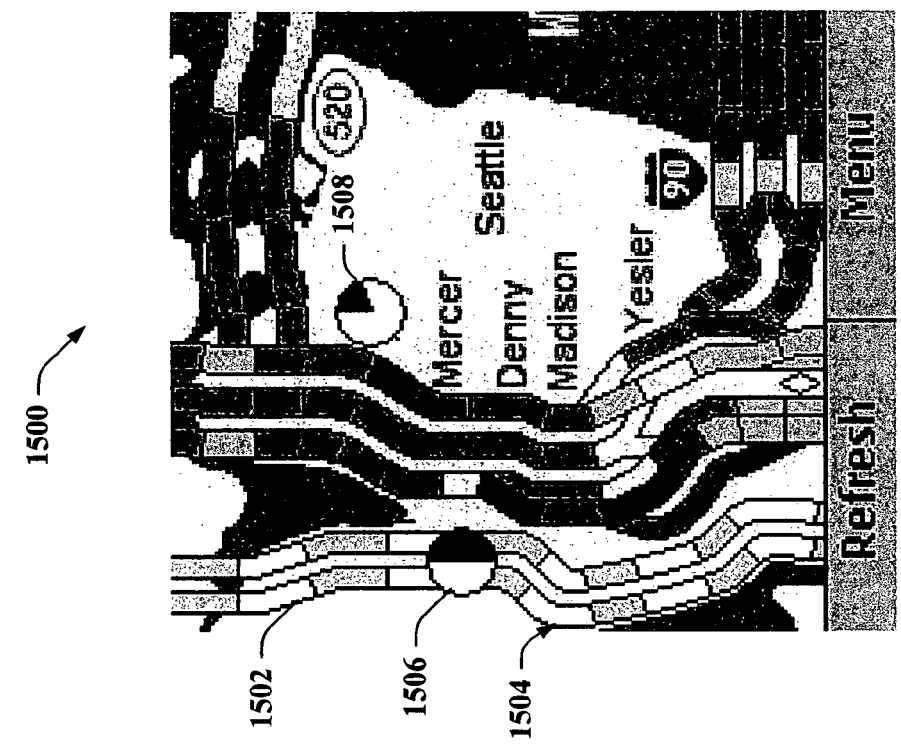
FIGS. 14 and 15 are exemplary screenshots illustrating one or more novel aspects relating to the claimed subject matter.

Now referring to FIG. 15, another exemplary screenshot 1500 is illustrated. The screenshot 1500 shows that traffic information can be provided to a user by way of a display. The display can be on a cellular phone, a smart phone, a PDA, a laptop, etc. The screenshot illustrates a plurality of graphically represented roadways 1502, wherein the roadways include graphically represented portions 1504. The portions can be associated with disparate colors and/or disparate shading to convey to a user that certain portions of the roadways 1502 are predicted to be subject to congestion. For example, a portion colored red is subject to high congestion. Timing indicators 1506 and 1508 can be associated with selected portions of the roadways 1502, and can indicate a predicted time until the congestion occurs, a predicted time that the congestion will remain upon a particular portion, and the like. As described above, the prediction can be related to an atypical event. For instance, it may not be typically expected that a certain portion of the roadway 1502 is subject to light congestion at a particular time. A robust predictive model, however, can output such predictions as a function of defined anomalous or atypical events and user expectancies, as well as received contextual data and historical data.

As stated above, a portable unit can be utilized to display predictive data. Mobile users are typically engaged in a great diversity of primary tasks, such as driving a vehicle, when they may wish to access, for example, traffic status and predictions. Thus, it is desirable to design lightweight navigation methods and visualizations for relaying predictions that can be glanced at quickly. Users can access disparate regions of a highway system, for instance, on a mobile device by depressing dialing keys of a phone. The keys can map isomophically to regions of a map, and users can toggle between levels of zoom by depressing a joystick or other suitable mechanism. In another example, a button can be depressed that provides a user with a "flyover" view of traffic congestions or other regions that may be of interest to a user.

Figure 16:
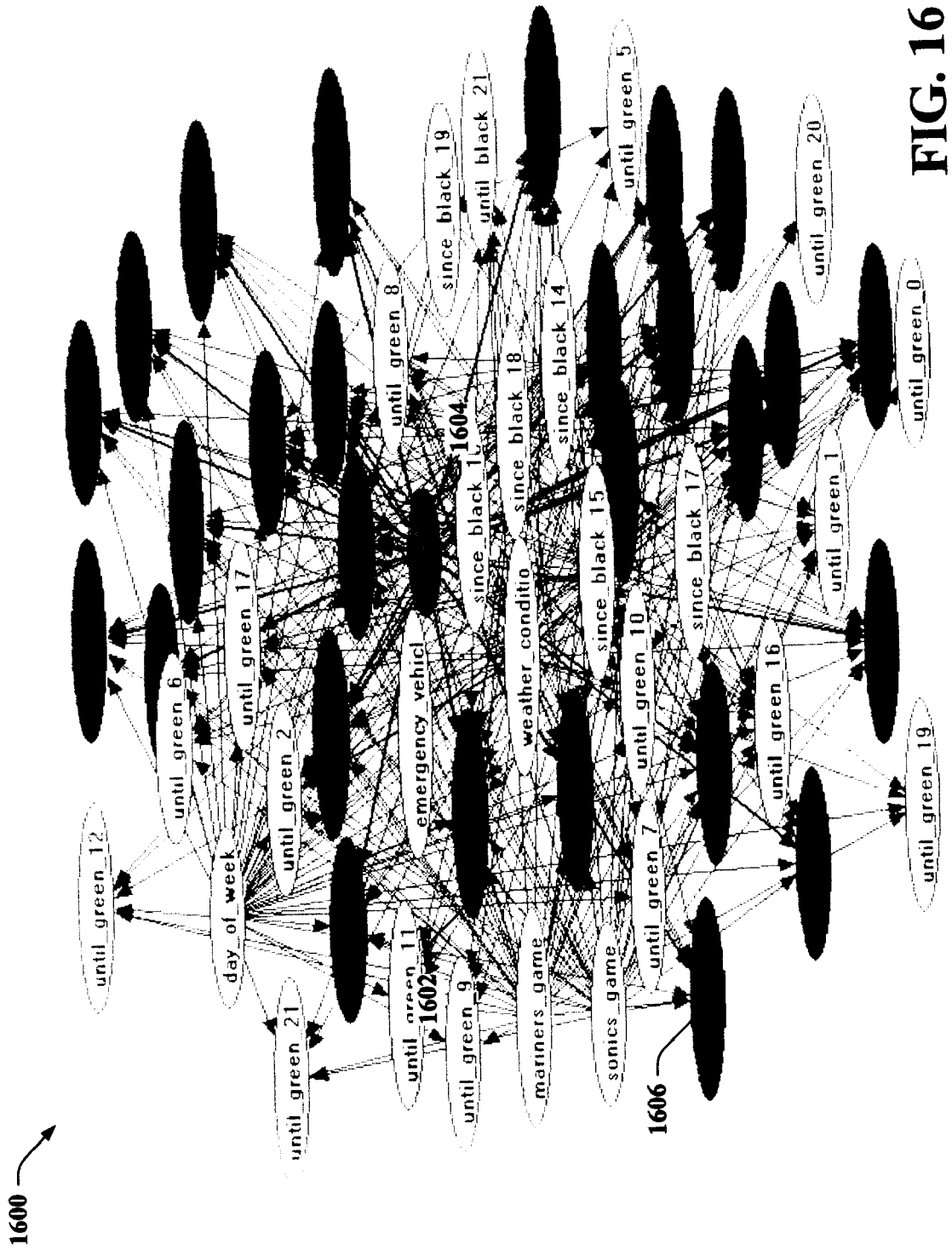
FIGS. 16-18 are exemplary networks illustrating interdependencies between variables utilized in connection with predicting future occurrences of atypical events.
Figure 17:
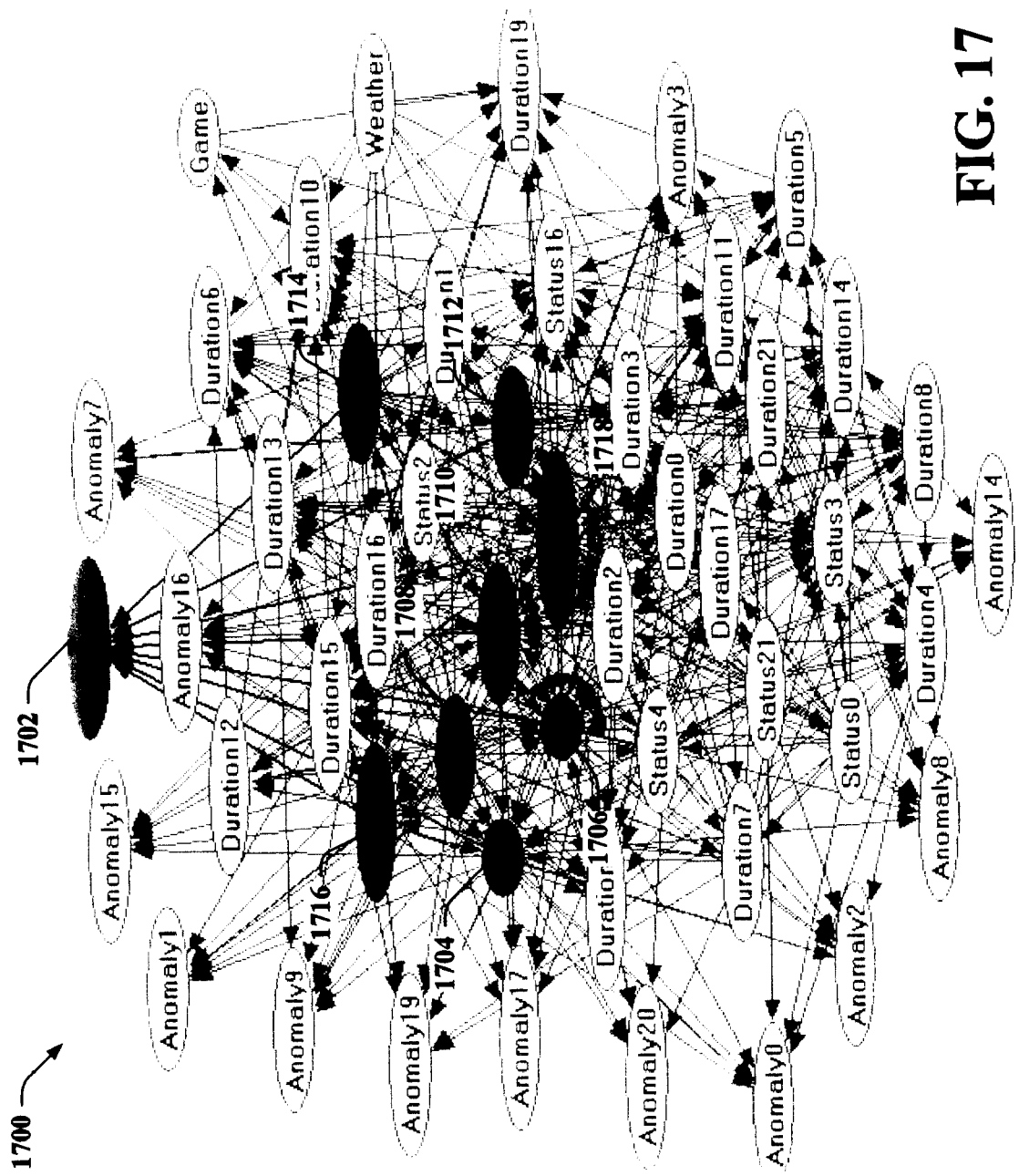
Figure 18:
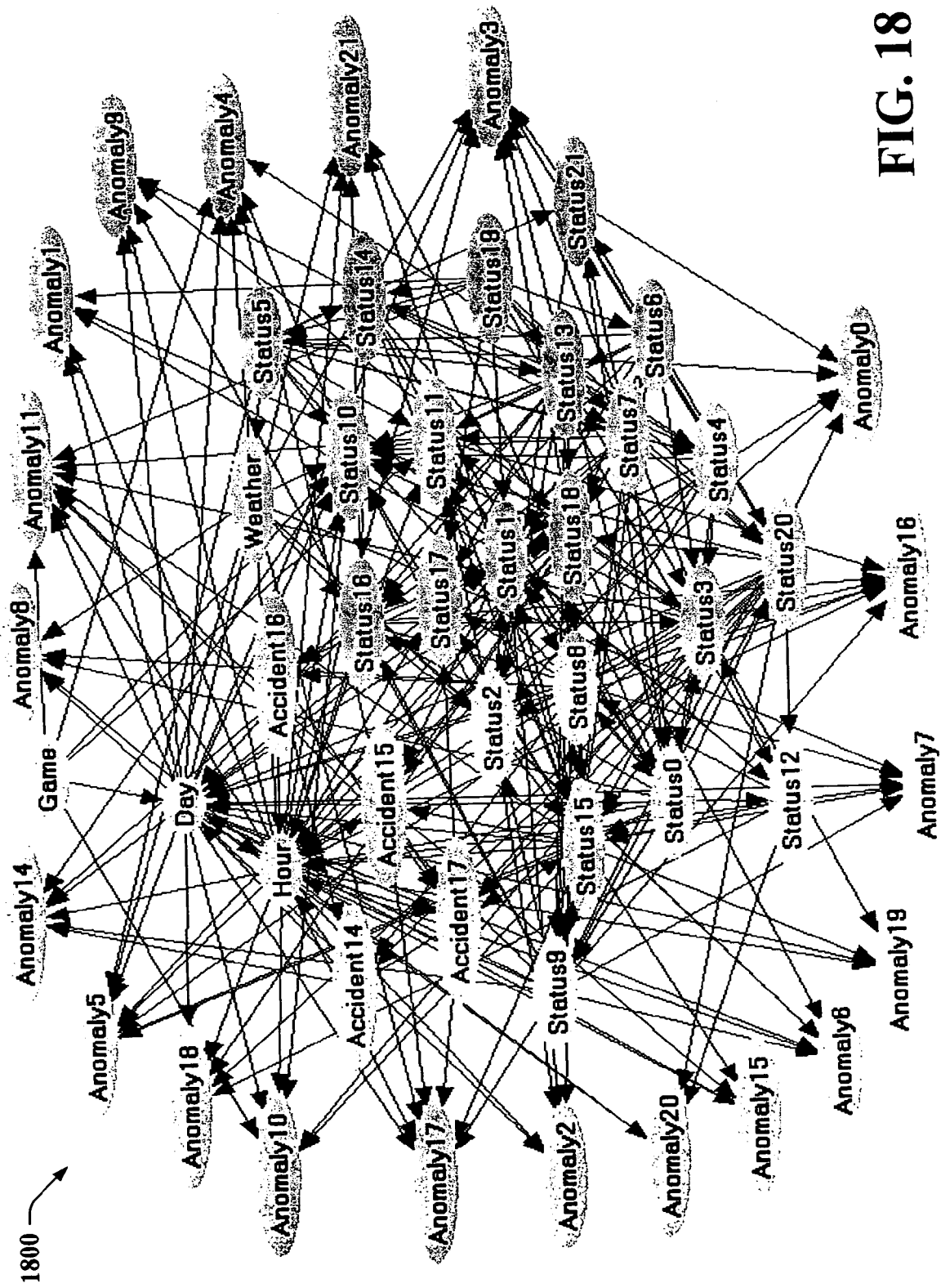

Referring collectively to FIGS. 16-18, graphical representations of networks that illustrate interdependencies between variables and traffic conditions are provided, wherein such state diagrams can be employed in connection with generating a predictive model for predicting future traffic conditions. Turning specifically to FIG. 16, a network 1600 (which can represent a Bayesian network, for example) showing interdependencies between a variable representing a workday and timing associated with disparate congestions and disparate portions of roadways is illustrated. For a specific example, whether or not a day is a workday can affect timing associated with a portion of a road labeled 15 and represented by a node 1602. Thus, a variable, represented by a node 1604, indicates whether a current day is a workday, and such node 1604 is related to a plurality of nodes within the network 1600. In another example, the variable 1604 influences a time until a portion of a roadway (labeled as portion 14) represented by a node 1606 is no longer heavily congested. Various other interdependencies exist and can be easily discerned upon review of the network 1600. A calendar application or other mechanism can determine a value for the node 1604 (e.g., a first value can be utilized to represent that a certain day is a workday, and a second value can be utilized to represent that a certain day is not a workday).

Turning now to FIG. 17, an exemplary network 1700 that shows interdependencies between a plurality of variables and anomalies is illustrated. The network 1700 includes a node 1702 that represents a certain defined anomaly within a predictive model, and disparate variables that are related to such node 1702. In this example, variables representing time of day (node 1704) and day of week (node 1706) are related to occurrence of an anomaly represented by the node 1702. Moreover, status (e.g., congested, partially congested, . . . ) of particular portions of a roadway can be represented by nodes 1708-1714, and the status is shown as being related to predicted occurrence of a defined anomaly represented by the node 1702. Further, nodes 1716-1718 representing actual and/or predicted duration of congestion of particular portions of a road are related to the node 1702. These interdependencies between variables can be utilized to generate predictions relating to traffic conditions and/or predict occurrence of future atypical or anomalous event(s).

Turning briefly to FIG. 18, a network 1800 illustrating interdependencies between variables and anomalous or atypical events that can be predicted by a predictive model as described herein is shown. For example, the network includes nodes representing weather, accidents in particular regions of roadways, congestion status within roadways, time of day, day of week, whether there is a sporting event or game, and the like. Thus, the network 1800 can be associated with a robust predictive model that predict traffic patterns generally, and anomalous or atypical traffic patterns that may occur in the future specifically.

Figure 19:
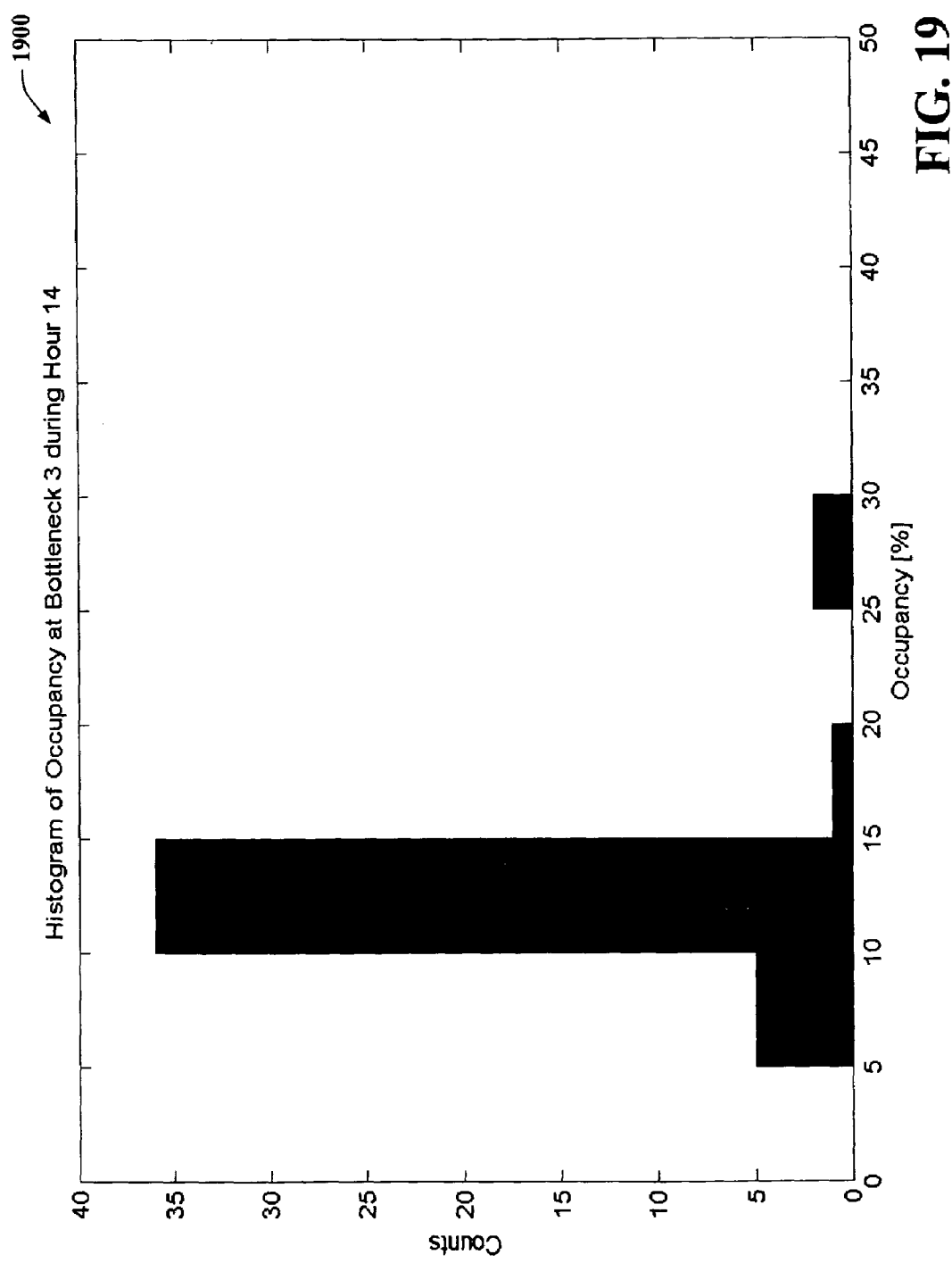
FIGS. 19 and 20 are exemplary graphs illustrating historical data utilized in connection with predictive models.
Figure 20:
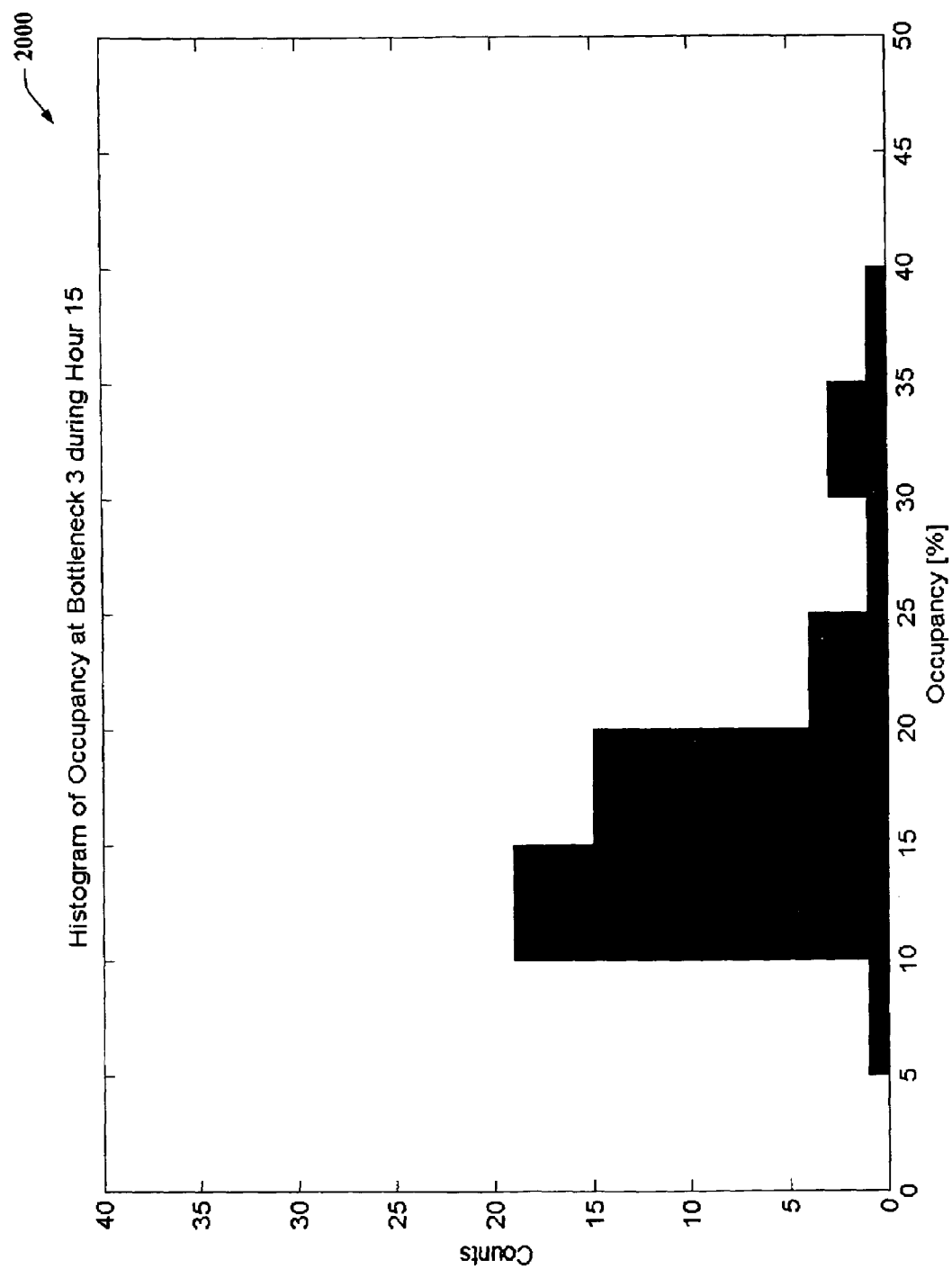

Now referring to FIGS. 19 and 20 collectively, graphs 1900 and 2000 of historical data associated with a particular portion (or bottleneck) of a roadway is illustrated. The historical data that is the basis of the graphs 1900 and 2000 can be utilized in connection with generating a predictive model and outputting predictions therefrom. The axes of the graphs 1900 and 2000 relate to percent occupancy of a particular portion of road and collected data associated therewith at disparate hours of a day.

Figure 21:
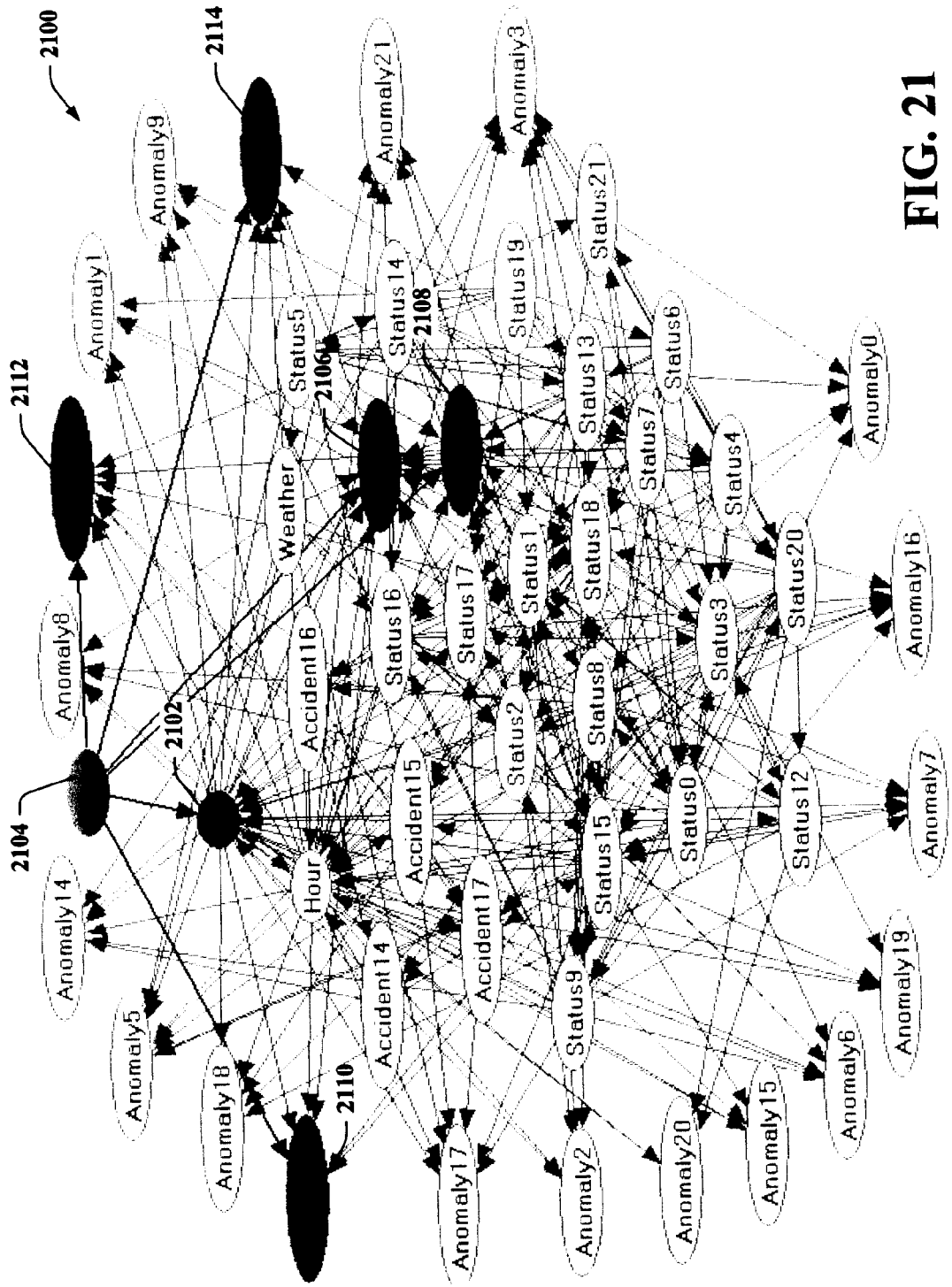
FIG. 21 is an exemplary network illustrating interdependencies between variables utilized in connection with predicting occurrences of atypical events.
Figure 22:
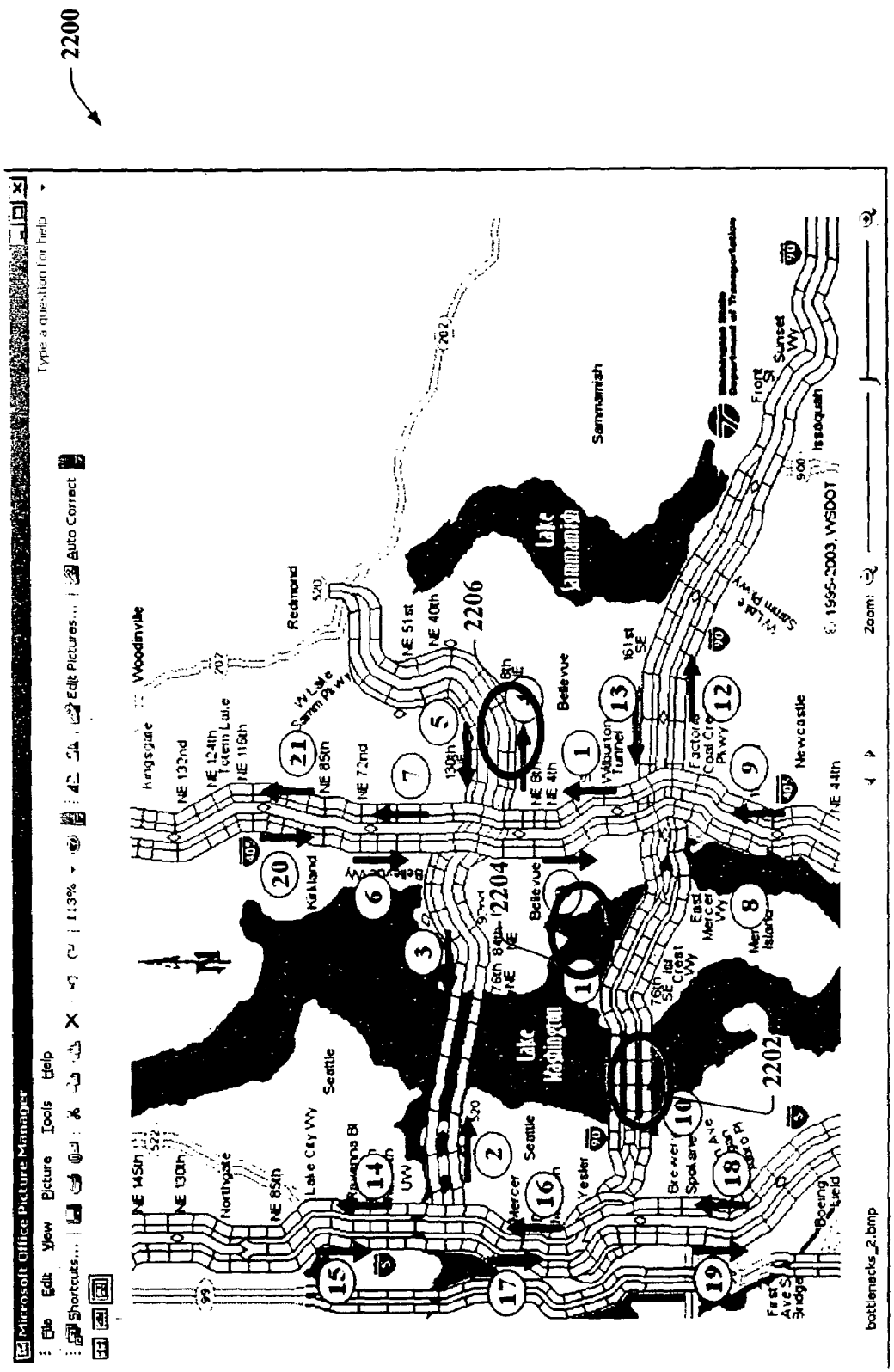
FIG. 22 is a screenshot illustrating a practical application of one or more aspects relating to the claimed subject matter.

Turning to FIG. 21, a network 2100 that illustrates interdependencies between variables associated with traffic and relation thereof to traffic anomalies is provided. For example, a node 2102 representing a day of week, a node 2104 representing whether there is a sporting event, and nodes 2106-2108 representing status of traffic at particular portions of a roadway (labeled 10 and 11, respectively) all relate in one form or another (either directly or indirectly) to anomalous traffic conditions at portions of the roadway(s) labeled 10, 11, and 4 (represented by nodes 2110, 2112, and 2114, respectively). Referring now to FIG. 22, a screenshot 2200 illustrating associated anomalies (shown in FIG. 21) is provided. Circles 2202, 2204, and 2206 represent anomalous traffic conditions at portions 10, 11, and 4, respectively. In this example, the screenshot 2200 illustrates that anomalies at first and second portions 2202 and 2204 of a first roadway relate to an anomaly at an apparently unrelated portion of a second roadway. Thus, a predictive model utilized to generate the predicted anomalies can account for relationships typically not comprehended by individuals.

Figure 23:
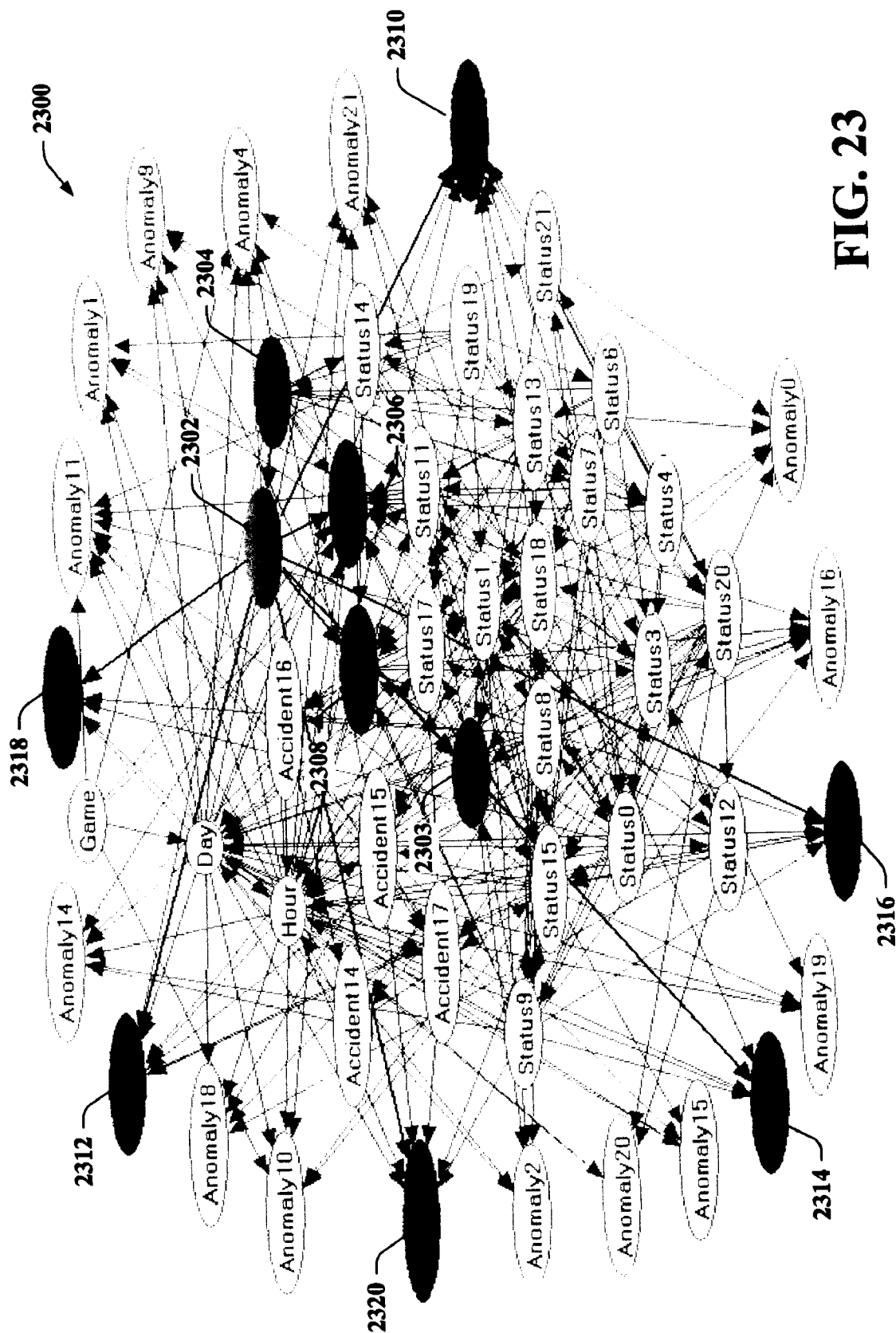
FIG. 23 is an exemplary network illustrating interdependencies between variables utilized in connection with predicting occurrences of atypical events.
Figure 24:
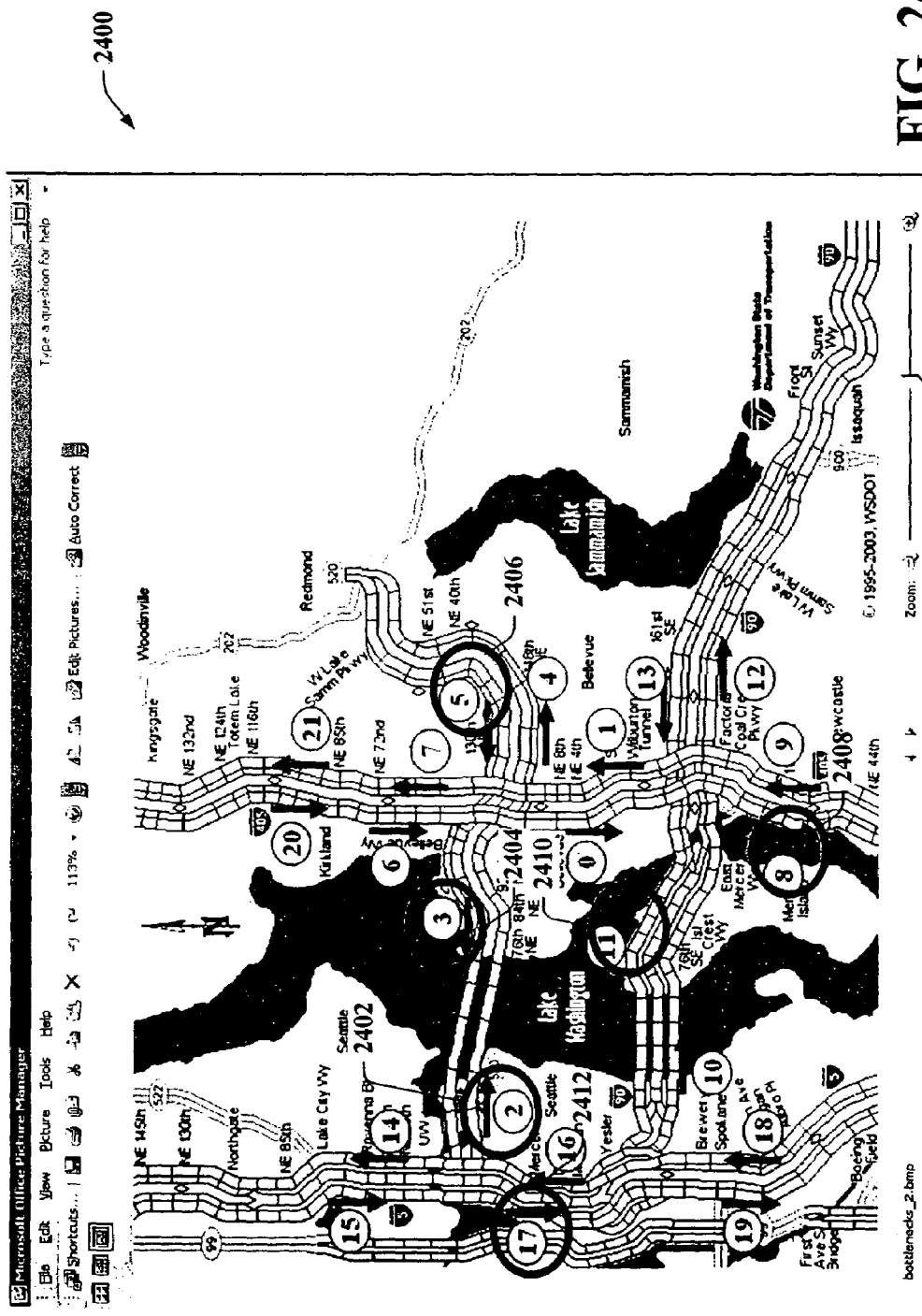
FIG. 24 is a screenshot illustrating a practical application of one or more aspects of the claimed subject matter.

Now referring to FIG. 23, a network 2300 that contemplates interdependencies between variables in association with predicting occurrences of future traffic anomalies is illustrated. The network 2300 illustrates that various anomalies are interrelated, and that weather and status at particular portions of roadways also relate to possible anomalies. In particular, a node 2302 representing weather conditions, and nodes 2303-2308 representing traffic status at disparate portions of roadway (portions 2, 5, 10, and 16, respectively) are all related, directly or indirectly, to nodes 2310-2320 that represent anomalies at portions of roadway (portions 3, 5-8, and 17, respectively). Referring briefly to FIG. 24, a screenshot 2400 illustrating locations of the anomalies referred to with respect to FIG. 23 are shown. The screenshot 2400 includes circles 2402-2412 that represent portions 2, 3, 5, 8, 11, and 17, respectively. The circles represent exemplary anomalies and status of traffic congestion with respect to the network 2300.

Figure 25:
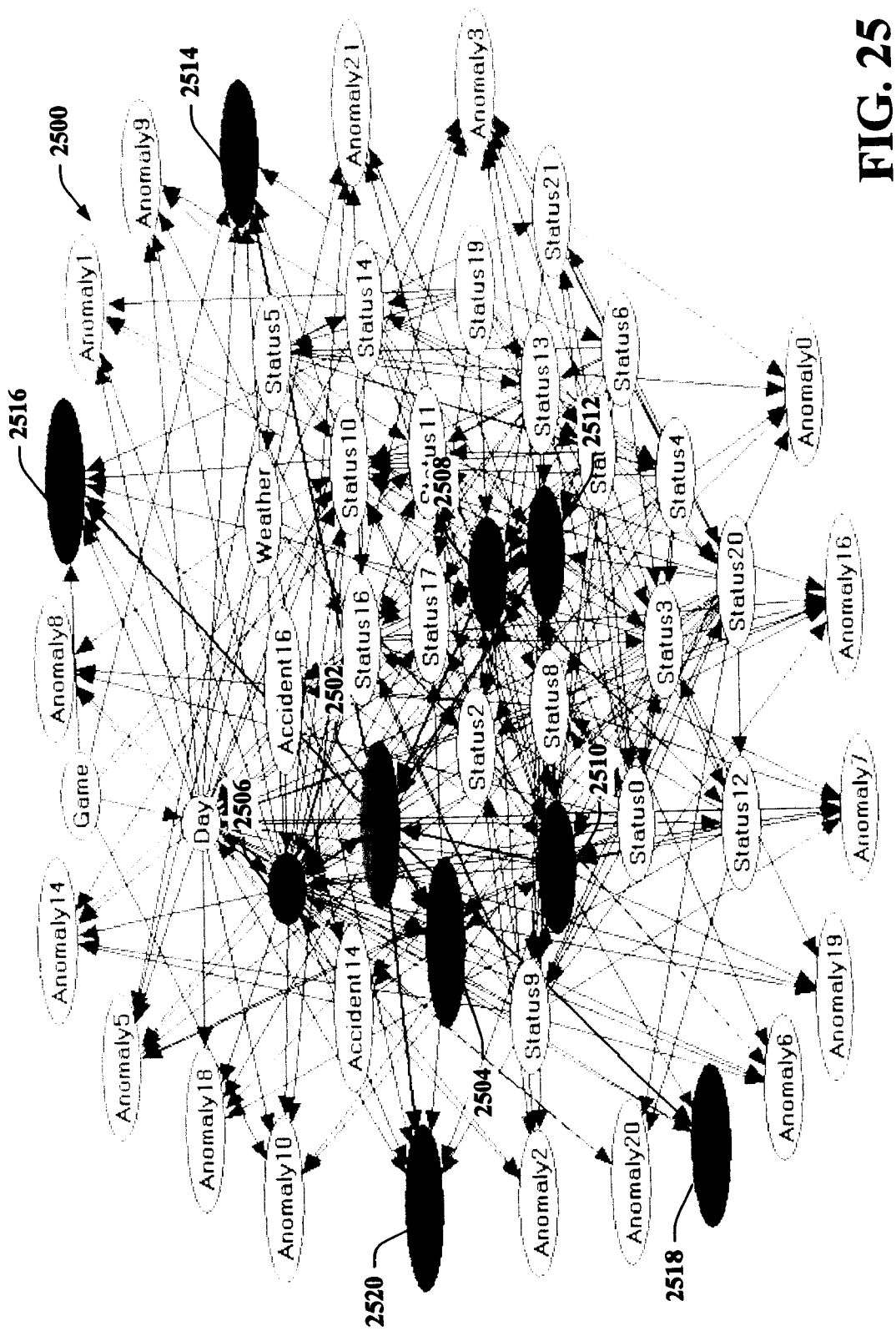
FIG. 25 is an exemplary network illustrating interdependencies between variables utilized in connection with predicting occurrences of atypical events.
Figure 26:
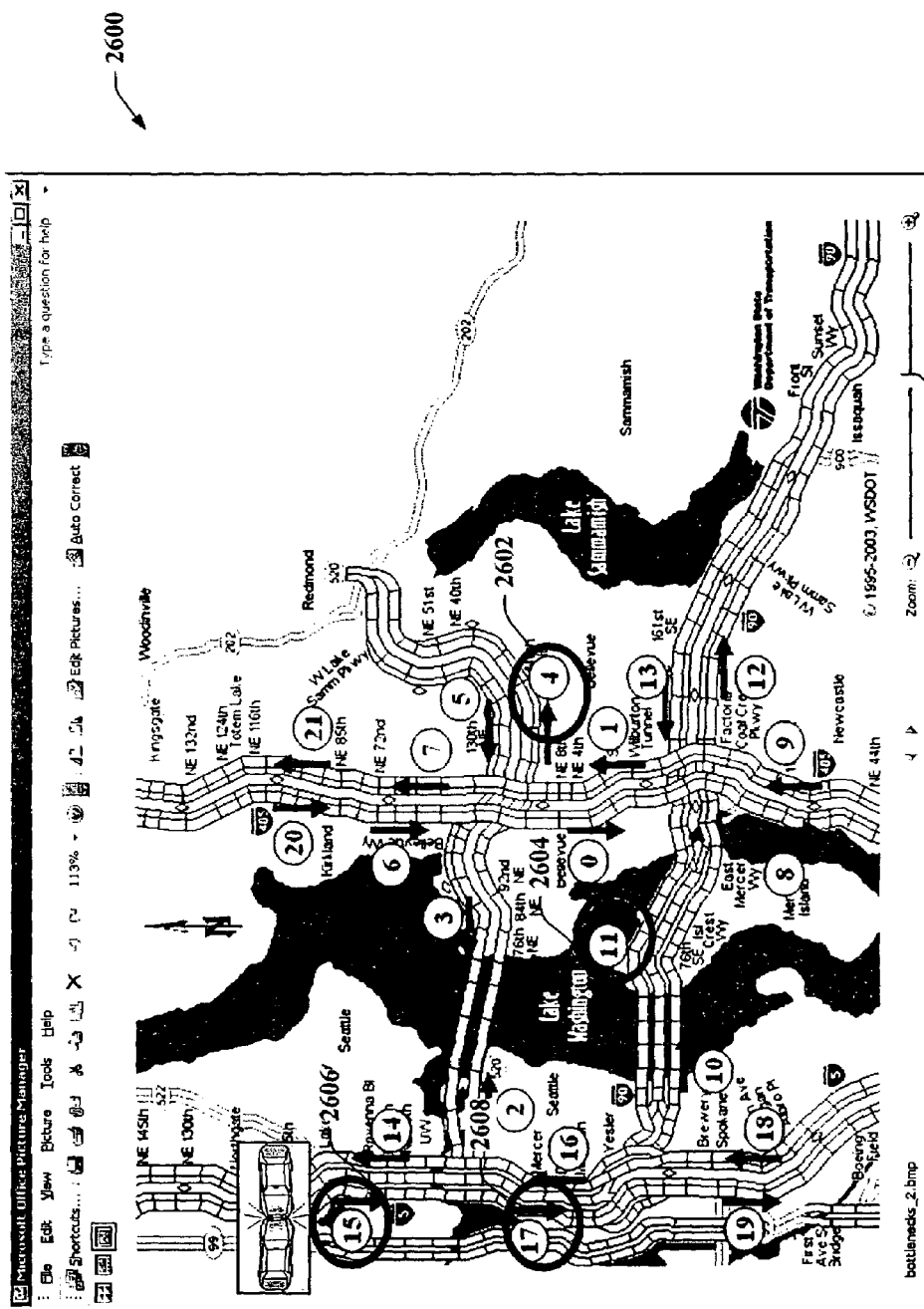
FIG. 26 is a screenshot illustrating a practical application of one or more aspects of the claimed subject matter.

Turning now to FIG. 25, another exemplary network 2500 showing interdependencies between variables depending upon content thereof is illustrated. In particular, the network 2500 highlights a Bayesian network learned for inferring likelihood that states defined as surprising will occur in a threshold amount of time. In particular, the network 2500 highlights influence of an incident report, specifying that there has been a car accident at location 15 (node 2502). The network 2500 also includes node 2504, which represents occurrence of an accidents at another portions of roadway (portion 17). A node 2506 represents a time of day, and nodes 2508-2512 represent traffic states at portions of a roadway (portions 1, 15, and 18, respectively). The aforementioned nodes 2502-2512 directly or indirectly affect nodes 2514-2520, which represent anomalous traffic conditions at portions of the roadway (portions 4, 11, 15, and 17, respectively). Thus, given accidents at particular portions of a roadway and specific status of congestion at portions of a roadway, one or more anomalous events can be predicted. Referring briefly to FIG. 26, a screenshot 2600 that includes circles 2602-2608 highlighting portions of the road 4, 11, 15, and 17, respectively. Such portions correspond to portions represented by the nodes 2514-2520 (FIG. 25) of the network 2500.

Figure 27:
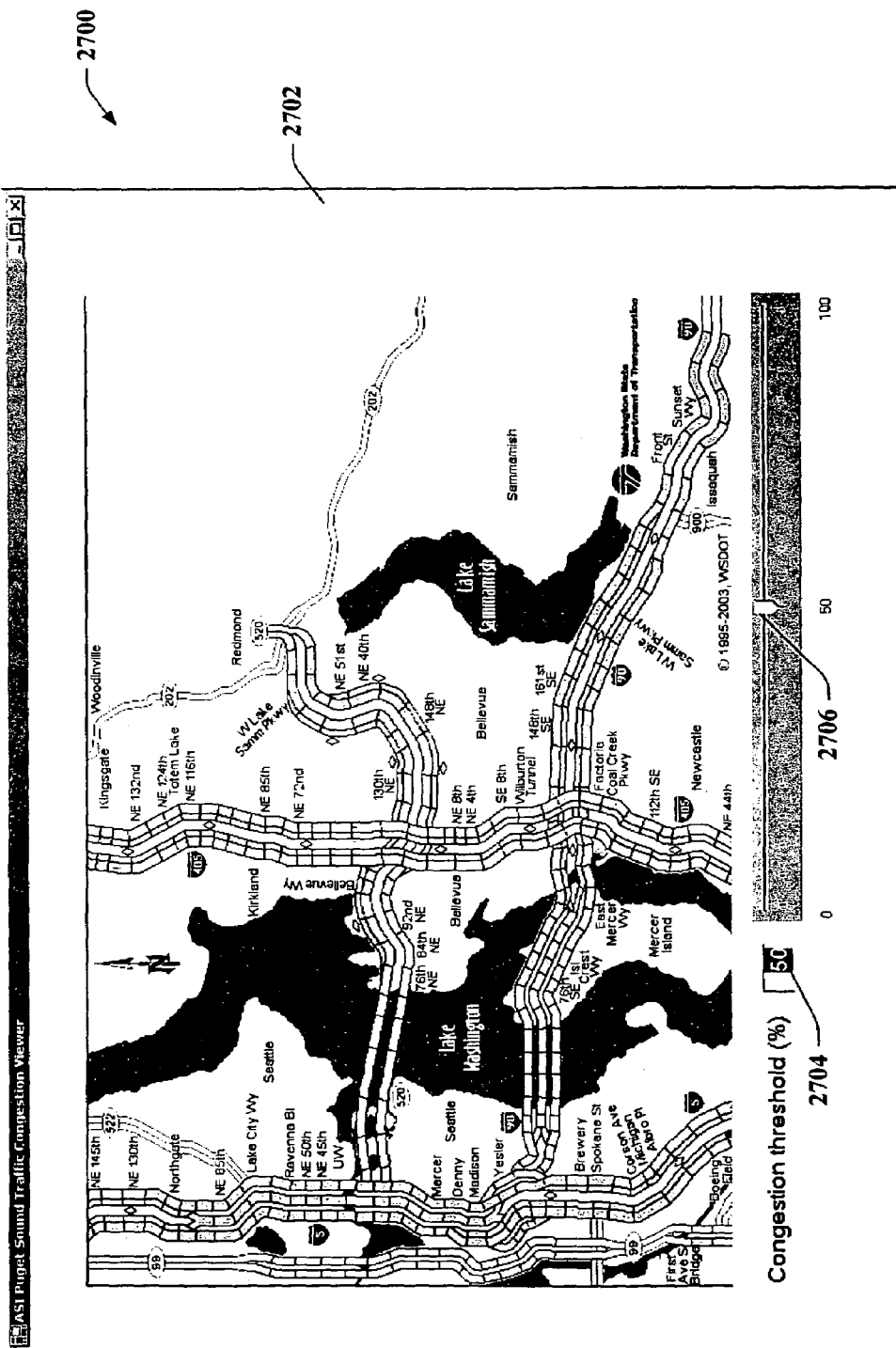
FIGS. 27-31 are screenshots illustrating one or more practical applications of various aspects of the claimed subject matter.
Figure 28:
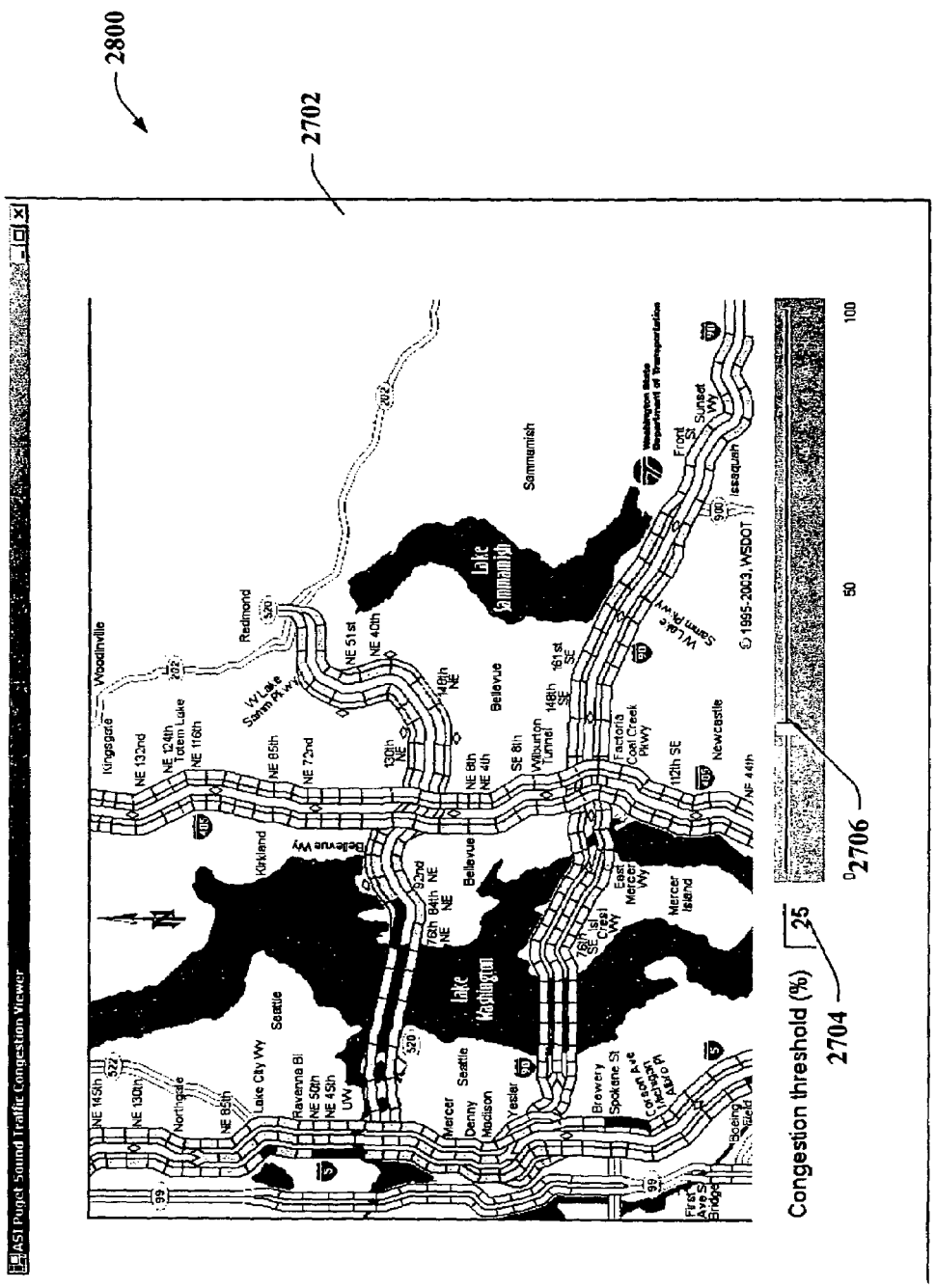
Figure 29:
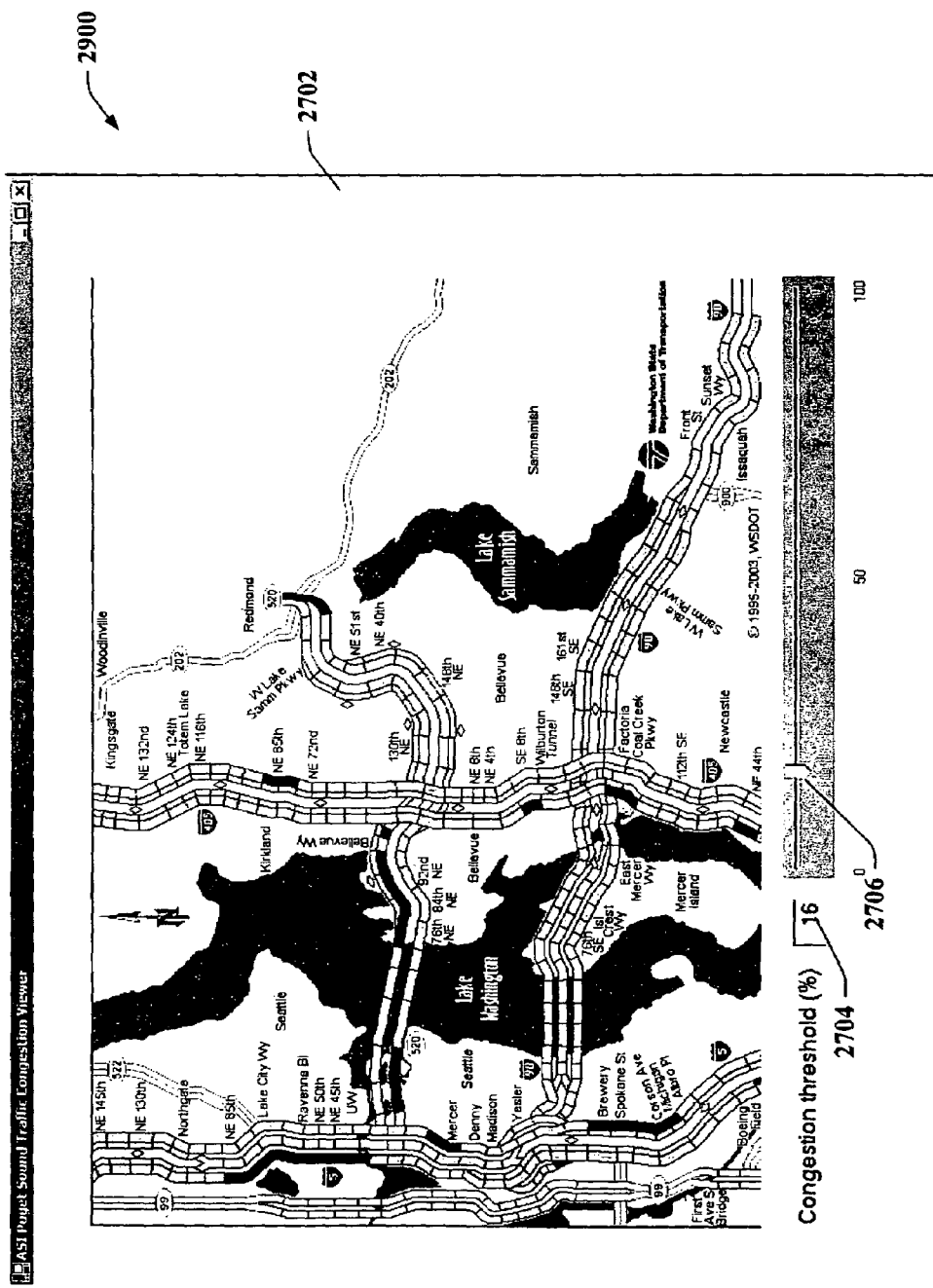
Figure 30:
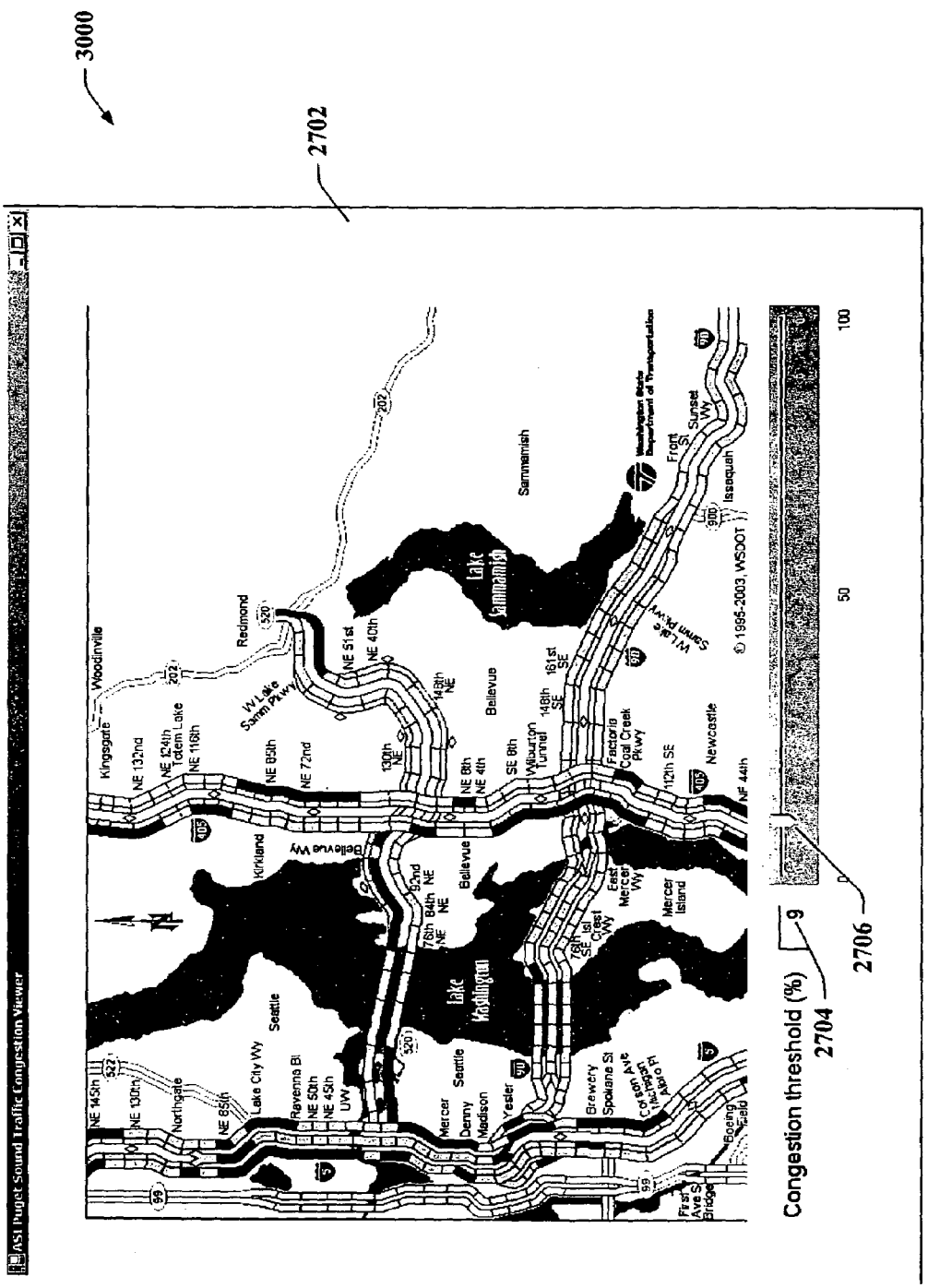
Figure 31:
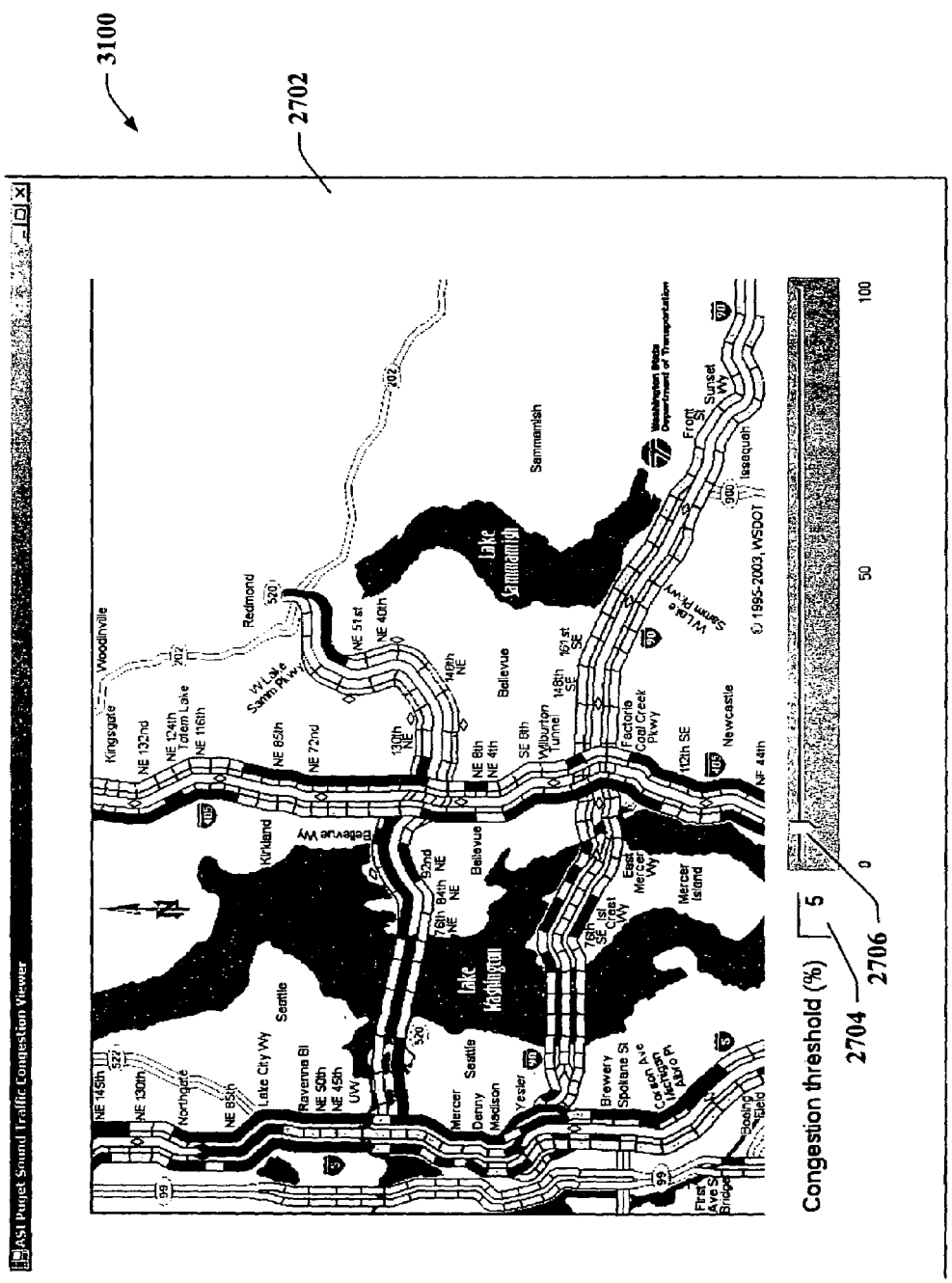

Now referring to FIGS. 27-31, screenshots 2700, 2800, 2900, 3000, and 3100 are provided that illustrate one or more aspects of the claimed subject matter. Referring first to FIG. 27, the screenshot 2700 is of a graphical user interface 2702 that enables a user to select a congestion threshold in connection with predicting traffic patterns. A user can alter the congestion threshold by way of an editable field 2704 or by way of a sliding mechanism 2706. Thus, a predictive model can provide a user with areas where predicted threshold traffic congestion is at or above 50%. The screenshot 2700 shows that there are no portions of roadway subject to congestion at or above 50%. Now referring to FIG. 28, a screenshot 2800 of the user interface 2702 with a congestion threshold at 25% is illustrated. The screenshot 2800 displays portions of roadway predicted to be subject to such congestion at a time specified by a user and/or automatically selected by a computing component. Turning briefly to FIG. 29, a screenshot 2900 of the user interface 2702 where a congestion threshold is chosen to be at approximately 16%. The screenshot 2900 shows that a variety of portions of roadways (being shaded more darkly than other portions of roadway) are predicted to be subject to congestion of greater than or equal to 16%. Referring now to FIG. 30, a screenshot 3000 of the user interface 2702 illustrates roadways predicted to be subject to congestion at or above a congestion threshold of 9%. Now turning to FIG. 31, a screenshot 3100 of the user interface 2702 illustrates predictions relating to traffic congestion when portions of roadways are predicted to be at or above 5%. The screenshots 2700, 2800, 2900, 3000, and 3100 thus illustrate that a user can select a level of congestion threshold for which predictions are to be made, and thereafter determine a best route to travel.

Figure 32:
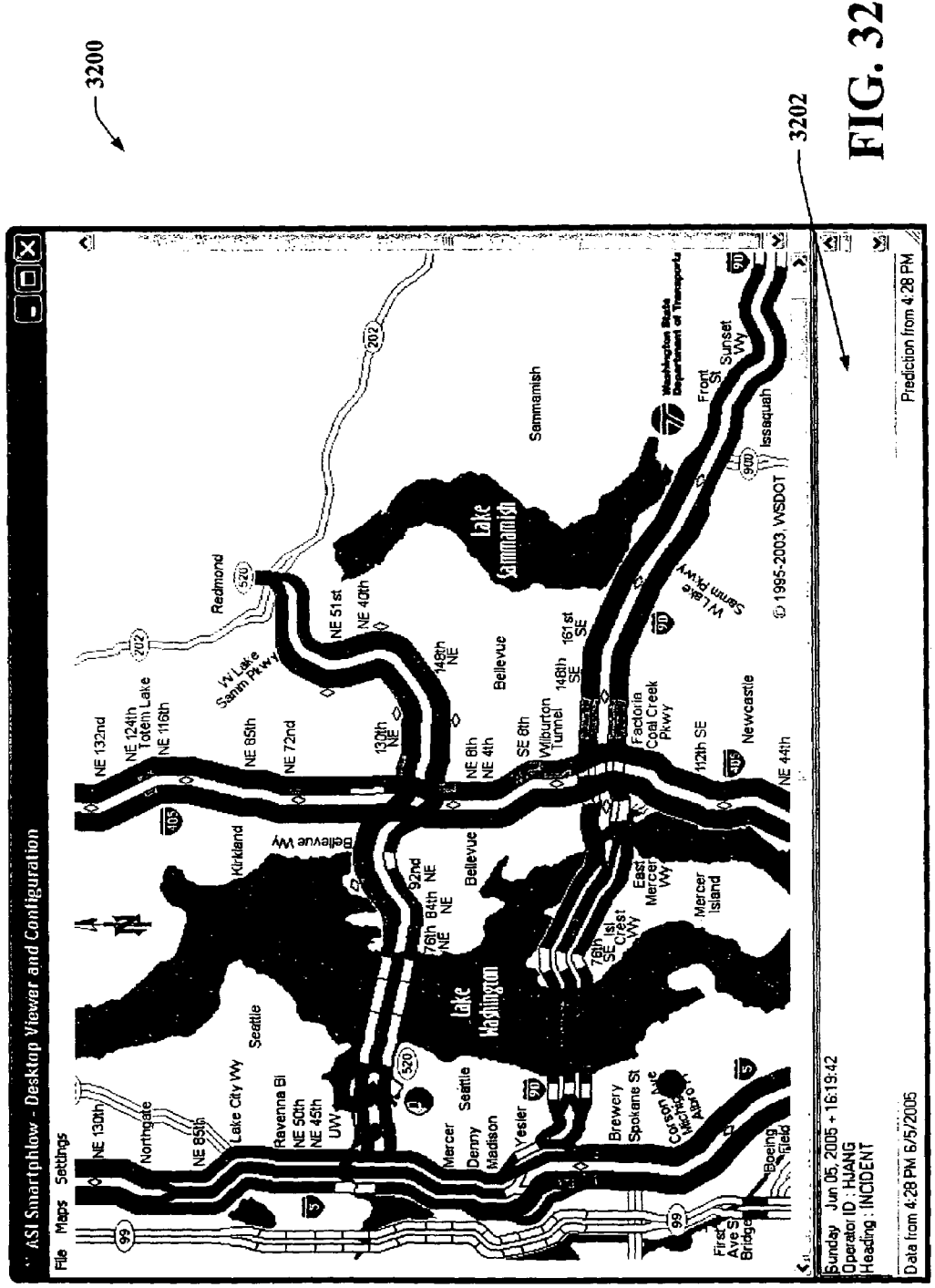
FIG. 32 is an exemplary alert that can be provided to a user.

Now referring to FIG. 32, a screenshot 3200 of an exemplary implementation of one or more aspects of the claimed subject matter is provided. The screenshot 3200 illustrates an alert provided to a user for a predicted surprise (e.g., traffic congestion). For example, a portion of a represented highway can be color-coded to indicate that a surprising event has occurred and/or is predicted to occur at the portion of the highway represented within the screenshot 3200. Furthermore, a text display region 3202 can provide further detail with regards to the occurring and/or predicted surprising event.

Figure 33:
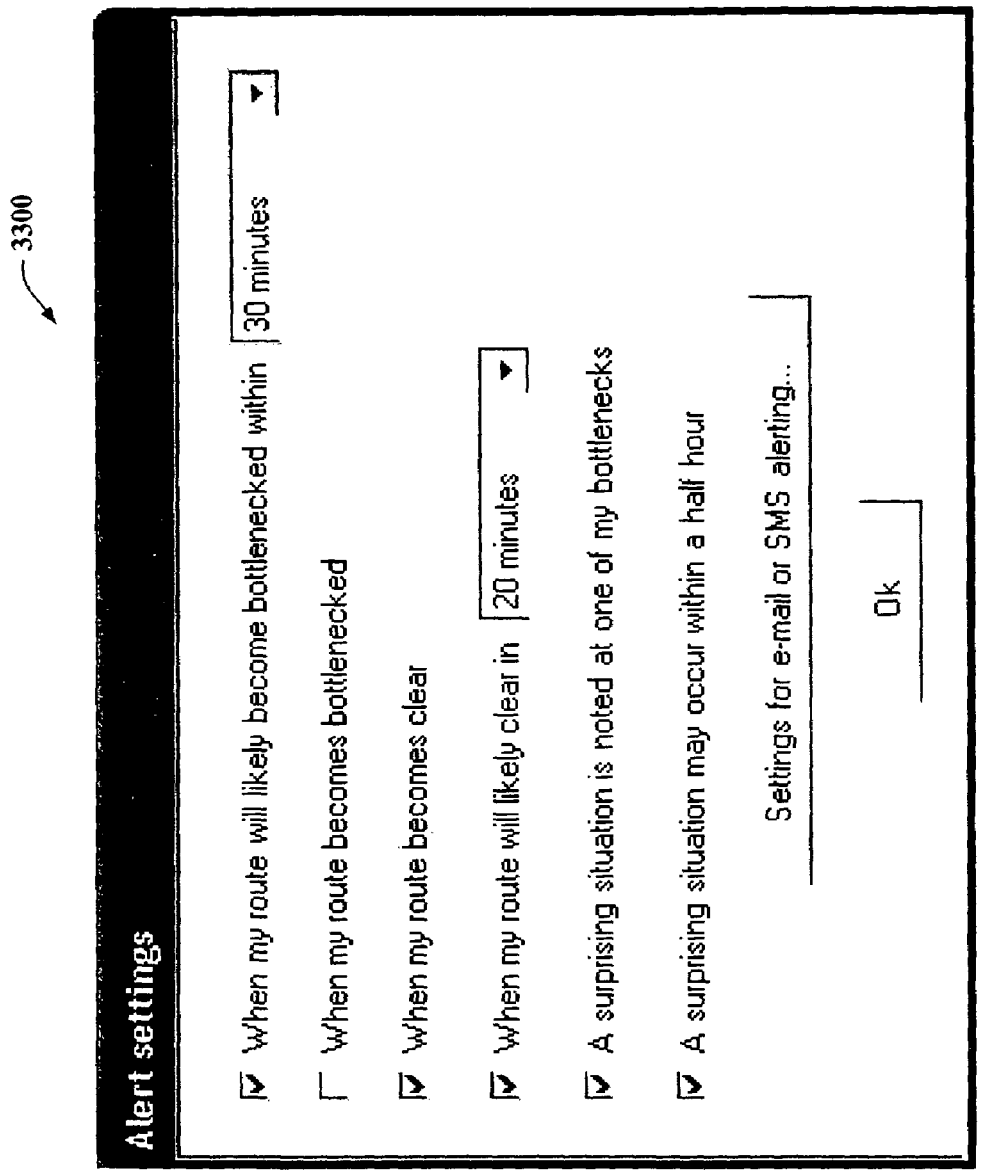
FIG. 33 is an exemplary user interface that can be employed to set alerting parameters.
Figure 34:
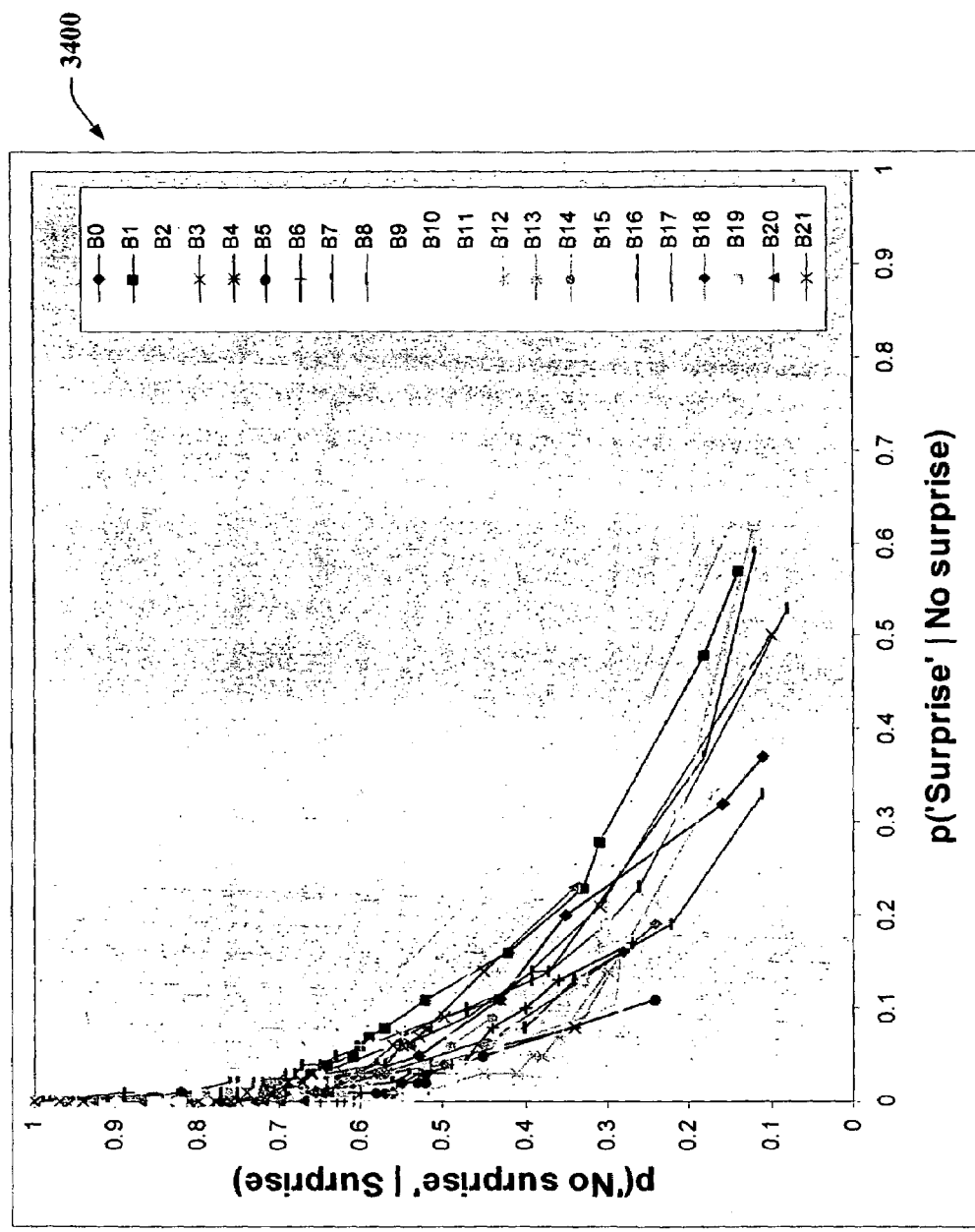
FIG. 34 is a graph illustrating relationships between false positives and false negatives in connection with predicted surprises.

Turning briefly to FIG. 33, an exemplary user interface 3300 that can be employed in connection with one or more claimed aspects is illustrated. The user interface 3300 enables a user to customize parameters associated with received alerts. For instance, the user interface 3300 provides mechanisms for setting timing parameters associated with traffic congestions as well as where to deliver alerts. It is understood, however, that disparate user interfaces providing similar and/or additional user-specified functionality can be utilized in connection with aspects described herein. Now referring to FIG. 34, a graph 3400 that facilitates visualization of relationships between false negatives and false positives for predicted surprises is illustrated. The graph 3400 is based upon an exemplary model of future surprise that was trained with a particular percentage of stored cases and tested with a remainder of stored cases. In more detail, the model's ability to predict surprises thirty minutes into the future was tested and results of such test are shown in the graph 3400. Furthermore, the graph 3400 does not include cases where traffic congestions were associated with a current surprising situation. Thus, the graph 3400 illustrates relationships among false negatives and false positives for cases where a bottleneck is not showing anomalous flows at a current time. It can be determined from analyzing the graph 3400 that if missing alerts about one half of the surprises in thirty minutes is tolerated, the false positive rate drops to approximately 0.05 for the bottlenecks. This means that the probabilistic models of future surprise can be harnessed to report about half the surprises on, for example, the Seattle traffic system with a 0.05 false positive rate.

Figure 35:
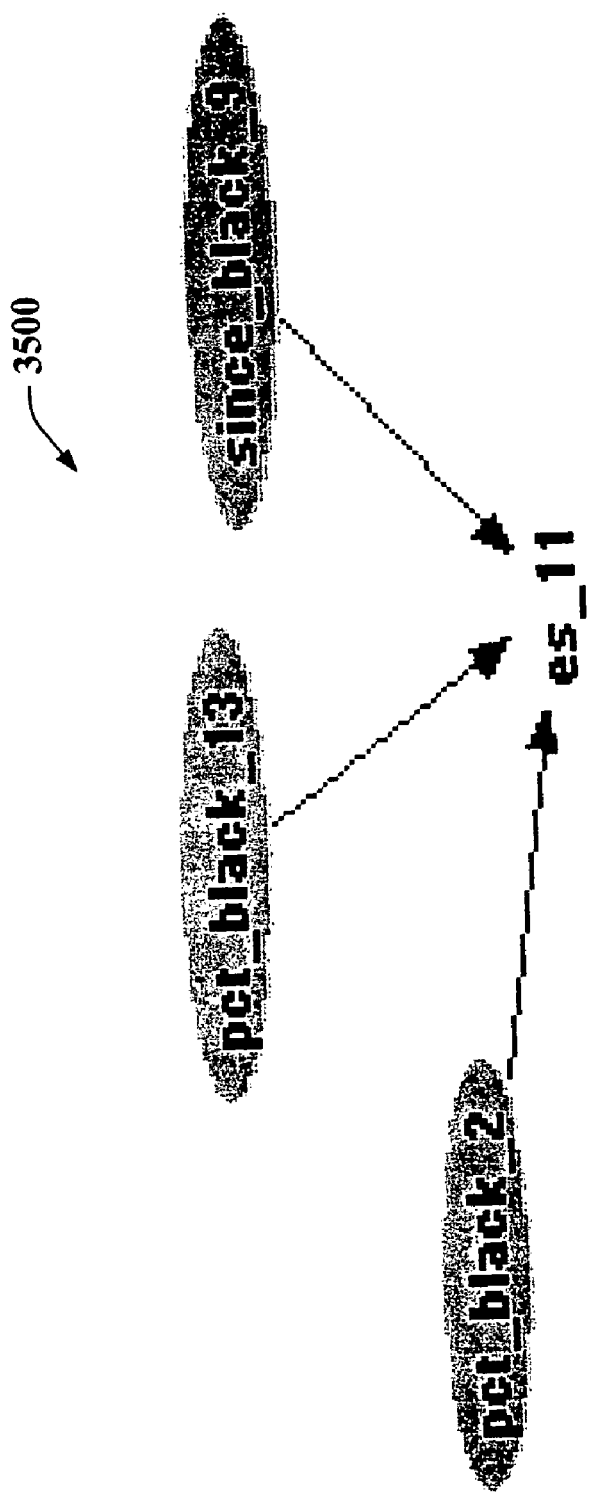
FIG. 35 is an exemplary reliability model that can be employed.

Now turning to FIG. 35, a sample learned reliability model 3500 that can be utilized in connection with the claimed subject matter is illustrated. Reliability models can be employed to predict whether a base-level prediction will fail to be accurate. The reliability model 3500 can be utilized to predict the likelihood that a base-level model will provide predictions with greater accuracy than the more difficult, detailed base-level predictions. To build reliability models for a bottleneck, for example, a learned base model can be executed on a test set, and predictions can be labeled as falling within a predefined time tolerance for a bottleneck event. The new case library can then be utilized, tagged by success and failure, to build a bottleneck-specific reliability model. In use, the reliability model 3500 can predict whether or not the base level model's output will be within a predefined tolerance given all the observations available to a system.

It has been empirically determined that reliability models are typically simpler than the base-level models. The studies of reliability models demonstrate that, for most bottlenecks, models can be constructed that can predict when models would fail to provide predictions within a fifteen minute tolerance of an outcome with greater accuracy than the marginal performance associated with the classification accuracies of the base-level model. The learned models show that the reliabilities are influenced by a small number of variables, representing such variables as the durations and extent (percent cells showing blockage) of traffic jams at relevant bottlenecks (portions of a roadway). Models of reliability can, for example, be learned for each bottleneck and utilized to annotate predictions provided by base-level models. In one exemplary implementation of a feature associated with the claimed subject matter, if the overall accuracy of reliability models are found to be high, and a reliability model predicts in real time that, in the current situation, the accuracy of the base-level models is lower than a reliability threshold, the system can overlays a question mark over a prediction (or use another suitable mechanism for alerting a user that the prediction is associated with questionable reliability).

This provides users with feedback about when a prediction may be inaccurate. The use of certifiably accurate reliability models that perform a task simpler than a more complex base-level challenge underscores a valuable direction in building systems that share important, but intermittently inaccurate inferences with people. Providing systems with accurate models of their context-sensitive competency, and joining such reasoning with a means of communicating such inferred competency, e.g., with simple visual representations, may enable users to understand when they can trust systems that may fail intermittently. The accuracy of the learned reliability models suggests that accuracy of models can be raised by using boosting methods that learn how to handle cases that an initial model had been failing on. Preliminary studies with boosting suggest that employing a staged mixture model approach to boosting can be effective for increasing the accuracy of the base models.

Figure 36:
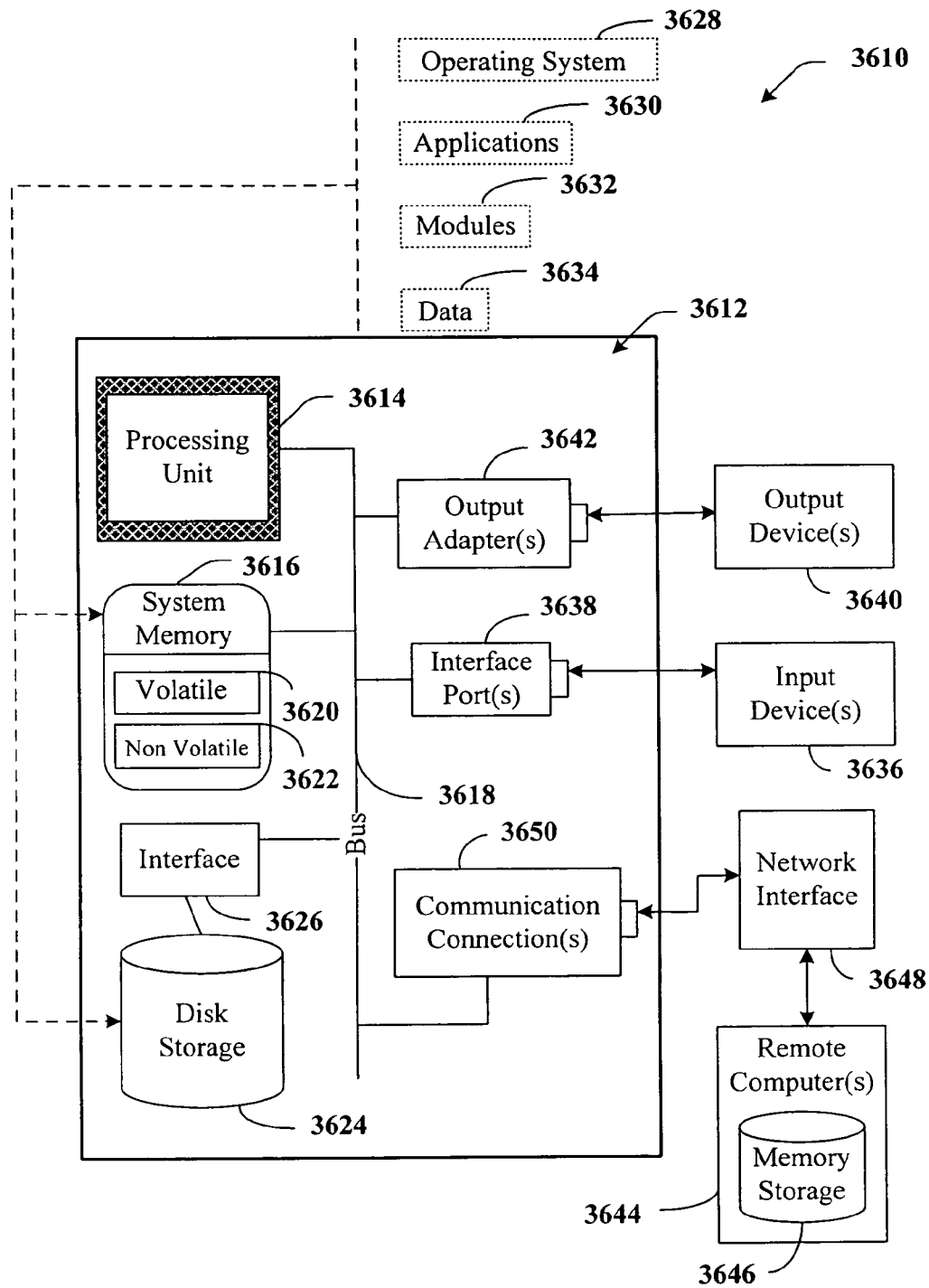
FIG. 36 is a schematic block diagram illustrating a suitable operating environment in accordance with an aspect of the claimed subject matter.

In order to provide additional context for various aspects of the claimed subject matter, FIG. 36 and the following discussion are intended to provide a brief, general description of a suitable operating environment 3610 in which various aspects of the claimed subject matter may be implemented. While the claimed subject matter is described in the general context of computer-executable instructions, such as program modules, executed by one or more computers or other devices, those skilled in the art will recognize that the claimed subject matter can also be implemented in combination with other program modules and/or as a combination of hardware and software.

Generally, however, program modules include routines, programs, objects, components, data structures, etc. that perform particular tasks or implement particular data types. The operating environment 3610 is only one example of a suitable operating environment and is not intended to suggest any limitation as to the scope of use or functionality of the claimed subject matter. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 36, an exemplary environment 3610 for implementing various aspects of the invention includes a computer 3612. The computer 3612 includes a processing unit 3614, a system memory 3616, and a system bus 3618. The system bus 3618 couples system components including, but not limited to, the system memory 3616 to the processing unit 3614. The processing unit 3614 can be any of various available processors. Dual microprocessors and other multiprocessor architectures also can be employed as the processing unit 3614.

The system bus 3618 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 3616 includes volatile memory 3620 and nonvolatile memory 3622. The basic input/output system (BIOS), containing the basic routines to transfer information between elements within the computer 3612, such as during start-up, is stored in nonvolatile memory 3622. By way of illustration, and not limitation, nonvolatile memory 3622 can include read only memory (ROM), programmable ROM (PROM), electrically programmable ROM (EPROM), electrically erasable ROM (EEPROM), or flash memory. Volatile memory 3620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 3612 also includes removable/nonremovable, volatile/nonvolatile computer storage media. FIG. 36 illustrates, for example a disk storage 3624. Disk storage 3624 includes, but is not limited to, devices like a magnetic disk drive, floppy disk drive, tape drive, Jaz drive, Zip drive, LS-100 drive, flash memory card, or memory stick. In addition, disk storage 3624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 3624 to the system bus 3618, a removable or non-removable interface is typically used such as interface 3626.

It is to be appreciated that FIG. 36 describes software that acts as an intermediary between users and the basic computer resources described in suitable operating environment 3610. Such software includes an operating system 3628. Operating system 3628, which can be stored on disk storage 3624, acts to control and allocate resources of the computer system 3612. System applications 3630 take advantage of the management of resources by operating system 3628 through program modules 3632 and program data 3634 stored either in system memory 3616 or on disk storage 3624. It is to be appreciated that the subject invention can be implemented with various operating systems or combinations of operating systems.

A user enters commands or information into the computer 3612 through input device(s) 3636. Input devices 3636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 3614 through the system bus 3618 via interface port(s) 3638. Interface port(s) 3638 include, for example, a serial port, a parallel port, a game port, and a universal serial bus (USB). Output device(s) 3640 use some of the same type of ports as input device(s) 3636. Thus, for example, a USB port may be used to provide input to computer 3612, and to output information from computer 3612 to an output device 3640. Output adapter 3642 is provided to illustrate that there are some output devices 3640 like monitors, speakers, and printers among other output devices 3640 that require special adapters. The output adapters 3642 include, by way of illustration and not limitation, video and sound cards that provide a means of connection between the output device 3640 and the system bus 3618. It should be noted that other devices and/or systems of devices provide both input and output capabilities such as remote computer(s) 3644.

Computer 3612 can operate in a networked environment using logical connections to one or more remote computers, such as remote computer(s) 3644. The remote computer(s) 3644 can be a personal computer, a server, a router, a network PC, a workstation, a microprocessor based appliance, a peer device or other common network node and the like, and typically includes many or all of the elements described relative to computer 3612. For purposes of brevity, only a memory storage device 3646 is illustrated with remote computer(s) 3644. Remote computer(s) 3644 is logically connected to computer 3612 through a network interface 3648 and then physically connected via communication connection 3650. Network interface 3648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 3650 refers to the hardware/software employed to connect the network interface 3648 to the bus 3618. While communication connection 3650 is shown for illustrative clarity inside computer 3612, it can also be external to computer 3612. The hardware/software necessary for connection to the network interface 3648 includes, for exemplary purposes only, internal and external technologies such as, modems including regular telephone grade modems, cable modems and DSL modems, ISDN adapters, and Ethernet cards.

Figure 37:
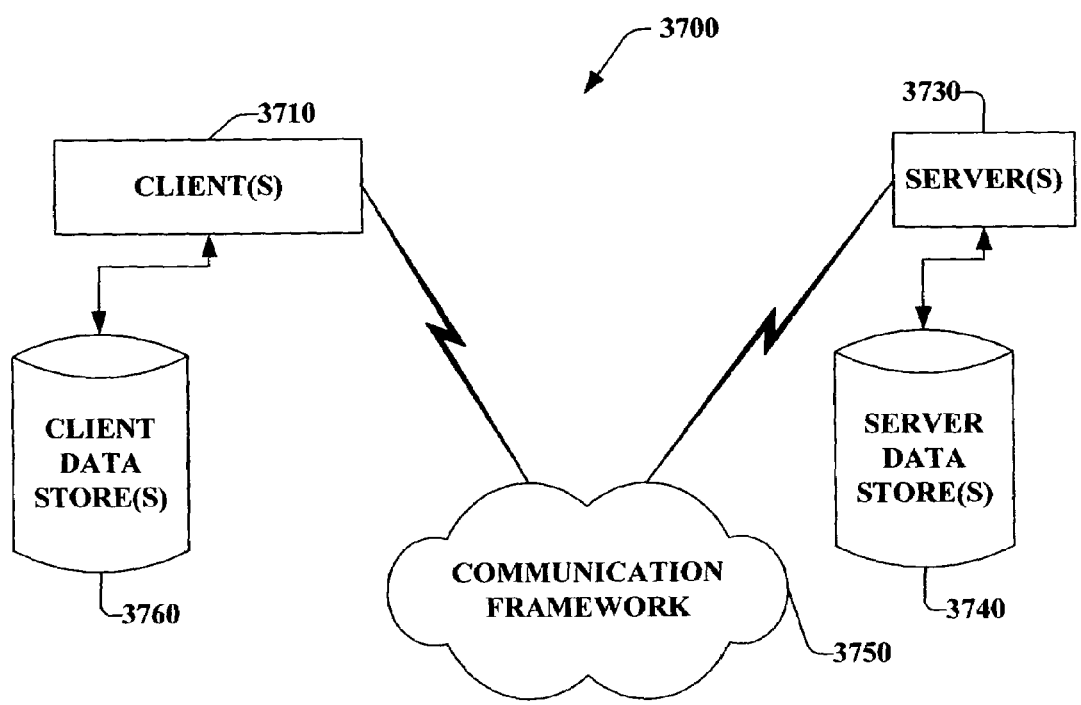
FIG. 37 is a schematic block diagram of a sample-computing environment with which the claimed subject matter can interact.

FIG. 37 is a schematic block diagram of a sample-computing environment 3700 with which the subject invention can interact. The system 3700 includes one or more client(s) 3710. The client(s) 3710 can be hardware and/or software (e.g., threads, processes, computing devices). The system 3700 also includes one or more server(s) 3730. The server(s) 3730 can also be hardware and/or software (e.g., threads, processes, computing devices). The servers 3730 can house threads to perform transformations by employing the subject invention, for example. One possible communication between a client 3710 and a server 3730 can be in the form of a data packet adapted to be transmitted between two or more computer processes. The system 3700 includes a communication framework 3750 that can be employed to facilitate communications between the client(s) 3710 and the server(s) 3730. The client(s) 3710 are operably connected to one or more client data store(s) 3760 that can be employed to store information local to the client(s) 3710. Similarly, the server(s) 3730 are operably connected to one or more server data store(s) 3740 that can be employed to store information local to the servers 3730.

What has been described above includes examples of the claimed subject matter. It is, of course, not possible to describe every conceivable combination of components or methodologies, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that predicts and outputs events identified as being surprising to a person, comprising a memory having stored therein computer executable components and a processor that executes the following computer executable components:

an interface component that receives contextual and historical data;

a predictive model component that utilizes the contextual and historical data to predict an event and outputs the prediction if the prediction corresponds to one or more definitions of surprise, wherein the prediction corresponds to one or more definitions of surprise based on a probability of occurrence of the event, and wherein the predictive model component comprises:

a robust predictive model that generates a prediction of the event based on interdependencies between variables associated with the contextual and historical data, wherein the interdependencies are not contemplated by the person; and a user expectancy model that utilizes the contextual and historical data to generate a prediction of the event based on, at least in part, machine learning and a case library that includes a plurality of surprising events and observations associated with the plurality of surprising events;

a difference analyzer component that calculates a measure of difference between the prediction made by the robust predictive model and the prediction made by the user expectancy model to determine whether an event is surprising; and an alerting component that alerts the person of the surprising event upon the determination that the event is surprising.

2. The system of claim 1, the predictive model component further comprising at least one of:

calculating a probability of correctness associated with the prediction and outputting the prediction if the probability of correctness is above a threshold; or annotating the prediction with an indication of confidence.

3. The system of claim 1, wherein the one or more definitions of surprise are a function of frequency of occurrence of events that can be predicted by the predictive model component.

4. The system of claim 1, wherein the contextual data comprises data received by at least one of sensors, data collection components, or input received from the person.

5. The system of claim 1, further comprising a utility analyzer that calculates a measure of utility of outputting the predicted event to the person; wherein the measure of utility indicates a measure of relevance in outputting the predicted event to the person based on at least one of historical data associated with the person, contextual data associated with the person, or feedback provided by the person; and wherein the predicted event is output if the measure of relevance in outputting the predicted event to the person is above a threshold.

6. The system of claim 1, wherein the alerting component utilizes alerting rules to determine a manner in which to alert the person of the surprising event, wherein the alerting rules consider at least one of a type of device carried by the person or time of day.

7. The system of claim 1, further comprising:

a feedback component that receives from the person input relating to an event; and an updating component that updates the one or more definitions of surprise based upon the input relating to the event received from the person.

8. The system of claim 1, further comprising a suggestion component that outputs suggestions of actions the person can perform in response to the predicted event.

9. The system of claim 1, wherein the contextual data comprises at least one of status of a variable, duration of the status of the variable, a day of week, a time of day, a time and duration of an event, whether an event is within a defined range, whether a day under consideration is a holiday, a weather condition, a current traffic condition, a previous traffic condition, a stock market condition, a sales condition, or a delay condition.

10. The system of claim 1, wherein the predictive model component stores the one or more definitions of surprise in the case library.

11. The system of claim 1, wherein the alerting component alerts the person of a time in the future that the person can expect traffic volumes associated with a traffic route of interest to be surprisingly heavier or lighter.

12. The system of claim 1, wherein the alerting component alerts the person to begin a trip earlier or later within constraints of arriving at a location around a time of interest.

13. The system of claim 1, wherein the alerting component alerts the person of a predicted surprising rise or drop in value of an entity associated with the person's financial interest.

14. A computer-implemented method for recognizing surprising events and predicting future surprising events, comprising:

providing a predictive model;

associating definitions of surprising events with the predictive model;

providing the predictive model with contextual and historical data;

predicting an event as a function of the contextual and historical data; and determining that the predicted event corresponds to one or more of the definitions of surprising events by calculating a measure of difference between a prediction made by a robust predictive model and a prediction made by a user expectancy model;

wherein the robust predictive model predicts events that are surprising to a person based on interdependencies between variables associated with the contextual and historical data, and wherein the interdependencies are not contemplated by the person; and wherein the user expectancy model predicts events that are surprising to the person based on, at least in part, machine learning and a case library that includes a plurality of surprising events and observations associated with the plurality of surprising events; and outputting the predicted event to the person if the predicted event corresponds to one or more of the definitions of surprising events.

15. The method of claim 14, further comprising:

building the case library of the definitions of surprising events building the predictive model as one or more statistical models that perform surprise forecasting from the case library; and employing the predictive model in real-time by monitoring evidence and inferring and outputting to the person a probability that the person will be alerted of the predicted event in the future.

16. The method of claim 15, further comprising constructing the one or more statistical models by way of at least one of the following machine learning methods: Bayesian networks, dynamic Bayesian networks, continuous time Bayesian networks, support vector machines, neural network models, Hidden Markov Models, Markov decision processes, or particle filtering methods.

17. The method of claim 14, further comprising:

calculating a measure of utility associated with the predicted event, wherein the measure of utility is calculated based on at least one of historical data associated with the person, contextual data associated with the person, or feedback provided by the person; and outputting the predicted event if the measure of utility is above a threshold.

18. The method of claim 14, further comprising:

receiving a first prediction of a first event from a user-expectancy model, wherein the user-expectancy model generates the first prediction based on at least one marginal statistical model defined by a subset of observations that are contemplated by the person considering contextual and historical data;

receiving a second prediction of a second event from a robust predictive model, wherein the robust predictive model utilizes the contextual and historical data to generate the second prediction based on interdependencies between variables that are not contemplated by the person; and outputting the second prediction of the second event as a surprising event based on, at least in part, a comparison between the first prediction and the second prediction.

19. The method of claim 14, wherein the contextual data comprises at least one of status of a variable, duration of the status of the variable, a day of week, a time of day, a time and duration of an event, whether an event is within a defined range, whether a day under consideration is a holiday, a weather condition, a current traffic condition, a previous traffic condition, a stock market condition, a sales condition, or a delay condition.

20. A predictive system comprising a memory having stored therein computer executable components and a processor that executes the following computer executable components:

means for receiving contextual and historical data;

means for predicting an event;

means for defining events surprising to a person; and means for correlating the predicted event with the defined surprising events to determine that the predicted event is a surprising event, wherein the surprising event is determined by measuring a difference between a prediction made by a robust predictive model and a prediction made by a user expectancy model;

wherein the prediction made by the robust predictive model is based on, at least in part, interdependencies between variables associated with the contextual and historical data, and wherein the interdependencies are not contemplated by the person; and wherein the prediction made by the user expectancy model is based on, at least in part, machine learning and a case library that includes a plurality of surprising events and observations associated with the plurality of surprising events; and means for outputting the predicted event.

21. The predictive system of claim 20, further comprising:

means for storing the defined surprising events, combined with observations that occur prior to each defined surprising event and a label defining a type of the defined surprising event; and means for constructing models that compute a probability of different types of surprises occurring in the future.

* * * * *

UNITED STATES PATENT AND TRADEMARK OFFICE
CERTIFICATE OF CORRECTION

PATENT NO. : 7,519,564 B2  
APPLICATION NO. : 11/172581  
DATED : April 14, 2009  
INVENTOR(S) : Eric J. Horvitz Page 1 of 1

It is certified that error appears in the above-identified patent and that said Letters Patent is hereby corrected as shown below:

In column 32, line 58, in Claim 15, delete "events" and insert -- events; --, therefor.

Signed and Sealed this  
Third Day of May, 2011

David J. Kappos  
*Director of the United States Patent and Trademark Office*